United States Patent [19]

Gilson et al.

[11] 4,276,029

[45] Jun. 30, 1981

[54] VISUAL CUE SIMULATOR

[75] Inventors: Richard D. Gilson; Marlin O. Thurston, both of Columbus; Karl W. Olson, Worthington; Ronald W. Ventola, Columbus, all of Ohio

[73] Assignee: The Ohio State University, Columbus, Ohio

[21] Appl. No.: 40,059

[22] Filed: May 17, 1979

[51] Int. Cl.³ .......................... G09B 9/08; H04N 7/18
[52] U.S. Cl. .................................................... 434/43
[58] Field of Search ...................... 35/12 N; 358/104; 340/27 NA, 27 AT

[56] References Cited

U.S. PATENT DOCUMENTS

| 2,975,671 | 3/1961 | Hemstreet | 358/104 X |
|---|---|---|---|
| 2,988,821 | 6/1961 | Bolie | 35/12 N X |
| 3,060,596 | 10/1962 | Tucker et al. | 35/12 N X |
| 3,081,557 | 3/1963 | Mailhot | 35/12 N |
| 3,091,662 | 5/1963 | Hemstreet | 358/104 |
| 3,098,929 | 7/1963 | Kirchner | 35/12 N X |
| 3,242,493 | 3/1966 | Westerback | 340/27 NA X |
| 3,261,912 | 7/1966 | Hemstreet | 358/104 |
| 3,281,529 | 10/1966 | Hemstreet | 358/104 |
| 3,309,659 | 3/1967 | Balding | 340/27 NA |
| 3,418,459 | 12/1968 | Purdy et al. | 35/12 N X |
| 3,439,105 | 4/1969 | Ebeling et al. | 35/12 N X |
| 3,520,994 | 7/1970 | McAfee et al. | 358/104 |
| 3,605,083 | 9/1971 | Kramer | 340/27 NA |
| 3,643,213 | 2/1972 | Yurasek et al. | 340/27 NA |
| 3,643,258 | 2/1972 | Balding | 340/27 NA X |
| 3,665,408 | 5/1972 | Erdahl et al. | 340/27 NA X |
| 3,716,866 | 2/1973 | Mason | 340/27 NA X |
| 3,725,563 | 4/1973 | Woycechowsky | 35/12 N X |
| 3,833,759 | 9/1974 | Yatabe et al. | 35/12 N X |
| 3,911,597 | 10/1975 | Millard et al. | 35/12 N |
| 3,996,673 | 12/1976 | Vorst et al. | 35/12 N X |
| 3,999,007 | 12/1976 | Crane | 358/104 |
| 4,054,917 | 10/1977 | Race | 35/12 N X |

FOREIGN PATENT DOCUMENTS 1446334 8/1976 United Kingdom .................... 35/12 N

OTHER PUBLICATIONS

"Visual Elements in Flight Simulation"; Brown, *Aviation Space and Environmental Medicine*, vol. 47, Sep. 1976, pp. 913–924.
"The Approach and Landing: Cues and Clues to a Safe Touchdown"; Hasbrook, A. H. *Business and Commercial Aviation*, Nov. 1975, pp. 39–43.
"Use of a Visual Landing System in Primary Flight Training"; Young et al. *Proceedings of the 17th Annual Meeting of the Human Factor Society*, 1973.

Primary Examiner—William H. Grieb
Attorney, Agent, or Firm—Millard & Cox

[57] ABSTRACT

A simulator arrangement wherein visual cues are generated by a video system at a display surface (18) spaced from an eye position (14). The image at the display surface is formed as longitudinal boundaries emanating from a vanishing point (VP) positioned a predetermined distance above a fixed horizon (30) image. Hue and texture visual information are developed between the longitudinal boundaries from a memory function (178). The slopes of the longitudinal boundaries are developed as the quotient of the value of the transverse displacement of a boundary from the corresponding position of the eye position divided by a value representing simulated height of the eye position. The arrangement finds particular utilization in conjunction with flight trainers.

43 Claims, 83 Drawing Figures

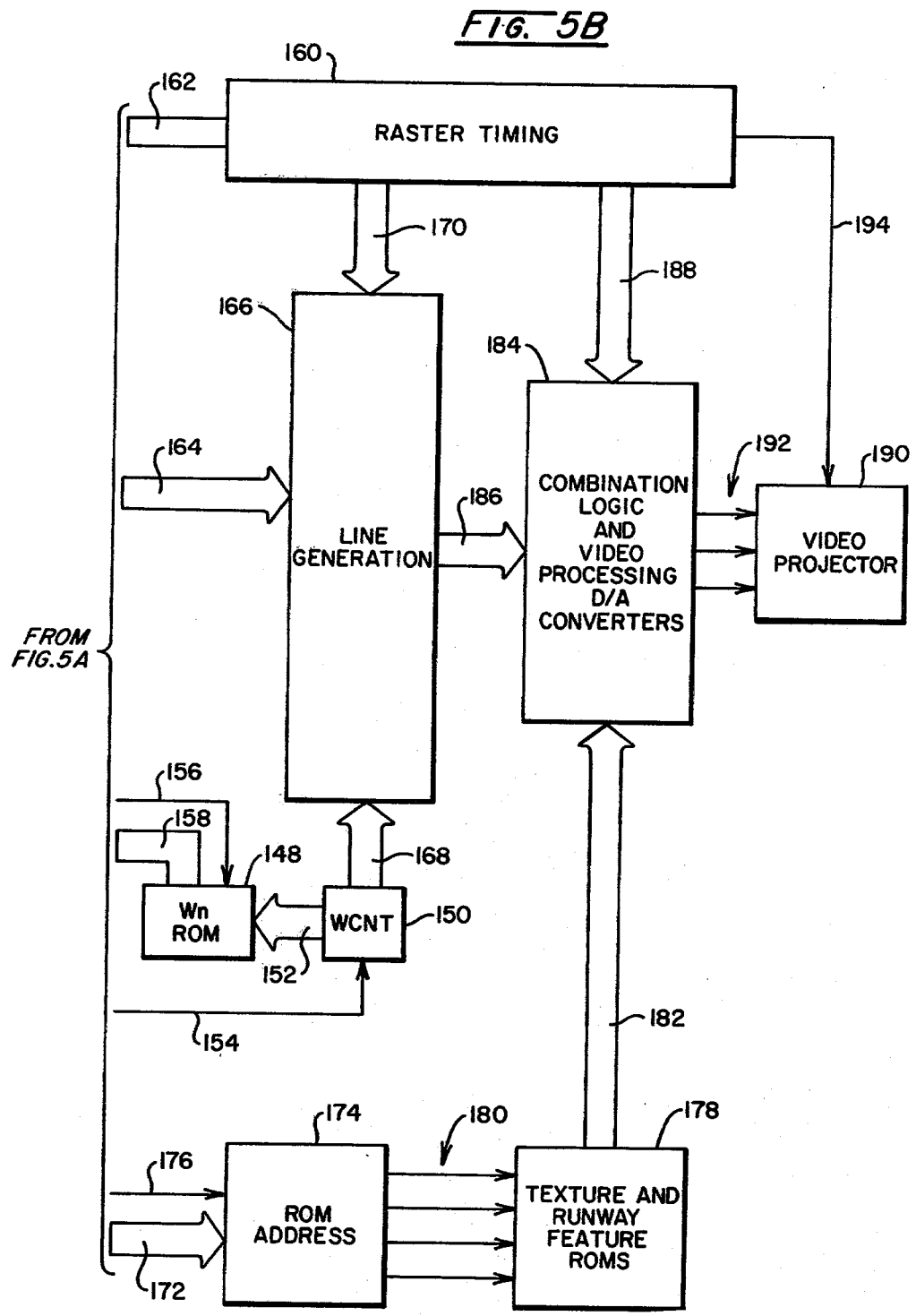

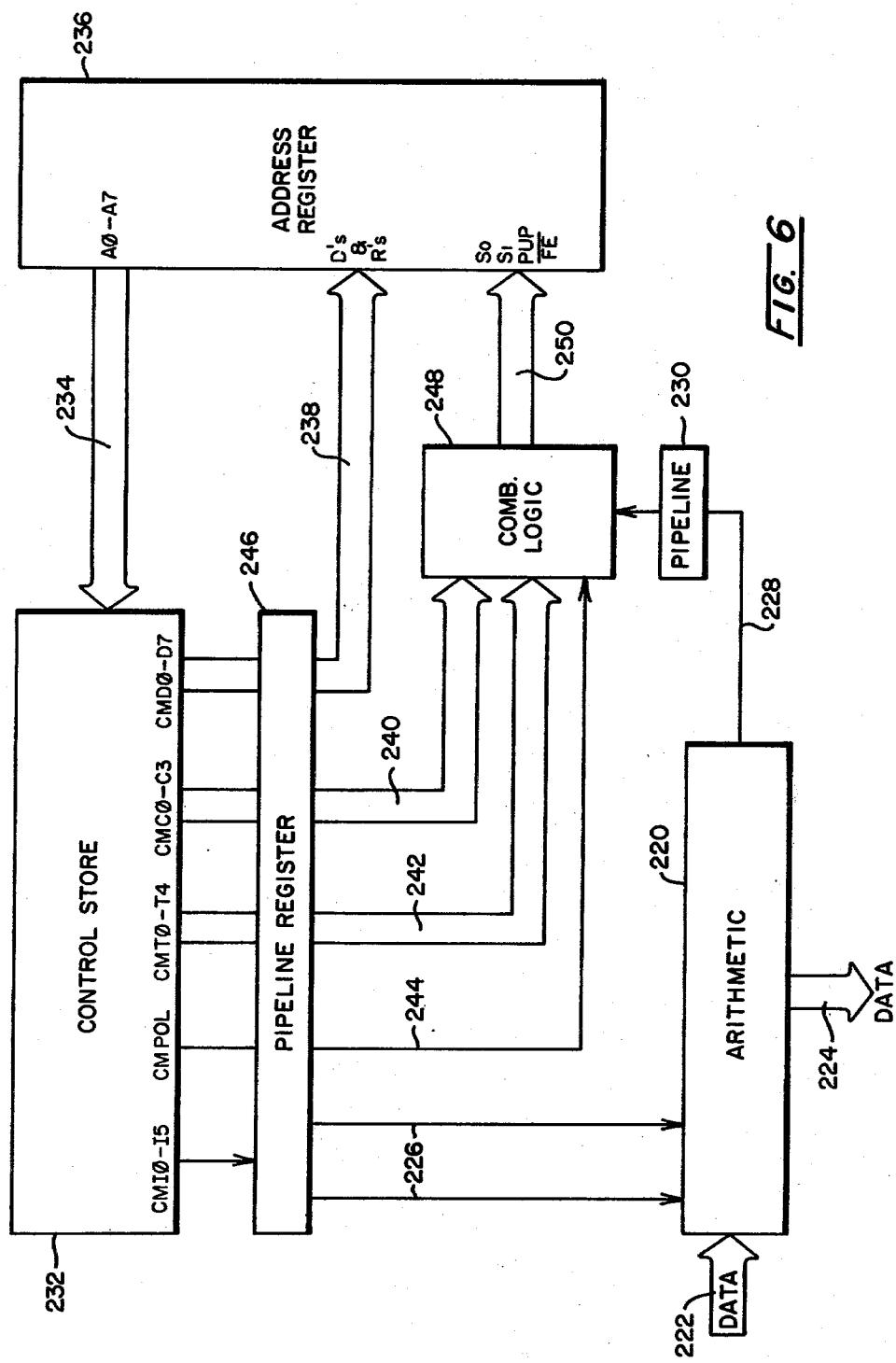

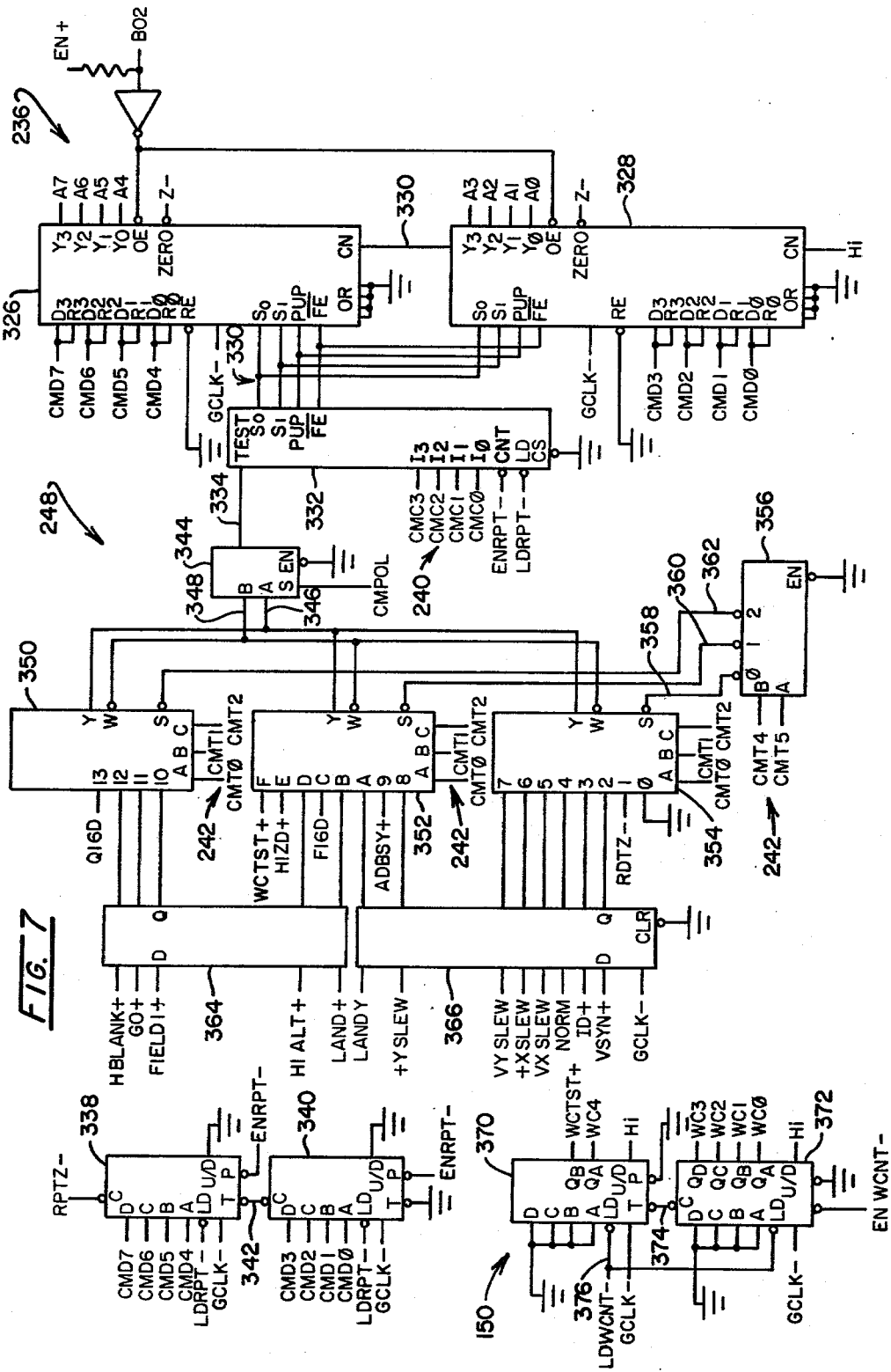

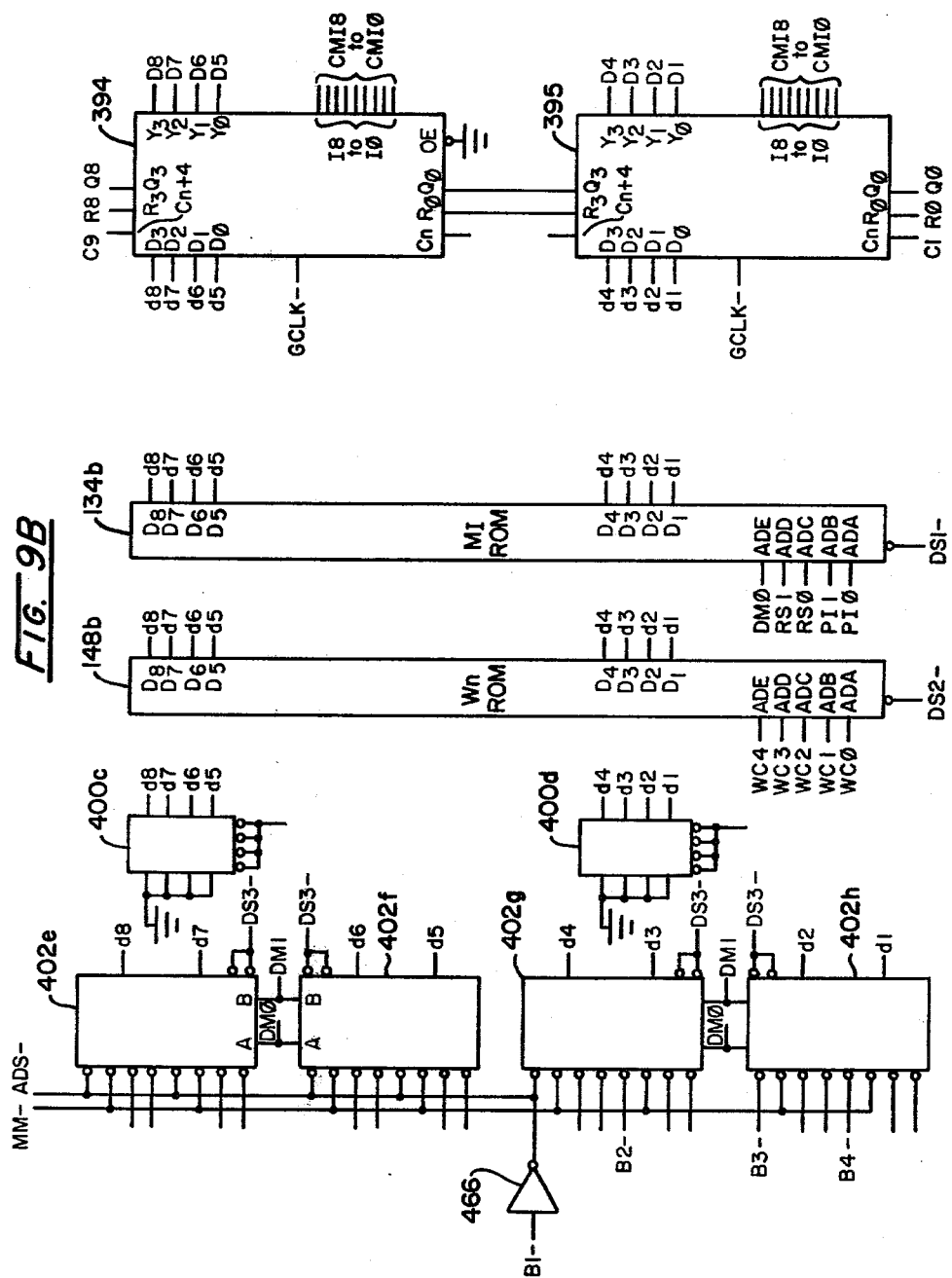

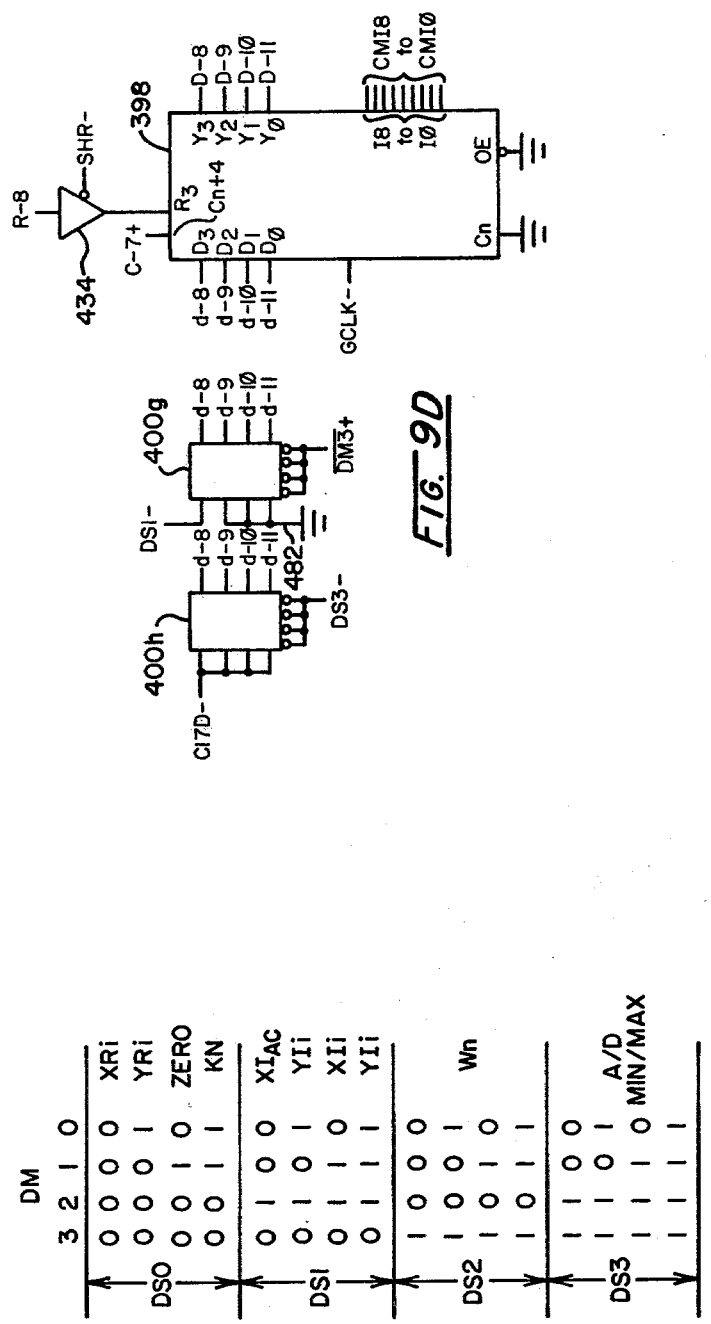

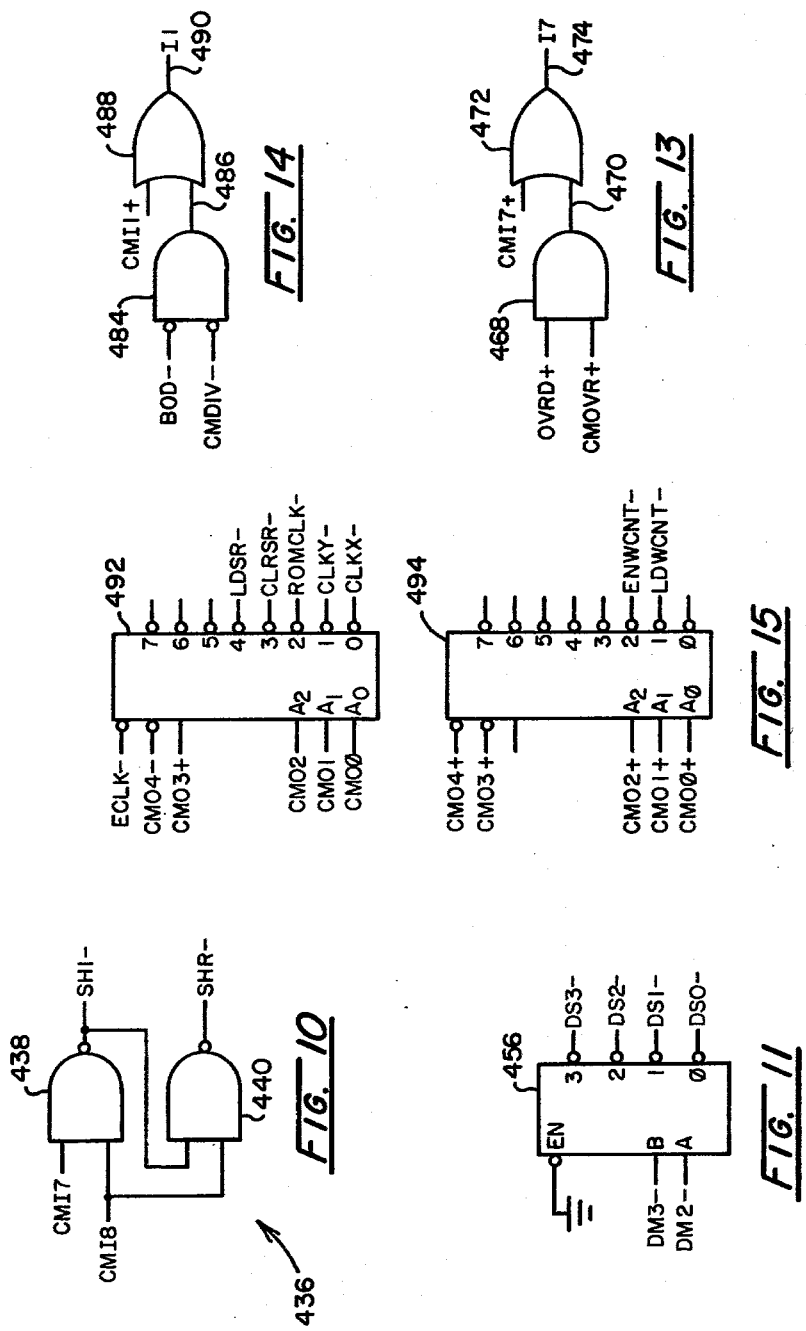

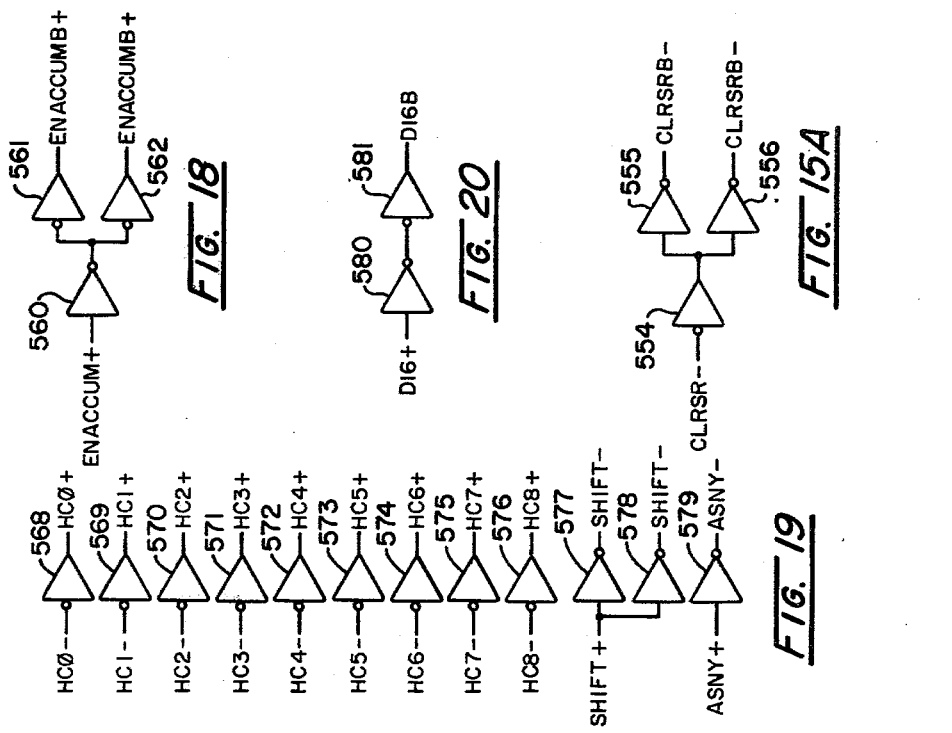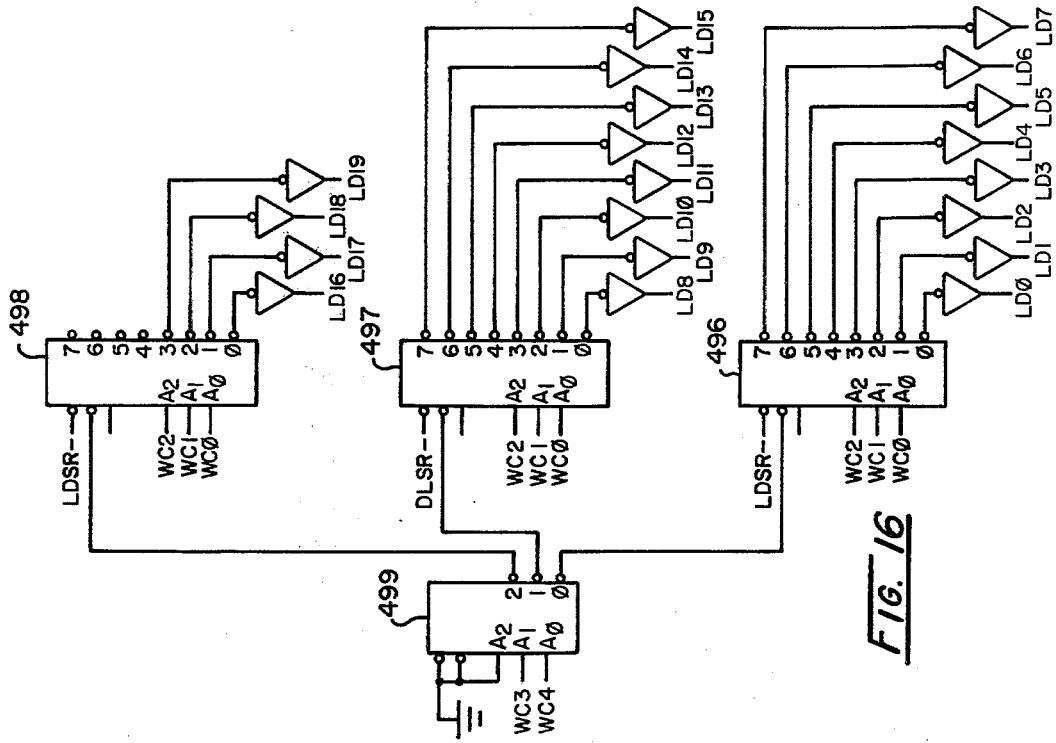

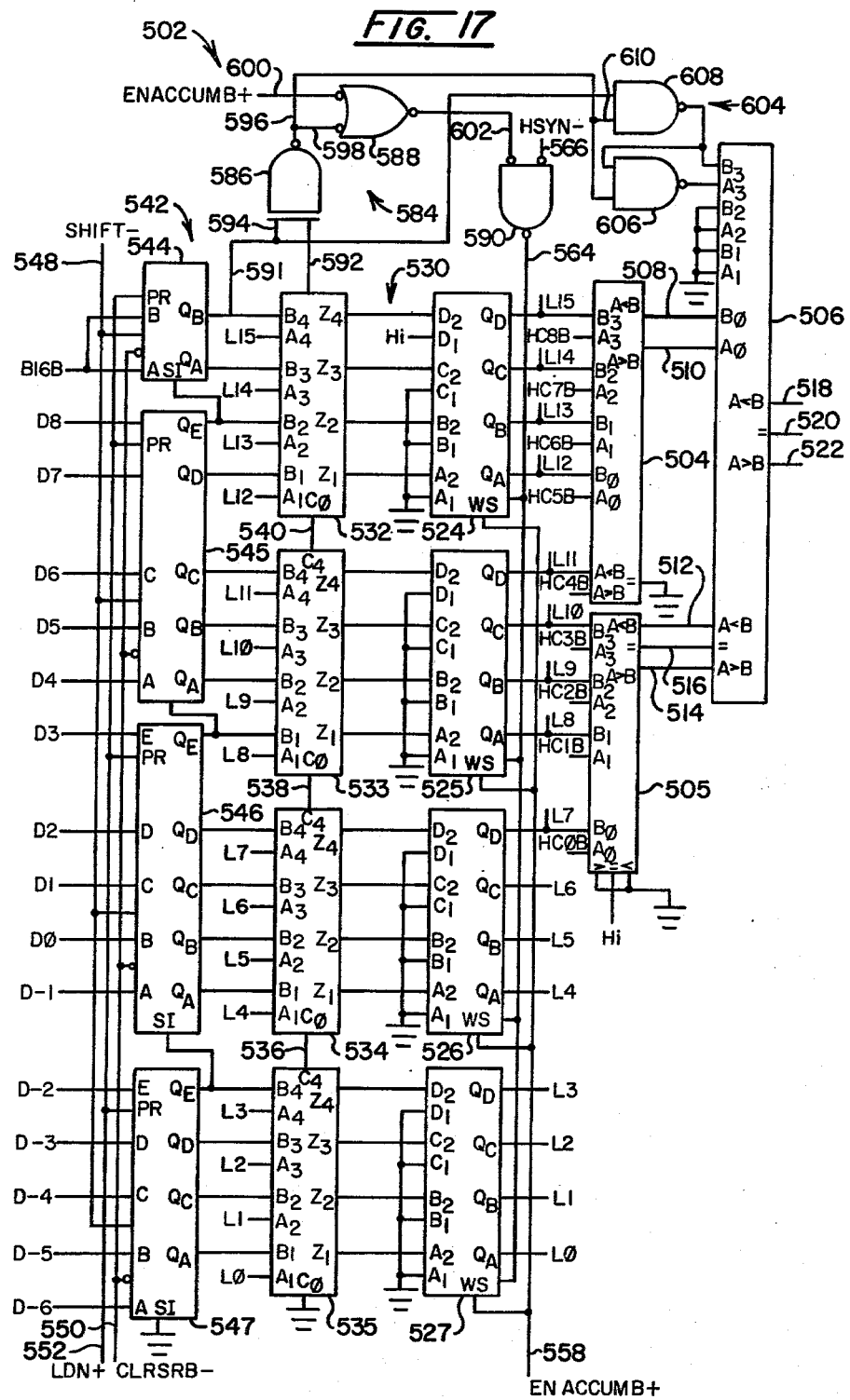

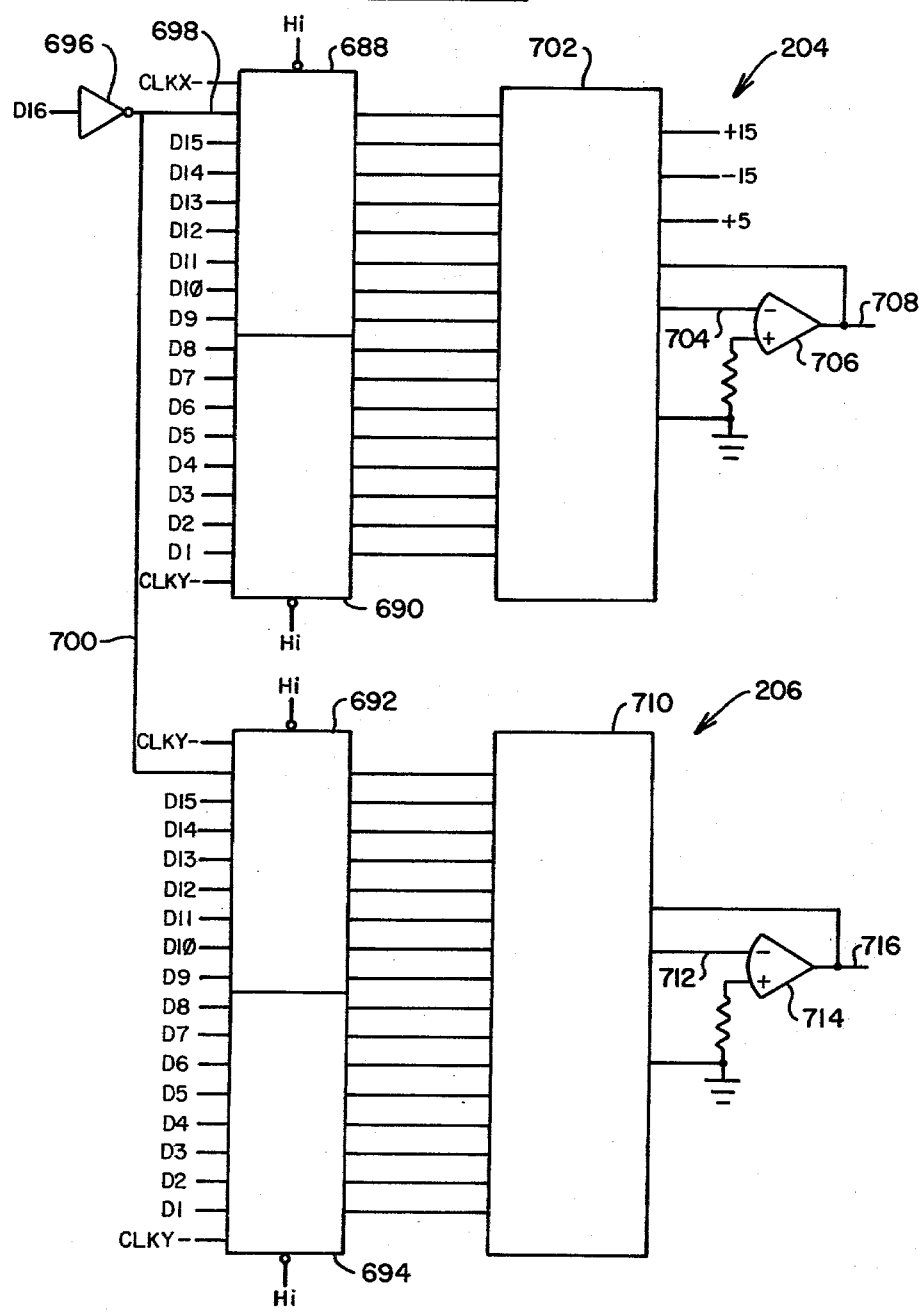

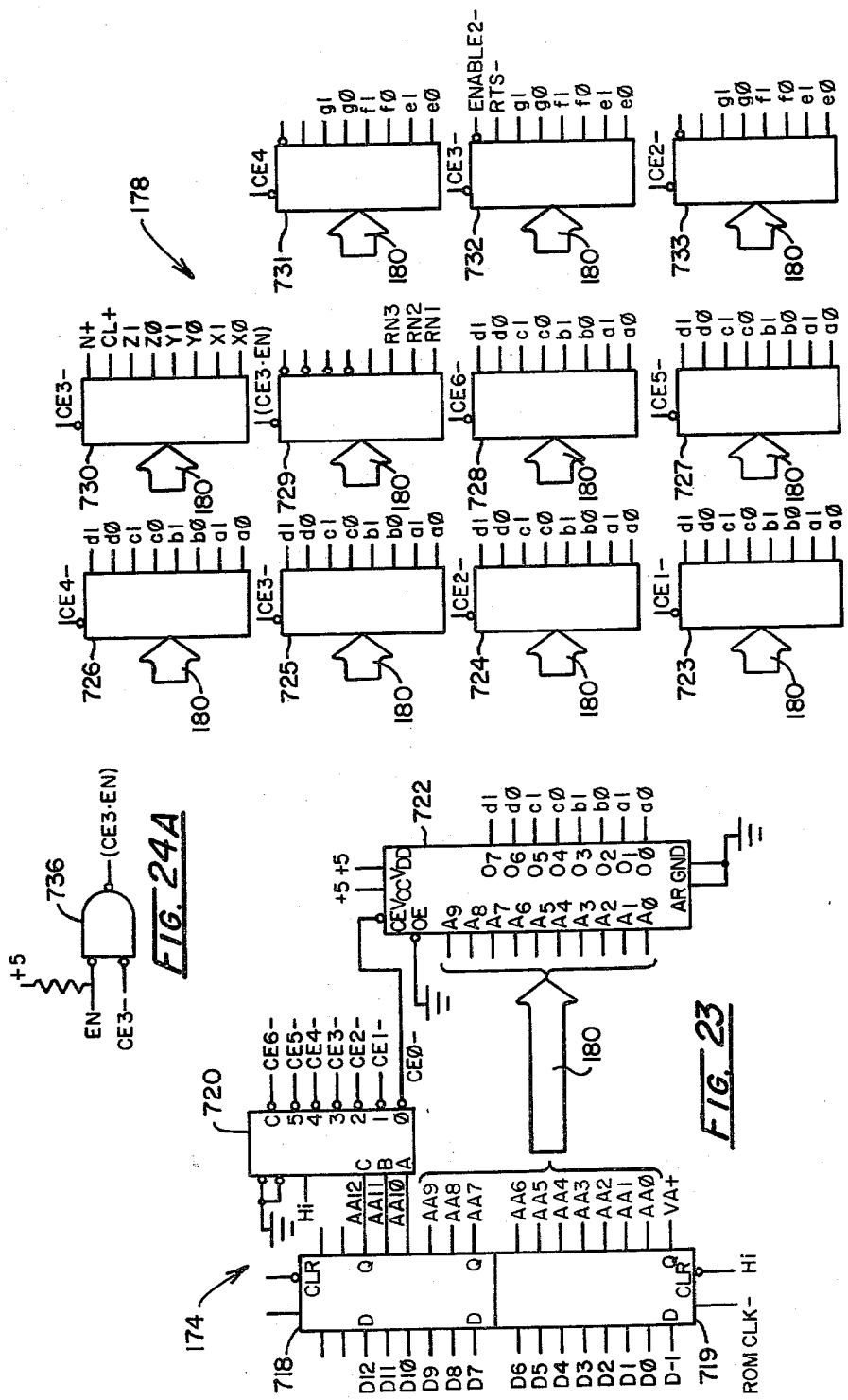

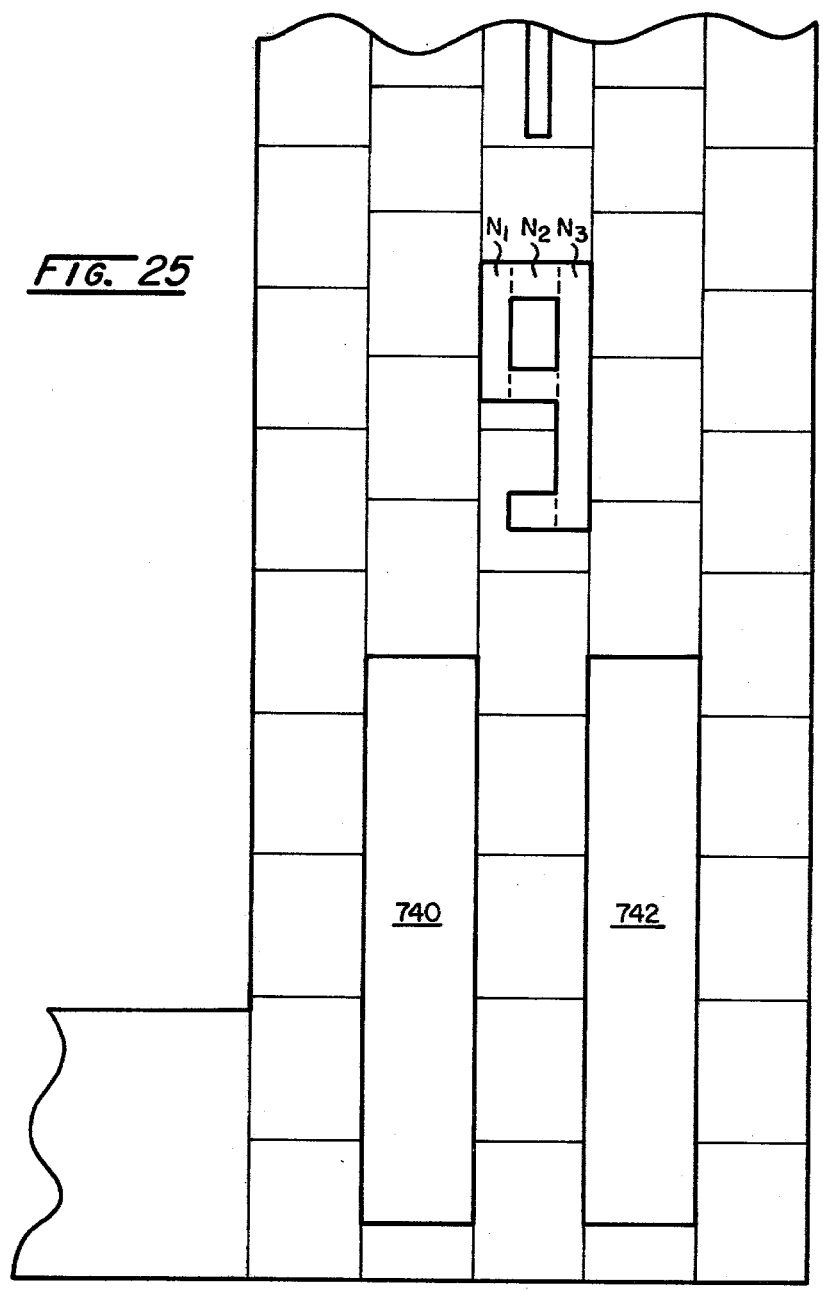

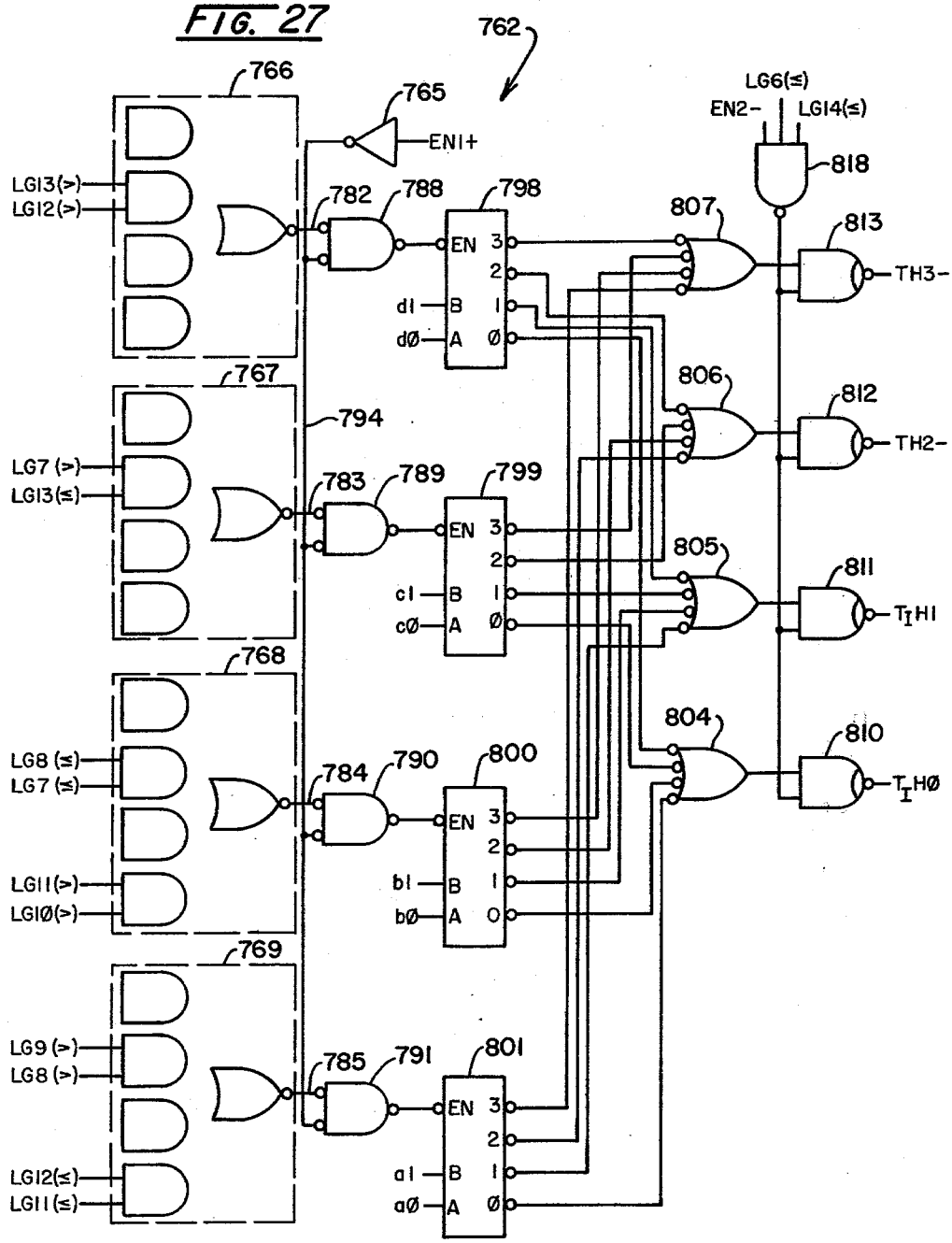

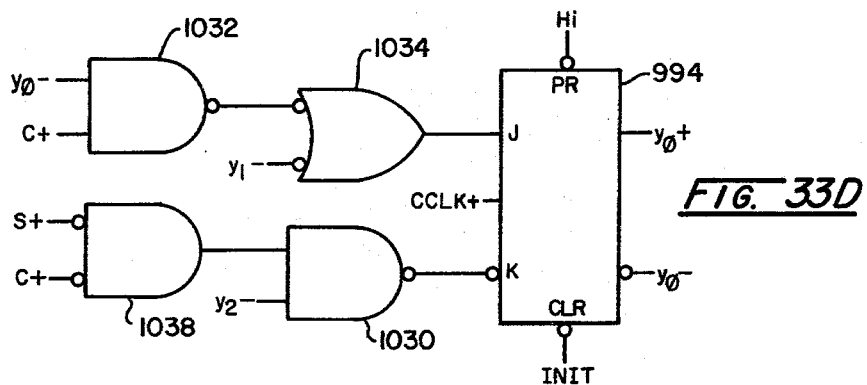
FIG. 33D
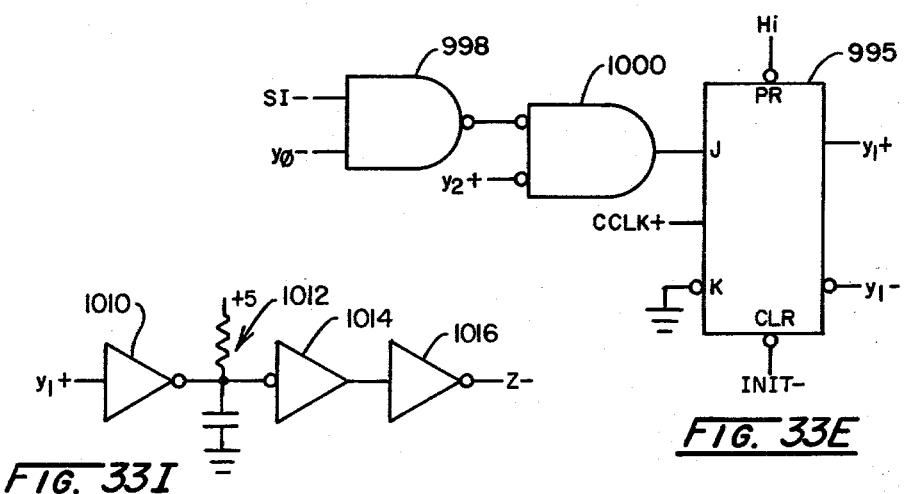
FIG. 33I
FIG. 33E
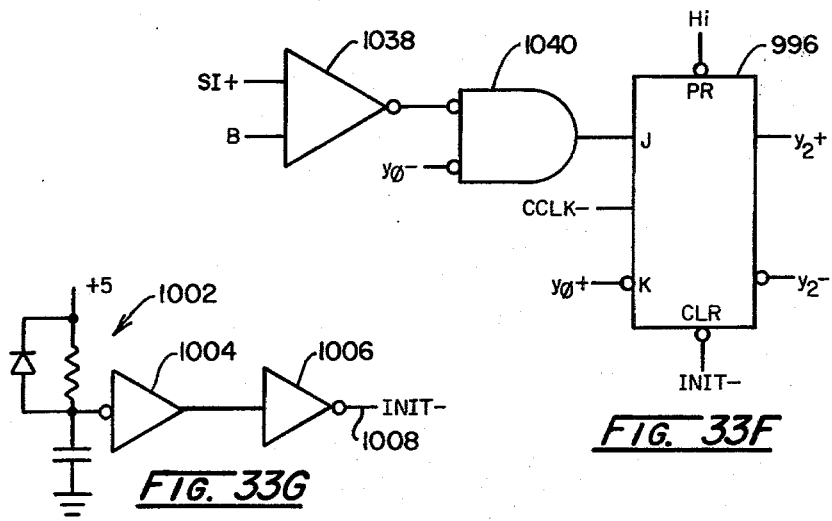
FIG. 33G
FIG. 33F

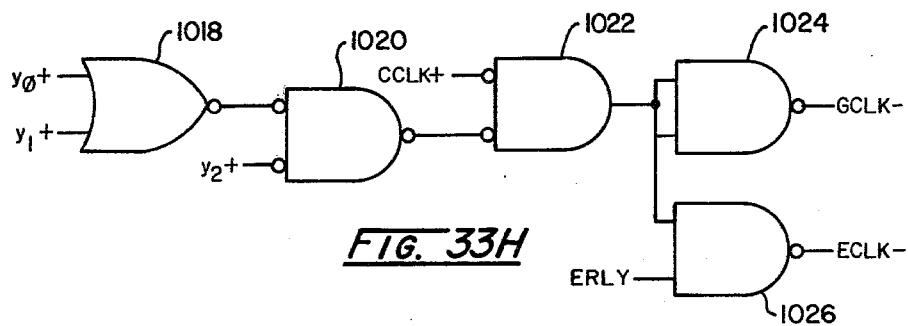
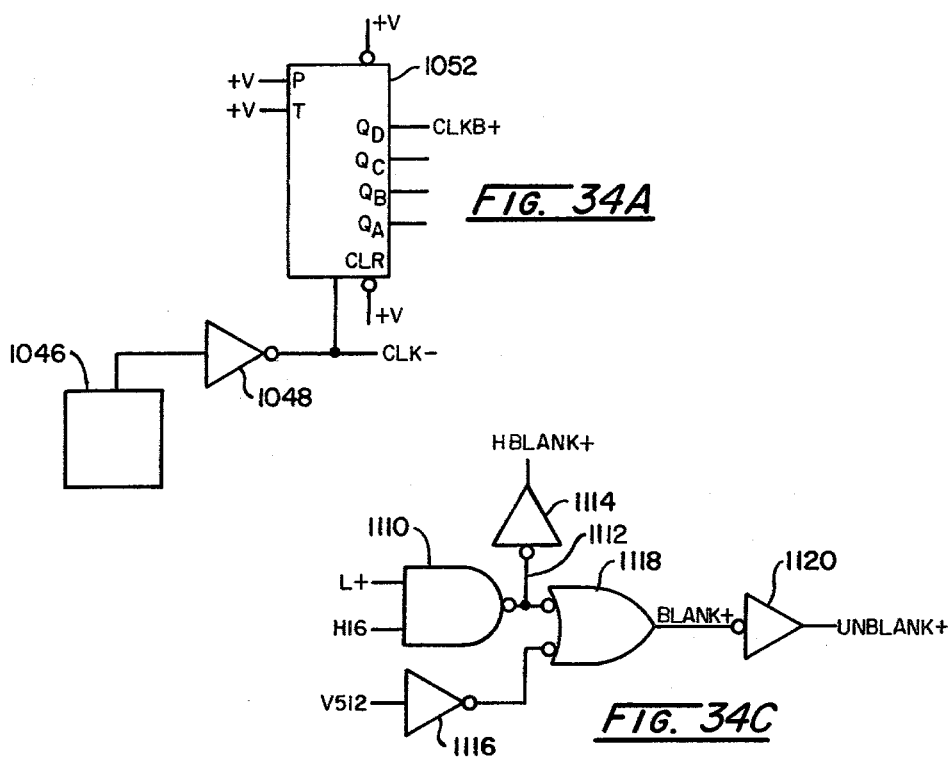
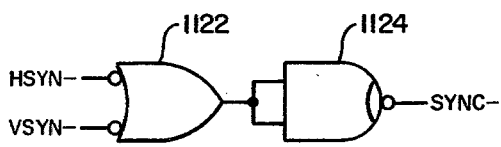

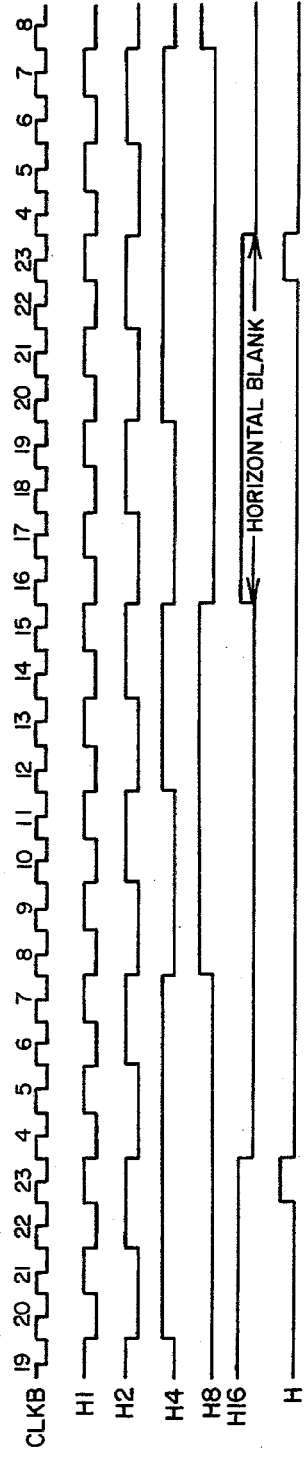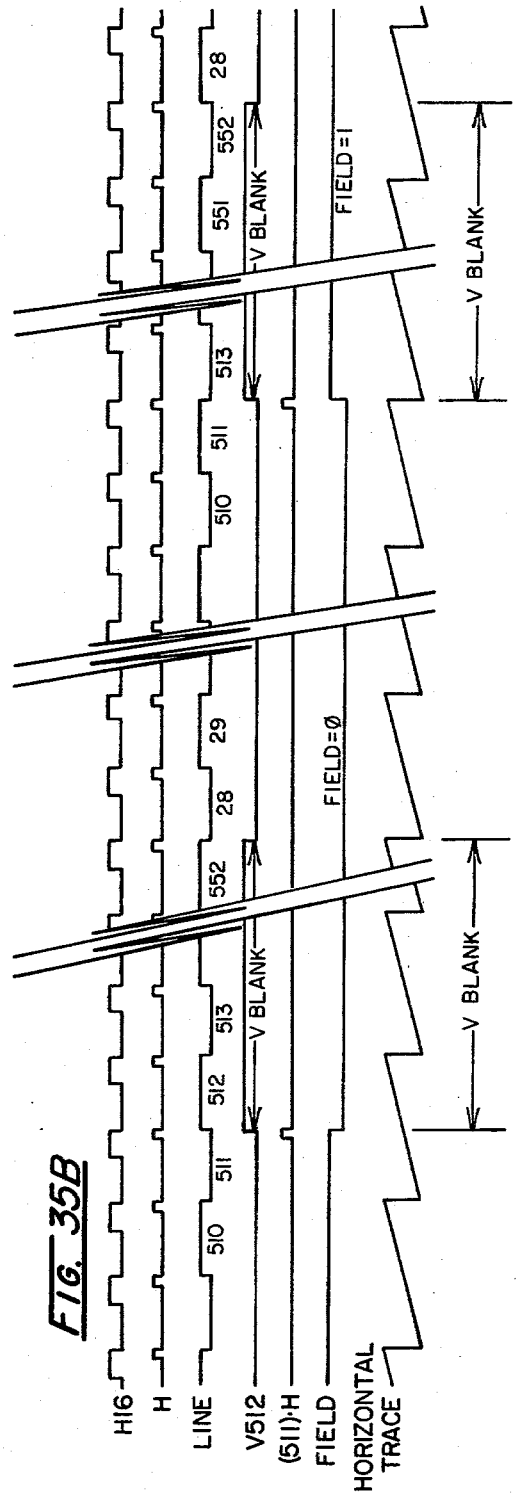
FIG. 35A
FIG. 35B

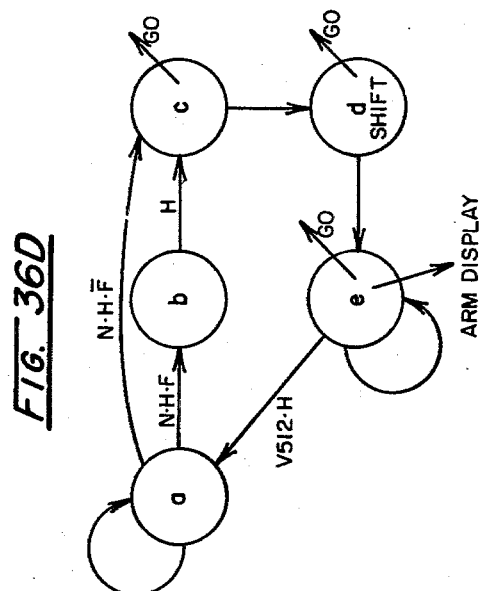
FIG. 36D
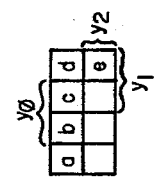
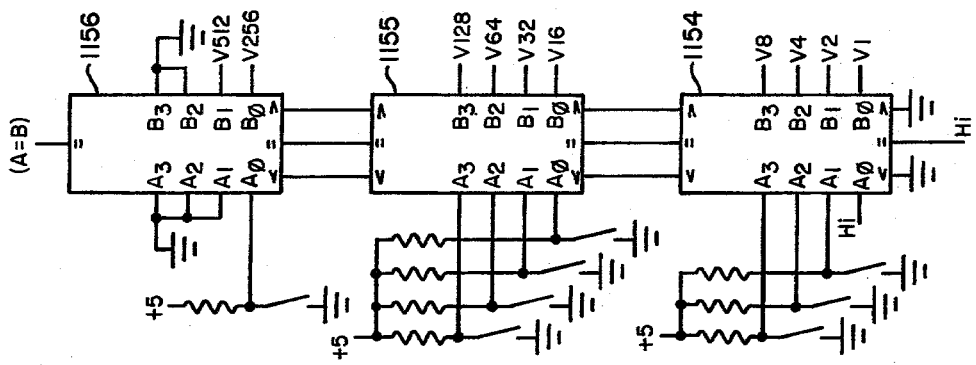
FIG. 36C

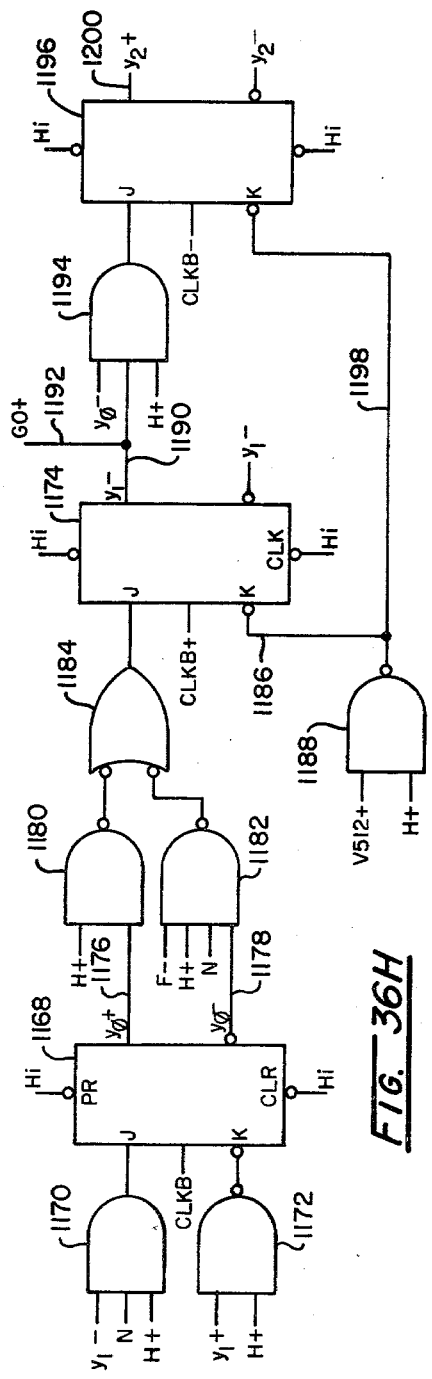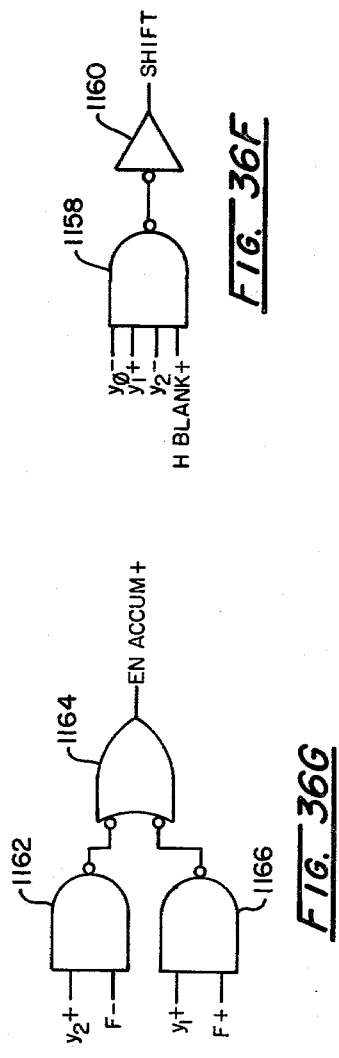

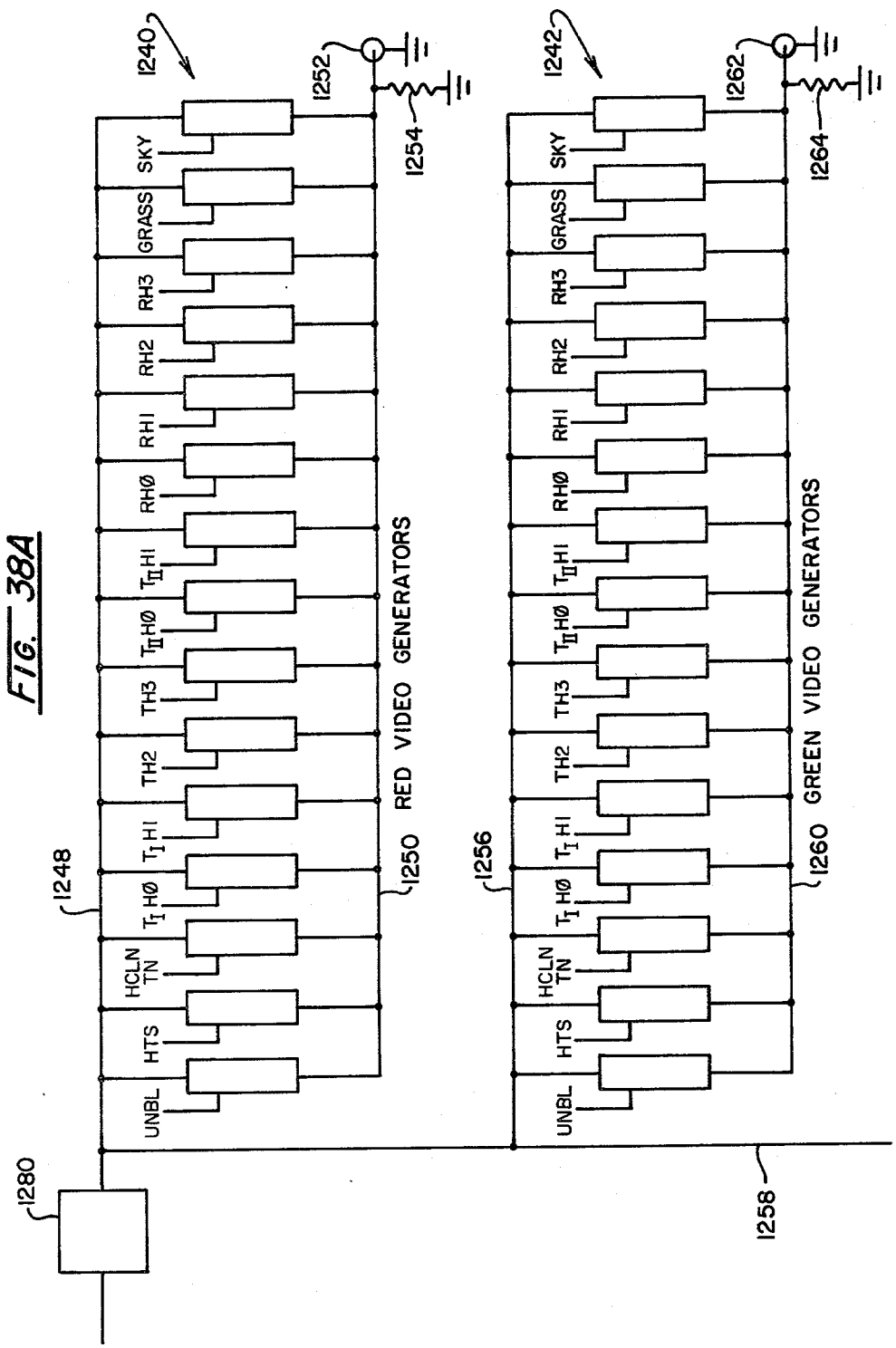

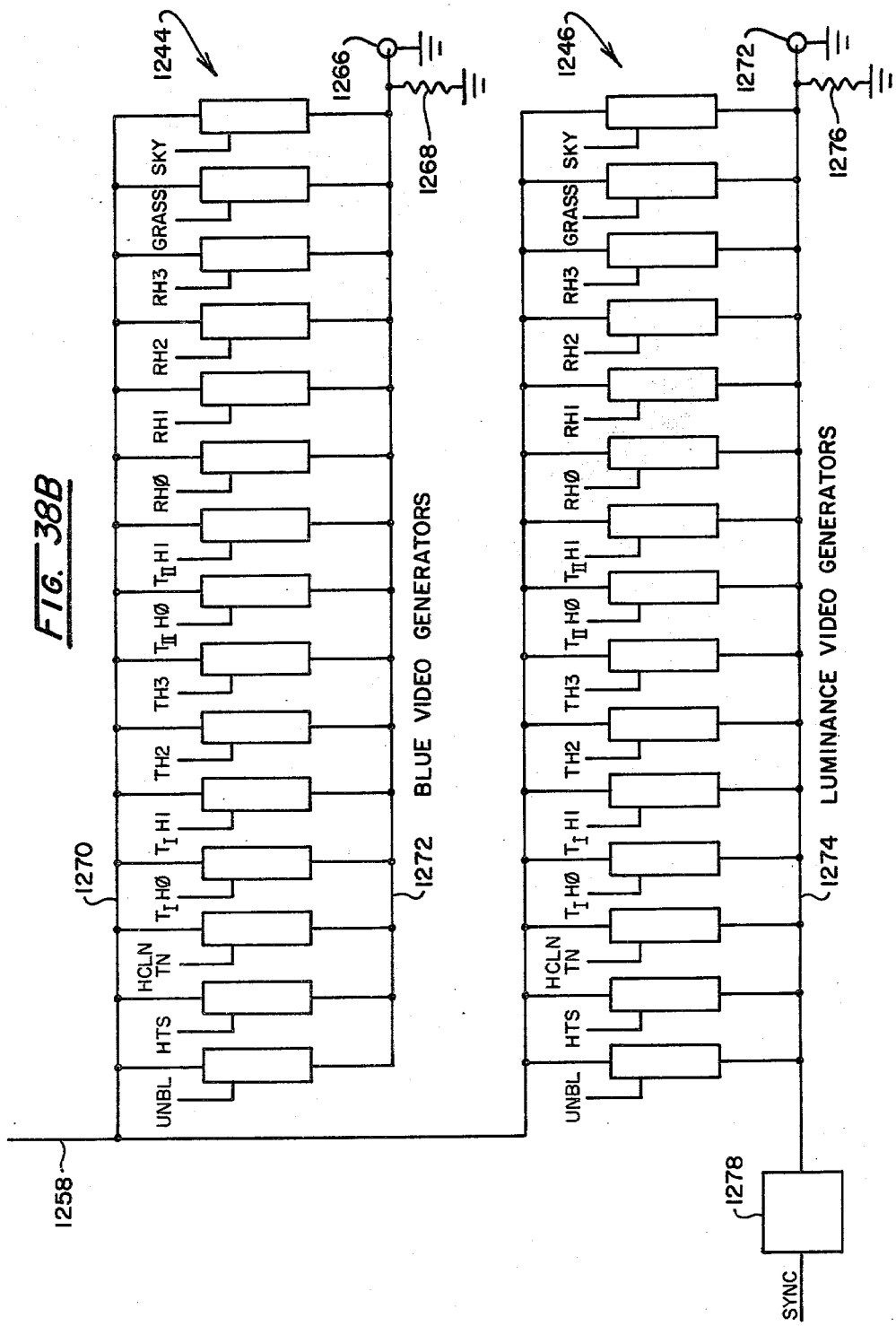

VISUAL CUE SIMULATOR

DESCRIPTION

Background of the Invention

Ground-based flight trainers or flight simulators have been in use in the aviation field for many years and their value has been amply proven. Generally, there are considered to be two generic forms of simulation, engineering simulations and training simulations. Engineering simulation is one which attemps to recreate a condition as faithfully as possible to achieve an evaluation of engineering factors. Consequently, such simulation attempts to achieve as high a fidelity of reproduction of the condition as possible. Training simulation, on the other hand, is designed to facilitate initial skill acquisition as well as proficiency maintenance, and the degree of fidelity required for such simulation has been the subject of scientific inquiry. Concerning this inquiry, there has existed for some time a belief that the greater the fidelity of a simulation for training purposes, the greater the training effectiveness. Thus, for the most part, currently utilized trainers are highly elaborate and complex and, consequently, are available only at relatively high cost. Requisite expenditures for their utilization, therefore, usually are justified only by larger user entities, i.e. commercial aviation, government or larger corporate aircraft owners. For such organizations, these higher costs become justified where a sufficient quanta or pilot performance learned in the trainer transfers to adequate performance in a corresponding aircraft. This has been found to be the case with respect to commercial aviation, somewhat elaborate simulators having been found to lower the cost of pilot training in transitioning from one aircraft model to another or in maintaining skills. For example, where pilots have been required to spend an average of approximately twenty hours of in-flight training to trainsition to a new aircraft, with the advent of simulation, this requirement has been gradually reduced by a factor of five to ten for a variety of aircraft types. While the pilots are required to spend approximately the same number of hours in training, the total time required is actually reduced by reasons of the greater availability of simulators and the elimination of much of the preparation time. The safety factors associated with the elimination of much of the in-flight training time, the release of aircraft for revenue flights and decreased cost of operating a simulator rather than an aircraft for training have provided adequate cost justification for the larger uses operating in conjunction with experienced pilots. See in this regard:

1. "Visual Elements in Flight Simulation", Brown, Aviation Space and Environmental Medicine, Vol. 47, September 1976, pp. 913-924.

While the cost of simulator training is justified in case of pilot qualification for large, complex aircraft, it has been considered prohibitive for applications in general aviation. Given such justification, however, ground-based training facilities would play an important role in primary training within the general aviation field as well as commercial fields. Such simulator training would be of particular advantage in the more difficult phases of flight. In the latter regard, learning to land an airplane represents one of the most difficult phases of training. See in this regard:

2. Creelman, J. A., Evaluation of Approach Training Procedures. Pensacola, Fla.: U.S. Naval School of Aviation Medicine, Report Number 2, 1955.

The land phase of aircraft flight, also, is one of the most dangerous, and after pilot training, remains so even for experienced pilots. See:

3. Young, L. L., Jensen, R. S., and Treichel, C. W., Use of a Visual Landing System in Primary Flight Training. *Proceedings of the 17th Annual Meeting of the Human Factor Society*, Santa Monica, Calif.: Human Factors Society, 1973.

It has been opined that poor definition of important visual cues or the imprecision of the information gained from such cues contributes substantially to the difficulties of learning approach and landing of an airplane. Generally, pilot proficiency in landing maneuvers depends upon perceptual judgements that must be acquired primarily by repetitive practice that is both time consuming and often frustrating, the novice pilot executing repeated landing and takeoff maneuvers being required to expend about six minutes in circling and flying the downwind leg and, of course, such maneuvers also affect control tower operations. By providing a trainer with a final (straight-in) approach and land capability, the novice pilot may execute this most important maneuver with considerable rapidity. Further, the instructor may stop the maneuver at any point and provide explanation of erroneous procedures and the like. For a more detailed discussion, see the following publications:

4. Hasbrook, A. H., The Approach and Landing: Cues and Clues to a Safe Touchdown, *Business and Commercial Aviation*, Nov. 1975, pp. 39-43.

5. Department of Civil Aviation. Flight Instructor's Manual: Melbourne, Australia: Lintern, Publication Number 45, 1967.

Computer generated visual information systems have been developed for a broad range of aircraft training simulation applications. While the majority of such systems have been generated for utilization in the more elaborate installations, for example, use in evolving the visual cues of varied locations with night terrain, developments also have been witnessed in the generation of such visual cue systems for less elaborate installations. One such system is described in British patent specification No. 1446334 wherein a video readout of specific visual terrain cues is provided at the windscreen of a fixed-base training cockpit. The system serves to associate the controls of the cockpit, an electronic logic assembly or computer and the video readout to achieve a visual training simulation. The electronics associated with such computerized systems are called upon to generate by analogue technique a view of simulated terrain with a six degree of freedom capability, for example, signals representative of latitude and longitude, altitude, heading and the attitudes of pitch and roll. The electronic components required to accommodate these six variables are somewhat extensive, the computer components of such prior systems being required to perform cosine-related analogue transformation logic, a task which is quite complex electronically and involves concomitant cost considerations.

Another difficulty inherent in such system resides in the utilization of analogue signals to achieve image transformation. With such an approach to imaging, a finite voltage range is made available for defining such image components as runway and associated terrain extending from the runway. At lower altitudes, when the runway image details are considerably magnified, the system is prone to distortion occasioned by spurious noise signals interfering with the necessarily very small voltages utilized to create image. Additionally, cues other than visual are not available with the system, i.e. motion generated cues associated with, for example, pitch and roll.

Another aspect of visual cue effectiveness concerns the requisite development of visual perspective or depth perception. This perception is developed both by virtue of the parallax of the human visual structure and by the projected shape of the runway. While the latter is the major factor developing this perspective, in trainers, should that shape appear at the training cockpit windscreen then a perspective conflict arises between the shape perspective and binocular parallax effect. To accommodate for this, the elaborate training installations usually employ mirror system to project the virtual image to infinity. While this optical correction is effective, it remains costly, prohibiting its use in the general aviation trainers now contemplated.

Some investigators have considered tht the interactions between the visual system, the proprioceptive system and the vestibular system are of importance. In this regard, it has been considered by some that visual motion in the absence of corresponding physical motion does not evoke a satisfactory cue for training purposes. Physical motion has for some time been incorporated in training devices including those suited for general aviation but not incorporating visual cues and utilized for more experienced pilots in developing instrument navigational capabilities. The motion cue components developed for the more elaborate aircraft trainers operate on the basis that the accelerations of the initiation of a motion pattern are duplicated, but decelerated below the threshold for motion detection before the mechanical limits of the simulator are reached. This technique of "washing out" the motion has been considered a successful motion cue. Since humans sense acceleration but not constant velocity, a reasonable solution to the motion simulation problem is achieved within practical cost limitations. For a more detailed discourse concerning the above, reference is made to publication 1 above.

From the foregoing, it may be observed that a need exists for a flight simulator trainer system which can provide both visual and motion cues and which will serve as an effective trainer for the final approach and flare out to landing procedure for aircraft. Further, such a device is needed which is economical to the extent that it can be utilized for training pilots in the general aviation field where severe training cost constraints are present. An effective approach to achieving desirable image quality within the above-noted cost constraints is described in a copending application for U.S. Patent, Ser. No. 006,333 entitled "Flight Simulator With Spaced Visuals" filed Jan. 25, 1979 by the inventors hereof. The system described in that application operaters in conjunction with presently available movable-base type aircraft simulators and provides a screen spaced from the simulator to which the image of a runway is projected from a video projection device. Through the utilization of trainer cockpit movement in roll, pitch and a crab form a yaw, the number of degrees of freedom which otherwise would be calculated by the electronic components of the visual system for a stationary based trainer are reduced by one-half. Further, through a unique geometric analysis developing image transformation logic, the electronics required for horizontal image component generation are greatly simplified, no cosine computations being required. Another salient aspect of the system of the application resides in a visual path geometry which considers all line of sight to the visual display as extending to a vanishing point situated a slight distance above projected horizon at the image screen. By providing image generating transformations based upon this technique, a uniquely inexpensive image generating electronics becomes available through the use of a correspondingly novel pair of line generators which provide image definition of the runway longitudinal edges. Because image components of the thus generated runway are developed using digital as opposed to analogue techniques, the system further is immune from distortion due to spurious noise effects.

Inasmuch as the display surface is mounted a given distance, for example eight feet, in front of the trainer, the earlier-described conflict between depth perception due to shape and that evolved from binocular parallax is avoided. The system described in the application, however, is limited inasmuch as it generates images only for straight-in landing approach simulation, the trainer always being aligned with the centerline of the runway.

Additional, advantageous flight training capabilities would be realized were the improved system described above to be given the additional capability of landing from orientations not aligned with the runway centerline. In this regard, advantage would be gained by providing a capability for flying a base leg and approach turned therefrom for landing. Further, it will be desirable to give such a simulator a capability for flying within a broad area, for example containing several airport locations to which the trainee, under simulation may fly, land and take off again to fly to another airport. Additionally, trainer capability should be enhanced where visual cues are provided which give the pilot being trained a visual indication of his air speed as cued with respect to the movement of textured terrain beside and at the runway image as well as within a reasonable range about the region at which the runway image is positioned. However, all such improvements must meet the principal criterion that system costs to the aviation training industry be low enough to permit a widespread use thereof in general aviation.

SUMMARY OF THE INVENTION

The present invention is addressed to an apparatus, method and system for uniquely simulating visual cues at a display surface spaced from an eye position and which finds particular applicability in the field of flight simulation. In connection with the latter field, the invention is capable of operation in conjunction with presently available movable-base type aircraft simulators to provide visual flight training cues at cost levels commensurate with the needs of the general aviation industry. These necessary lower cost levels are realized in consequence of a series of unique approaches to the visual simulation of a region of terrain in the course of a simulated flight.

When utilized in conjunction with movable base aircraft trainers, the invention is capable of generating visual images properly transformed with respect to simulated altitude and aircraft movement over a wide expense of earth surface, such surface including features, inter alia, representing farm fields, runways and associated runway numbers, touchdown targets and taxiways as well as special terrain aspects closely adjacent the runway. Of particular importance, the simulation provided by the invention permits the development of visual cues related to flight positions off runway center line such that simulated turns and approaches may be made from a variety of positions.

As a feature of the invention, visual motion cues are generated as a video raster displayed at a stationary display surface spaced from the eye position of a trainee a distance, D. For aircraft simulator application, this distance typically is selected as about eight feet in order to eliminate any conflict between depth perception due to shape versus binocular parallax. These visual motion cues are selected to represent portions of a simulated region or subworld having predetermined visual map features which are defined by boundaries extending generally longitudinally outwardly from the trainee eye position. The simulated region further is developed by visual information having boundaries generally transversely oriented with respect to the longitudinal boundaries and these various boundaries and the instantaneous simulated eye positions are identifiable within the system within a simulative coordinate system. The eye position of the trainee is provided a simulative aircraft altitude or height, H which is utilized in image transformation. A computational circuit which may be present as a processor is provided for developing slope signals each representing the slope at the display surface raster of a longitudinal boundary which extends from a vanishing point which is considered that point toward which all longitudinal boundaries extend with respect to the eye position. The slope signals for any given such longitudinal boundary represent a quotient derived as a value representing the transverse displacement within the coordinate system of the subworld of that given boundary from the corresponding instantaneous eye position divided by a value representing height or altitude, H. Accumulative line generators are utilized to generate boundary signals representing these longitudinal boundaries in accordance with their computed slope. The final image is generated from a video processor representing to video information signals which are derived from a circuit which treats a combination of boundary signals and signals generating visual information representing hue and variations in such hue to develop a form of texture in the image helpful to simulation effectiveness.

As another aspect and feature of the invention, geometric relationships with respect to longitudinal boundaries and resultant subworld image shape required for visual simulation from a variety of eye positions has been evolved which uniquely achieves image development without the necessity of computing with trigonometric functions. Only simple arithmetic computations are required for the electronic logic circuitry of the invention. This aspect contributes significantly to a reduction in the cost of the system of the invention.

Another object and feature of the invention resides in the provision of a visual display system and method of the type described wherein, in developing the subworld map defining the image to be utilized, each of the longitudinal boundaries is displaced transversely within that simulated subworld or region from a parallel longitudinally disposed reference line or boundary. $Y_R$, by a select and substantially unique distance, Wn, eye position is located within the coordinate system of the simulated subworld at a position, $Y_A$, the processing circuit is configured to develop each slope signal defining each boundary in correspondence with a quotient of the value, $Y_A - Y_R + Wn$, divided by a value representative of the simulated height or altitude, H, of the eye position. Inasmuch as the system utilizes a considerable number of slope defining or boundary generation circuits, a technique is provided wherein all such slopes are computed when the horizontal traces of the raster are located above the vanishing point.

Another feature and object of the invention is to provide a system of the type described which incorporates an interlaced raster and which, while maintaining interlacing to improve image acuity, further serves to maintain a stable vanishing point position for image development. Such image development further is improved through the utilization of a shifter network in connection with the line or boundary generation circuits which functions to divide horizontal increment positions from vanishing point in half for the first horizontal trace below vanishing point position.

As another feature and object of the invention, the apparatus and system is capable of operating in conjunction with a relatively large simulative world, for example of about 120 miles on a side which may be divided into subworlds, each containing a runway or principal feature. Various aircraft starting positions are available with the system and a capability resides for landing in positive or negative directions on any given simulated runway as considered from the standpoint of the coordinate system of the simulated world region.

Other objects of the invention will, in part, be obvious and will, in part, appear hereinafter. The invention, accordingly, comprises the apparatus, method and system possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 5A and 5B represent a block schematic diagram of the circuits of the system of the invention;

FIG. 6 is a block schematic diagram of a processing function represented in FIG. 5A;

FIG. 7 is a circuit diagram showing one portion of the control system of the invention associated with the address register shown in FIG. 6;

FIGS. 9A–9D show schematic circuit diagrams of the arithmetic processing units and devices associated therewith of the circuit of the invention;

FIGS. 10 and 11 show subsidiary network components utilized in the processing function of the invention;

FIG. 12 is a tabulation of signal conditions utilized in the processing operation of the invention;

FIGS. 13, 14, 15 and 15A show supportive networks utilized in conjunction with the processing features of the invention;

FIG. 16 is a diagrammatic representation of the line generator enablement control of the invention;

FIG. 17 is a circuit diagram showing one line generator network utilized with the invention;

FIGS. 18, 19 and 20 show schematic diagrams supportive networks utilized in conjunction with the processing features of the invention;

FIG. 22 is a schematic diagram of a digital-to-analog converter used in providing feedback to the trainer control system;

FIG. 23 is a schematic diagram of a ROM address function for texture and runway feature ROMS;

FIG. 24 is a schematic circuit diagram of a texture and runway feature ROM;

FIGS. 24A–24C are schematic diagrams of small supportive networks utilized in developing specific signals and for providing buffering;

FIG. 25 is a pictorial representation of a portion of a runway which is imaged by the system of the invention;

FIG. 27 is a schematic circuit diagram incorporating encoding logic for evolving terrain $T_1$ video information;

FIGS. 33A and 33D–33H are schematic circuit diagrams for deriving a clock control function;

FIGS. 34A–34G are schematic circuit diagrams showing the components forming the timing function of the system of the invention;

FIGS. 35A and 35B are timing diagrams to be read in conjunction with FIGS. 34A–34G

FIG. 36C is a schematic diagram of a comparator network utilized in conjunction with the development of vanishing point position;

FIG. 36D shows a state diagram and associated assignment map utilized in developing a stable position vanishing point definition;

FIGS. 36F–36H are schematic circuit diagrams of components utilized in developing the logic shown in the state diagram of FIG. 36D;

FIGS. 38A and 38B, taken together, show a schematic circuit diagram of arrays of video generators utilized in conjunction with the instant invention.

DETAILED DESCRIPTION

Figure 1:
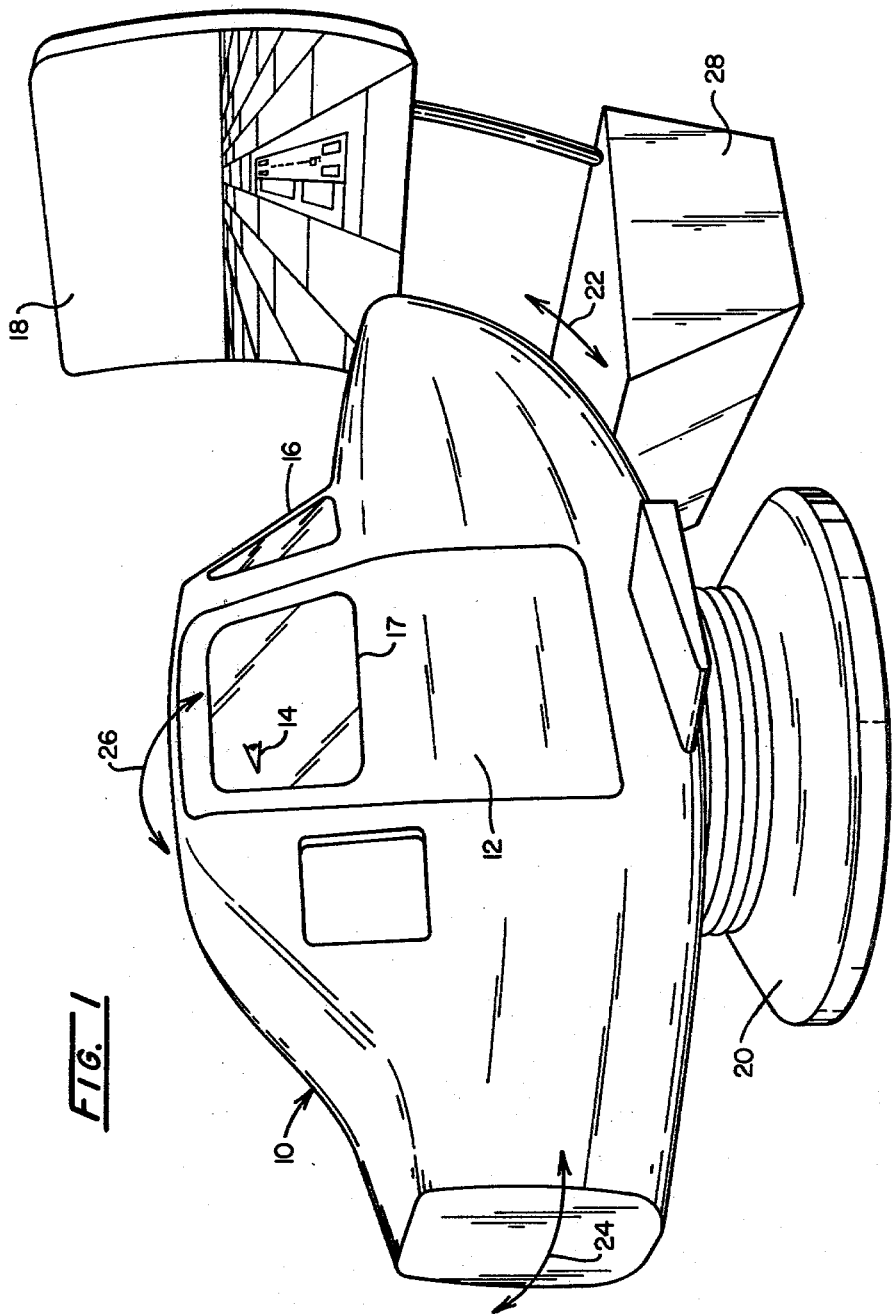
FIG. 1 is a perspective view of the system of the invention showing the location of a general aviation trainer, display surface and projective television receiver.

The simulation system of the present invention is one wherein images such as terrain and runway are generated at a fixed screen spaced a predetermined distance from an eye position, for example, within a conventional general aviation trainer having a supportive base movable in roll, pitch and crab-type rotational attitudes. Looking to FIG. 1, such an arrangement of components is portrayed schematically. The trainer cockpit component 10 may be one typically used in general aviation instrument training, for example model GAT-1 marketed by the Singer Company, Link Division, Binghamton, New York. Trainer 10 incldues an access door 12 through which the trainee may enter and sit within a cockpit having controls simulating those within an aircraft utilized in general aviation. The trainee sits within the cockpit in a manner wherein eye level or position is about at the location shown at 14. Thus located, the trainee looks through a simulated windscreen 16 and/or side window as at 17 in the direction of a relatively large projection screen 18. The cockpit of trainer 10 rests upon a movable base 20 which provides motion in pitch, roll and yaw attitudes in response to the control asserted by the trainee within the cockpit. The pitch component of this rotative motion about the pivot axis of the trainer is represented by the curved arrow 22, yawl by curved arrow 24 and roll by curved arrow 26. In front of trainer 10 there is positioned a projection-type television receiver 28. Video image projector 28 may be of conventional variety and is mounted, as shown, in isolation from trainer 10 such that the motion in pitch, roll and yaw rotational attitudes does not affect its positioning.

With the present invention, as the trainer 10 moves, the trainee, whose eye is at position 14, observes a terrain image at screen 18 as projected from a TV projector at 28. Depending upon the rotational orientation of trainer 10, the trainee observes screen 18 from windscreen 16 directly before him and/or side windows as at 17. The image development features of the invention permit the flight simulation to carry out such maneuvers as base leg flying, turn to final approach and landing as well as taxiing upon the runway and subsequent take-off procedures. During such maneuvers, the motion of trainer 10 itself provides cues with respect to roll, pitch and yaw, while the control system of the invention carries out appropriate transformations to generate a proper image at screen 18. In the course of this generation, the horizon at screen 18 remains fixed, while the terrain features alter with respect to simulated altitude, aircraft position and speed.

Figure 2:
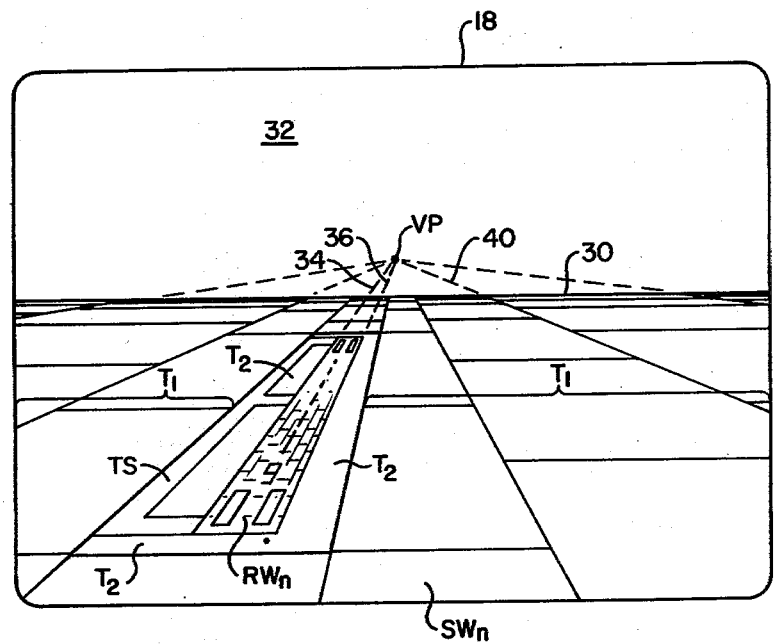
FIG. 2 is a pictorial representation of an image generated by the system of FIG. 1 for a simulated position off the center line of a runway.
Figure 3:
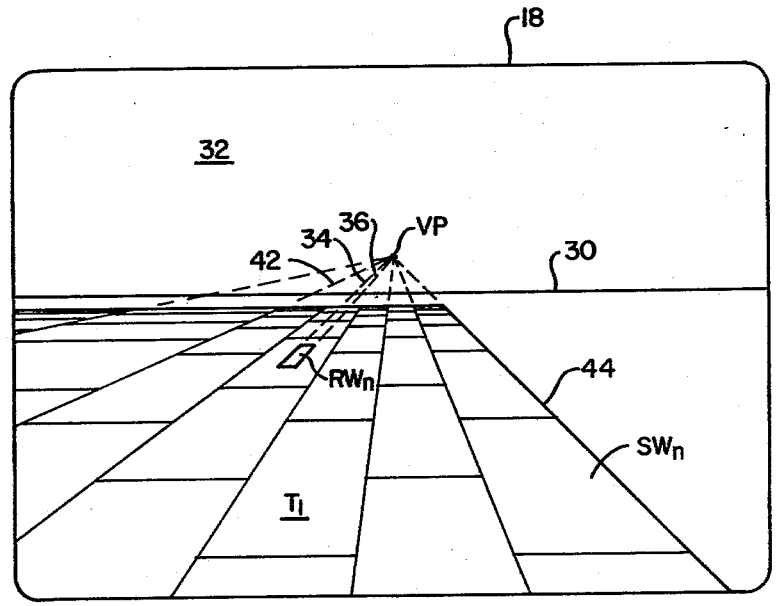
FIG. 3 is another image generated by the system of the invention showing image generated at higher altitudes and distances from a runway and revealing subworld boundaries and taxiways.

Looking additionally to FIGS. 2 and 3, a more detailed representation of the image projected to screen 18 is revealed. The image displayed will provide a horizon, represented by line 30, which is horizontal, stationary and generally extends across the midpoint of screen 18. The system and method of the invention operates in conjunction with a predetermined vanishing point which is not displayed but which is positioned being a slight distance above horizon line 30 and, preferably, is computationally centered on screen 18. Above horizon line 30 in the region designated 32 the image is one depicting the sky, while below line 30, terrain image is generated in accordance with the flight parameters of the simulator system. The image generated is one based upon the premise that all longitudinal lines perceived from eye position 14 will converge at infinity toward a vanishing point, VP. Thus, the image generated may be one formed of corresponding boundaries or lines extending from vanishing point, VP, the slope of these boundaries being dependent upon the position and altitude of the aircraft or eye position. Image definition is completed through the development of image information extending between the boundaries and the combined information is developed to achieve a texture effect depending upon the accuracy of visual cueing required. Looking particularly of FIG. 2, note that the outer longitudinal edges of a runway, $RW_n$, are defined by two generated boundaries represented by lines 34 and 36 emanating from vanishing point, VP. These representative lines are invisible on screen 18 where they are shown in dashed form and are defined by boundaries at such positions below horizon 30 wherein runway taxiing or terrain boundaries are shown. A significant number of such boundary definitions are generated from vanishing point, VP, to define several features necessary for visual cueing, for example, the dashed center line strip of the runway at 38 is established, inter alia, by two spaced generated boundary lines. Similarly, within the region of the runway itself, generated "lines" as established by boundaries on each side of the center strip 38 are utilized to define regions of different texture of the hard surface of the runway. Such "lines" also are utilized to define the corresponding longitudinally oriented boundaries of the runway numbers, shown for illustrative purposes in the figure as "9". Such features are optional at the desire of the designer, and additionally, may include a terrain surrounding the runway itself, designated $T_2$. This terrain $T_2$ image may be formed to simulate the texture of mowed grass which may be found to be valuable in developing motion cues at the critical point of landing just prior to touchdown. Outwardly of the surrounding terrain, $T_2$, is a more coarse terrain designated $T_1$ which is formed inter alia of generated lines, one of which is revealed at 40. These lines may be so spaced as to resemble farm fields or the like generally encountered under typical flight conditions. The images of these fields are randomly dispersed within the terrain, $T_1$, and the coloration or hue thereof may be selected to provide a variety of colors as commonly encountered in farm regions.

Note that the image in FIG. 3 is one wherein the aircraft simulated altitude is about 500 feet and its position is off of the center line of runway, RW. Accordingly, the view shown in the figure may be one seen either from the front window 16 or one side window as at 17 of trainer 10 depending upon the navigational course being flown.

Looking to FIG. 2, the image projected to screen 18 is one wherein the simulated trainer 10 altitude and distance from runway, RW, are more extensive, this representing a position from the runway of about five miles and an altitude of about 2,000 feet. Generated "lines" 34 and 36 defining the longitudinal edges of the runway now show a very narrow and small image of the runway. Additionally, terrain, $T_1$ is visually predominant by virtue of the aircraft altitude and position and is limited in extent, for example by border "lines" 42 and 44. Note the taxi strip, TS. The latter "lines" define the borders of a subworld, SW, having dimensions of about 7 miles along "lines" 42 and 44 and about 3½ miles in a lateral direction as scaled for the presentation at screen 18. A plurality of these subworlds, SWn, are provided by the system within each of which there is positioned in runway. Accordingly, the trainee is provided the capability of flying from one runway to another within a relatively large expanse of simulator territory. Those regions of terrain beyond subworld, SWn, preferably, are generated having green coloration representing grass, inasmuch as such regions have somewhat dismissible importance from the standpoint of providing necessary cues to enhance pilot training.

Figure 3A:
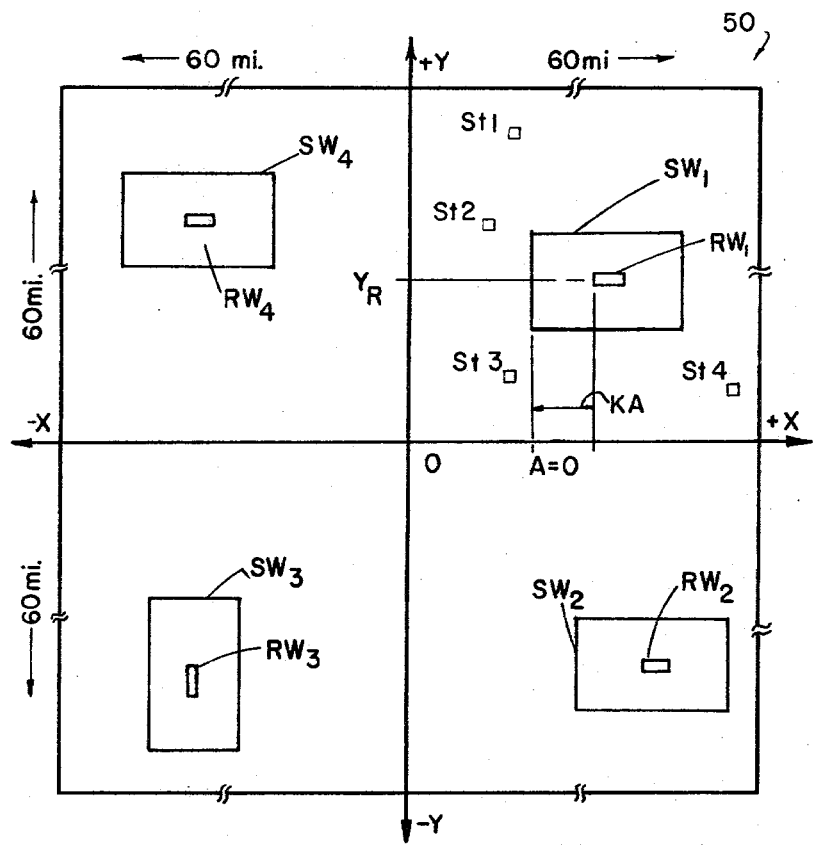
FIG. 3A is a map type diagram of a world and subworld showing typical orientations of visual objects as they are represented in a coordinate system.

Turning to FIG. 3A, a schematic representation of a world in which simulation may be carried out in conjuction with trainer 10 at screen 18 is shown generally at 50. World 50 is segmented by Y and X axes which intersect at an origin, O. Each quadrant of the world 50 is formed having predetermined convenient dimensions, for example 60 miles along both the X and Y axes. Within world 50 are positioned a desired number of subworlds, SWn within each of which is positioned a runway, RWn. For illustrative purposes, one such subworld is positioned within each quadrant of world 50 as represented by $SW_1$–$SW_4$. Correspondingly, the runways are positioned within each subworld as represented, respectively, at $RW_1$–$RW_4$. With the system of the invention, the runways, $RW_1$–$RW_4$ should be so positioned within the subworld such that their center lines or longitudinal axes are aligned with either the X or Y axes. As indicated above, the trainee, under simulation, may fly from any given subworld to the other and land at the associated runways therein. As another feature, landing or taking off from the runways may be from either end, for example, simulated landings may be in either the +X or -X direction with respect to runway, $RW_1$. Similarly, oppositely oriented take-offs and landings may be provided in connection with the remaining subworlds. Within the world 50, the simulated aircraft position is defined by the overall X and Y coordinates, and at the commencement of any training routine or procedure, the simulated aircraft may be given any of four arbitrarily designated starting points for a preselected subworld and with respect to a designated direction of approach toward the runway. For example, for runway, $RW_1$, four starting points, St1-St4 are shown in FIG. 3A.

As will be described in detail later herein, the simulator system also utilizes read only memory (ROM) facilities for providing image data which operates in demand fashion with positions of the raster trace developing an image at screen 18, particularly as that trace is located below vanishing point, VP. This trace position, designated y, will be seen to represent a demand input for developing a table look-up treatment at the ROMs. FIG. 3A shows the zeroeth address location, A=0 for each of the subworlds, $SW_1$-$SW_4$ as well as the corresponding location of runway threshold from that address, designated, KA. The geometric analysis to follow will be seen to be carried out in connection with subworld, $SW_1$ and runway, $RW_1$.

Figure 3B:
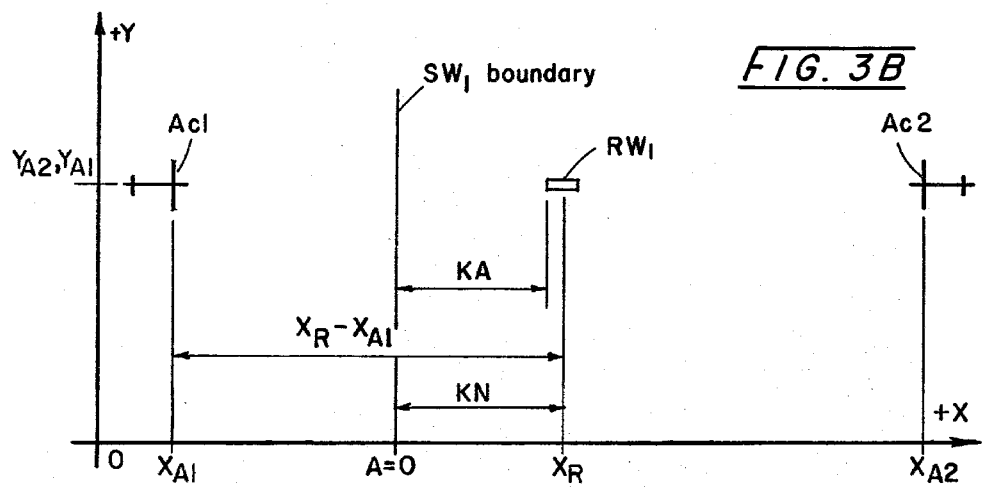
FIG. 3B shows the diagrammatic positioning of aircraft within a coordinate system utilized by the invention along with the designation of pertinent dimensions and positions.

Referring to FIG. 3B, a plan view diagrammatic representation of subworld, $SW_1$ and runway, $RW_1$ is shown for the purpose of providing an illustration of the geometric designations utilized in the discourse to follow. Two schematic simulated aircraft are represented in the drawing at Ac1 and Ac2 as these aircraft approach runway, $RW_1$, respectively, toward the +X and -X directions. The figure shows that aircraft Ac1 is positioned having coordinates $Y_{A1}$, $X_{A1}$, while aircraft Ac2 is positioned at coordinate $Y_{A2}$, $X_{A2}$. The midpoint of runway, $RW_1$, is positioned at $X_R$; $X_R$ is located a distance KN from zeroeth address, A=0 and a distance, $X_R$-$X_{A1}$ from aircraft Ac1. Further, the threshold of runway $RW_1$ is positioned a distance, KA from address position A=0.

Figure 3C:
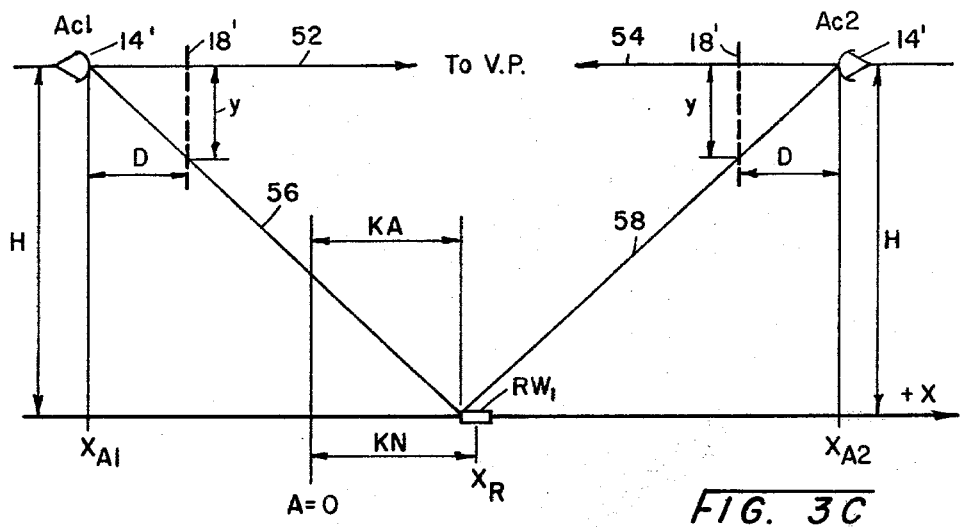
FIG. 3C is a diagram utilized in developing mathematical relationships utilized by the system of the invention.

Looking to FIG. 3C, the vertical locations of aircraft, Ac1 and Ac2 are represented by the eye positions shown, each eye position being assigned an altitude, H. In accordance with the theory whereby a geometric transformation is developed between the world map 50 and the raster evolving the image at screen 18, the eye positions at aircraft Ac1 and Ac2 look toward a vanishing point, VP, respectively, along sight lines 52 and 54. These sight lines, now represented at 14', are shown intersecting the image screen 18 of the system, as indicated by vertical dashed lines 18'. As discussed in the above-identified application for U.S. Patent by the instant inventors, by so approaching the geometric analysis of the simulation system, the electronic treatment of information becomes one not requiring resort to calculations incorporating trigonometric functions. This considerably simplifies the electronic circuitry called upon to provide accurate image information. In the latter regard, the distance below the vanishing point as represented by sight lines 52 and 54 is designated as, y, while the distance from the sighting points 14' to screen 18' is represented by the fixed amount, D. Considering an exemplary sighting path for example, to the threshold of runway, $RW_1$, such paths may be provided at 56 for aircraft Ac1 and at 58 for aircraft Ac2.

To develop the memory address position for a given point, here shown as designated along the X axes, for use in conjunction with any given value of a raster beam position, y, a straightforward relationship of similar triangles may be observed. For example, in the case of eye position 14' for aircraft Ac1, the following relationship obtains:

$$\frac{H}{X_R - X_{A1} - KN + KA} = \frac{y}{D} \qquad (1)$$

In equation (1), the term, K, is a conversion (resolution) constant which will be seen to be given a dimensional designation, for example five feet in the discourse to follow. The distance from the zero address, A=0 to the selected point, i.e. runway threshold for the instant analysis becomes:

$$KA = \frac{DH}{y} + X_{A1} - X_R + KN \qquad (2)$$

Note from equation (2), that, at higher simulated altitudes, H, the value of the address, KA correspondingly is large and this additionally holds for small values of the term, y. This relationship between the address number, altitude and raster trace position will be seen to be of considerable benefit with respect to terrain image generation.

Now, considering the generation of image with respect to movement in a -X direction as from aircraft Ac2, a straightforward similar triangle analysis from FIG. 3C provides the following expression:

$$\frac{H}{X_{A2} - X_R + KN - KA} = \frac{y}{D} \qquad (3)$$

Solving expression (3) for the address number, KA, provides the following equation:

$$KA = \frac{-DH}{y} + X_{A2} - X_R + KN \qquad (4)$$

As in the case of equation (2), equation (4) represents a treatment of parameters readily carried out electronically.

The next computational consideration to be made looks to the transformational geometry associated with developing a proper image for the most typically encountered simulation conditions wherein the direction of travel of the aircraft is not aligned with the centerline of any given runway. For the system at hand, it becomes necessary to compute the displacement of any given image increment for such an off-center line condition as well as a version of the slope of a generated "line" or boundary extending from the vanishing point to that image increment. Looking to FIG. 3D, a schematic representation of screen 18 is provided showing the location of the vanishing point, VP, as well as horizon 30. The term, y, is shown in the figure extending from the vanishing point horizontal level to an image increment, P. Similarly, a generated line 60 is shown extending from the vanishing point through the image increment, P, while the latter increment also is shown spaced a horizontal distance, wos, from a line vertical with respect to horizon line 30 and passing through the vanishing point. This represents a width on the screen 18 (wos).

Figure 3E:
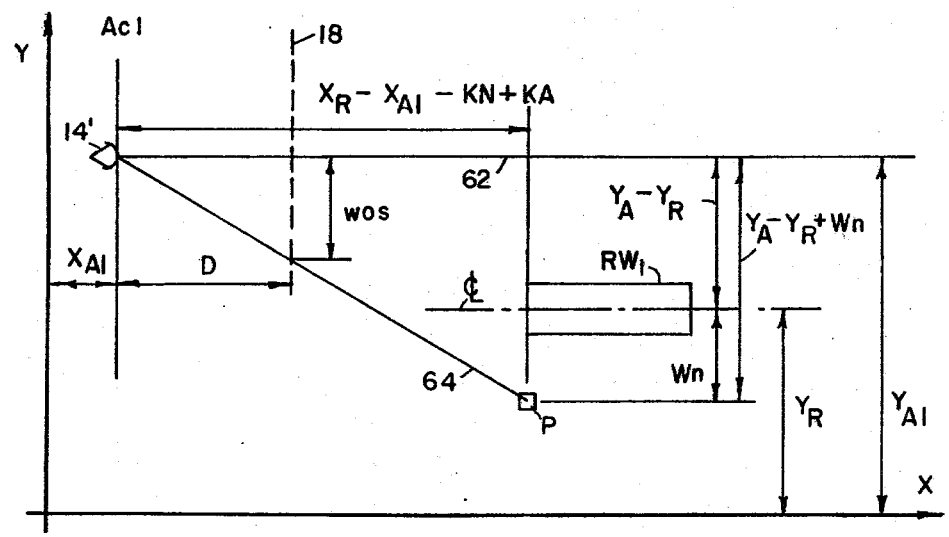
FIG. 3E is a diagram utilized in developing slope related data utilized by the invention.
Figure 3D:
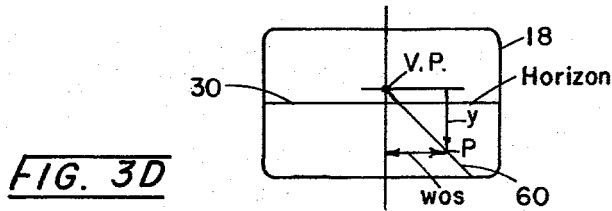
FIG. 3D is a schematic view of a raster showing pertinent positions and identifying alphabetical designations utilized in the image transformation developed according to the system of the invention.

Turning to FIG. 3E, an exaggerated plan view of subworld, $SW_1$ and runway, $RW_1$, as viewed from aircraft position Ac1 at eye position 14′ is revealed. Additionally, the figure shows the location of the image increment, P, within the subworld terrain which, for exemplary purposes only, is aligned with the threshold of runway, $RW_1$, and displaced therefrom. Further, the horizontal projection toward the vanishing point, VP, from eye position 14′ is reproduced as a line 62. Additionally, extending from eye position 14′ is a sight line 64 which, along with sight line 62 intercepts the dashed line representation of screen 18, such screen again being positioned a distance, D, from eye position 14′. Aircraft Ac1, as before, is represented having a coordinate position within world 50 of $X_{A1}$, $Y_{A1}$, while the image increment, P, is positioned a distance, Wn, from the center line of runway $RW_1$, such that the center line having coordinate, $Y_R$ and being spaced a distance, $Y_{A1}-Y_R$ from the sight line 62 extends to the vanishing point. (See also, FIG. 4) The latter relationships then provide that the image increment, P, is spaced from vanishing point sight line 62 a distance $Y_A-Y_R+Wn$. Returning momentarily to equation (1), the distance from sighting point 14′ to the threshold of the runway may be designated as: $X_R-X_{A1}-KN+KA$.

With the above geometrical relationships established, the determination of slope, S, required for the instant system becomes:

$$S = \frac{was}{y} \quad (5)$$

Note that the slope, S, as used herein represents the reciprocal of the usual definition of slope.

Considering the similar triangles in evidence in FIG. 3E, the terms, wos, and y, may be replaced in equation (5) to derive the following expression:

$$S = \frac{\frac{(Y_A - Y_R + Wn)}{X_A - X_{A1} - KN + KA}}{\frac{DH}{X_R - X_{A1} - KN + KA}} \quad (6)$$

Equation (6) above may be reduced to the following expression:

$$S = \frac{Y_A - Y_R + Wn}{h} \quad (7)$$

As is apparent, equation (7) represents a summation and division readily carried out electronically.

The system and method of the invention utilizes equations (2) or (4) and (7) for the purpose of defining terrain image below horizon 30. This is carried out by computing the slopes 4 and imaging each of a plurality of the above-noted generated boundaries extending from the vanishing point, VP, as well as by defining terrain texture intermediate those generated "lines". This texture is developed by drawing upon incremental terrain information extending across the raster image (transversely to the runway center line) from read only memories (ROMs). An address for each transverse terrain increment is developed as described above through utilization of equations (2) or (4). The terrain information held in the ROMS is valid for a predetermined map distance, for example, five feet within any of the subworlds SWn.

Figure 4:
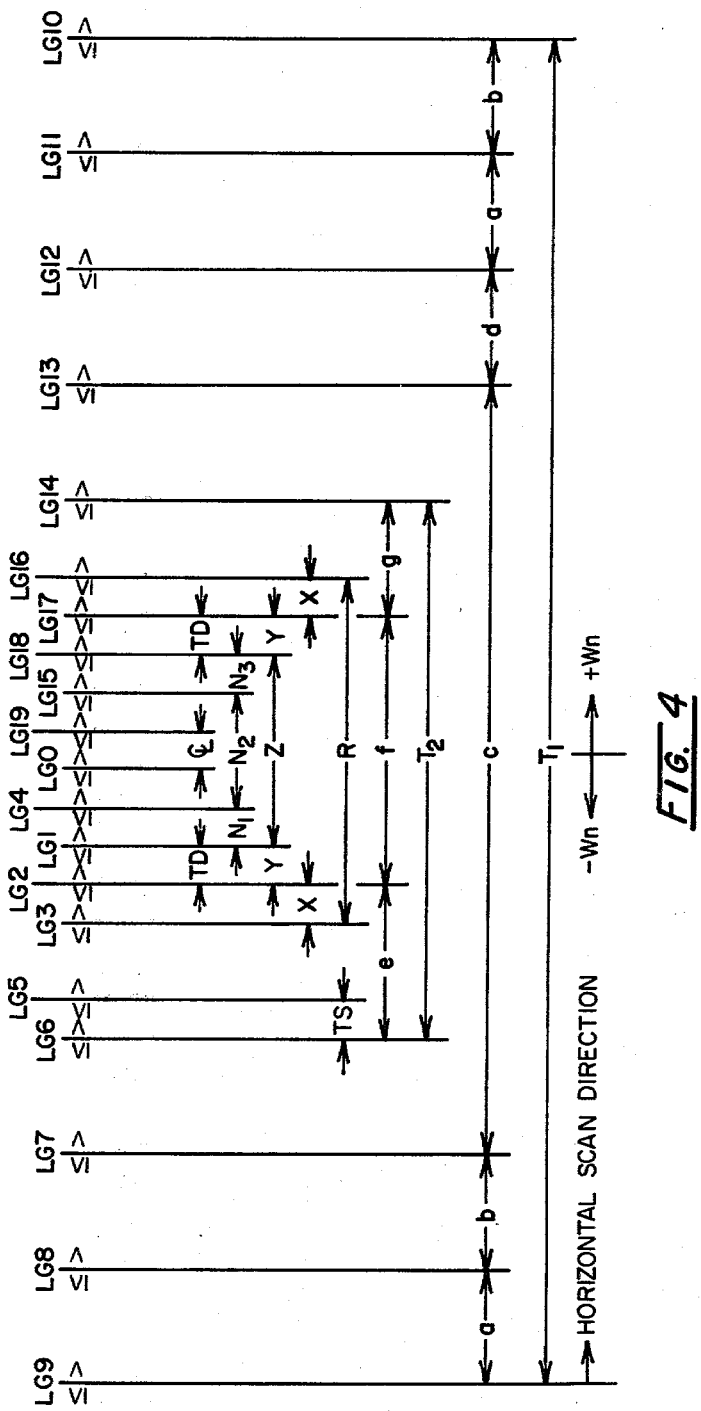
FIG. 4 is a diagram showing the identification of generated "lines" or boundaries utilized in developing the images simulated by the system of the invention.

With the approach, the memory information is developed for the particular features with any one of the given subworlds. Referring to FIG. 4, an exaggerated position diagram of the terrain increments, the texture of which is defined by the addressed read only memories is provided. Commencing with the outer boundaries of any given subworld, the terrain $T_1$ incremental definition necessarily is somewhat large, for example, on the order of about 1,500 feet. This terrain is defined transversely across screen 18 by ROM data identified as strips a, b, c, d. In the figure, strip, c, is shown in exaggerated horizontal dimension, inasmuch as runway and terrain, $T_2$, information falls within the outer boundaries of that strip. For example, within component, c, terrain, $T_2$ is shown being defined by ROM information strips e, f and g. Further, within these strips the runway and portions of a taxi strip, TS, are defined, the former by ROM components, x, y and z. The runway center line strip and number are defined within strip z. Outwardly of terrain $T_1$ world 50 exhibits a non-textured coloration, for example, the color of grass or the like.

As indicated above, the system is called upon to compute the slope of generated boundaries or "lines" extending from the vanishing point, VP, as well as the addresses to read only memories for the image of terrain extending between adjacent generated boundaries. Inasmuch as the horizon line 30 of the raster will usually bisect screen 18 at its midpoint, when operating with a standard NTSC video format, with interlacing, approximately 121 addresses will be computed for ROM information recovery. To accommodate to efficient utilization of the processor of the system, the slopes of the generated boundaries are computed commencing with the corresponding commencement of vertical retrace and continuing until the vanishing point level of the beam scan has been reached. The computations carried out in processing will depend upon the flying direction of the simulated aircraft, such directions being coordinatized by positive or negative values of X and Y. Where a given runway image is aligned along the Y axis of world 50, as opposed to the X axis, the computations are carred out with the simple expedient of interchanging X values and Y values. The following tabulation (Table I) summarizes the computations carried out by the system for the noted flying direction variations:

TABLE I

| Flying Direction | Slope | ROM Address |
|---|---|---|
| +X | $\frac{Y_A - Y_R + Wn}{H}$ | $X_A - X_R + KN + \frac{DH}{y}$ |
| −X | $\frac{-Y_A + Y_R - Wn}{H}$ | $X_A - X_R + KN - \frac{DH}{y}$ |
| +Y | $\frac{-X_A + X_R + Wn}{H}$ | $Y_A - Y_R + KN + \frac{DH}{y}$ |
| −Y | $\frac{X_A - X_R - Wn}{H}$ | $Y_A - Y_R + KN - \frac{DH}{y}$ |

Figure 5A:
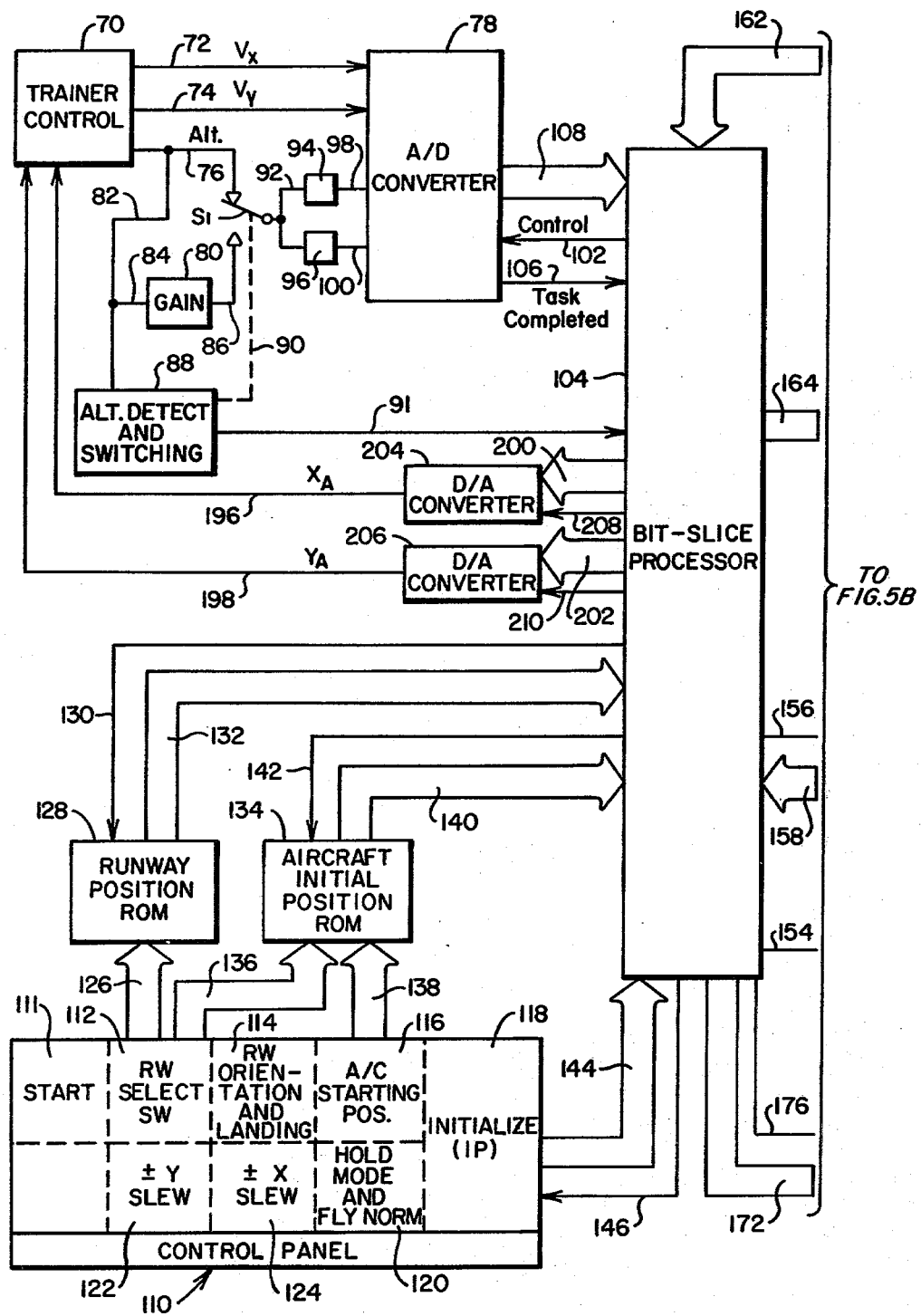

Referring to FIGS. 5A and 5B a highly schematic portrayal of the system of the invention is represented in block diagrammatic form. In the figures, those controls by which a conventional aviation trainer operates in motion base fashion are represented at block 70. These controls 70 serve to produce analog voltage signals at output lines 72 and 74 which respectively correspond with simulated velocities, $V_X$ and $V_Y$ along the appropriate axes of world 50. Additionally, control 70 produces an analog signal representing simulated altitude at line 76. These signals are submitted to an analogue-to-digital converter represented at block 78 which functions, upon receipt of proper commands, to sequentially convert the signals asserted thereto to digital form, for most applications this represents a 12-bit form of conversion. Prior to the submission of the altitude analog signal at line 76 to converter 78, the signal is selectively treated by passage through a gain function represented by block 80. Function 80 is coupled to receive the signal at line 76 from lines 82 and 84 and treats the same by carrying out, for example a gain of 8, which is provided along output line 86. The thus amplified signal at line 86 is utilized by the system at relatively lower altitudes where greater image resolution with respect to altitude values is important. For example, more detail is apparent to a pilot in the course of the final phases of a landing procedure than when flying at higher altitudes. Inasmuch as the analog altitude signals developed by trainer control 70 will be voltage limited, for example extending over a 10 volt range, for higher simulated altitudes, for example 2000 feet down to a few hundred feet, ample correlation of altitude with respect to that analog signal is present. However, for the critical remaining few hundred feet of altitude considered during landing approach, a relatively smaller range of analog voltages are available for carrying out digital conversion for necessary image generation. By amplifying the voltage signals within this range, the full analog range, for example, of 10 volts are available for altitudes for example, of 250 feet to ground level. Switching within the system at that transitional altitude has been found to be imperceptible to the trainee and is carried out as represented schematically by switch $S_1$ operating in conjunction with a drive association with block 88, as represented by dashed line 90. The altitude signal extending from switch $S_1$, simultaneously is directed along line 92 through scaling networks represented by clocks 94 and 96. Network 94 scales the signal at line 92 for purposes of utilization in developing an altitude signal serving for the computation of memory address, while scaling network 96 serves to develop a scaled altitude utilized in computing slope values, those computations being discussed earlier herein. From network 94, the address-scaled-altitude signal is submitted to converter 78 from along line 98, while the corresponding signal from network 96 is submitted to the converter 78 from along line 100.

Converter 78 responds to a command control input signal at line 102 emanating from microcomputer processor function represented generally by block 104 to generate an 11-bit word. The converter may, for example, be a 12-bit A to D counter having one sign bit which is not utilized inasmuch as the altitude will never assume a negative value, consequently the 11-bit number is derived. Processor 104 will be seen to be comprised of 7, 4-bit slices which are cascaded to evolve a 28-bit processing capacity. The processor selectively receives digital data from converter 78 from data bus 108 upon the appropriate conditions being satisfied with respect to the command at line 102, an altitude level signal from line 91, as well as an indication of task completed from converter 78 represented at line 106.

At the commencement of any given training flight simulation, the instructor-operator of the system selects the initial flight parameters by manipulation of switches at a control panel represented in the drawing generally at line 110 and having a START switch 111, represented at dashed block. Recalling the exemplary simulated world 50 described in connection with FIG. 3A, the operator is given the flexibility of choosing simulation with respect to any of four runways. Accordingly, a four position runway select switch is provided in control panel 110 as represented by a dashed block 112. Once a runway is selected, then it becomes necessary to select the landing orientation of the trainer with respect to the selected runway, this selection again being carried out by a four position switch as represented by dashed block 114. The trainer starting coordinates also may be selected, for example, as described above at any of four positions for selected subworld, SWn and this selection is made by adjusting a four position switch represented at block 116. The system is initialized by depressing a switch represented at block 118, while a decision is made for freezing the position of the trainer or providing a simulated flight movement of the trainer by a two-position switch represented at block 120. The system also affords the operator an opportunity to move the aircraft to any desired coordinate position in world 50 by manipulation of a Y axis slew switch, represented by block 124. Address data generated by the manual selection carried out by the operator at switches 112, 114 and 116 is conveyed to two read-only memories (ROM) for use, upon command, by processor 104. In this regard, the runway select address is conveyed along data bus 126 to a runway position ROM 128. Within ROM 128 all of the predetermined runway midpoint locations are stored for use, upon command from line 130 and address is asserted thereto from along bus 132. Similarly, the locations of the aircraft starting positions are stored in a read-only memory represented at block 134, which is addressed by the information developed in selecting the orientations of switches 112 and 116. The latter addresses are represented as being asserted at memory 134 respectively along data buses 136 and 138. This information is passed to processor 104 through data bus 140 upon command from line 142. A switch 114 provides a runway orientation and landing orientation (plus or minus) to the system as discussed later. Data from control panel 10, including that developed from switches 111, 114, 118, 120, 122 and 124 is asserted to processor 104 along data bus 144 certain of this data being provided upon appropriate command from line 146.

As described in connection with equation (7) above, the computation of generated line slope involves the quantity, Wn, and the values for this parameter are stored within a read-only memory 148. Memory 148 is addressed sequentially for each computation made by processor 104 in developing the slope of a given generated line extending from vanishing point, VP. To carry this out, a counter 150 (WCNT) which develops an output representing the sequence of generated line computations is provided having an address input to memory 148 through data bus 152. Counter 150 is controlled from processor 104 through line 154, while corresponding control input to memory 148 from the processor is developed along line 156 and a data input from memory 148 to processor 104 is provided along data bus 158.

Upon appropriate operator selection of initial conditions for a simulated flight, the arithmetic unit of processor 104 is called upon to integrate the now digitalized signals representing simulated velocity along the X and Y axes. Generally, this computation commences with the receipt of a vertical synchronizing pulse from a timing block represented at 160, the input to processor 104 therefrom being represented by data bus 162. Upon appropriate arithmetic operations and selection of data, processor 104 then develops slope information by drawing on data retained within memories 128, 134 and 148. The resultant generated slope numbers then are submitted along data bus 164 to a plurality of line generators schematically represented at block 166. The appropriate line generation function at 166 is selected by an address asserted from WCNT block 150 through data bus 168, while appropriate timing logic is asserted to the line generation function 166 from raster timing block 160 through bus 170.

As the raster-defining beam of a given field reachs a position slightly above the level of the vanishing point, VP, processor 104 commences to carry out the computation of terrain information addresses as described above in connection with equations (2) and (4). The resultant addresses are delivered along data bus 172 to a ROM address function 174 along with control command as asserted through line 176. Address function 174, in turn, addresses texture and runway feature read-only memories as represented by block 178 through an array of connections represented generally at 180. The thus addressed data from memories 178 is delivered through bus 182 to a combinational logic, video processing and digital to analog convertor function represented at block 184. Similarly, slope data is delivered from line generation function 166 to functions 184 through data bus 186, while block 162 control timing is applied thereto from bus 188. The resultant imaging signal output is transferred to a video projector represented by block 190 through an array of connections represented generally at 192. Timing control to projector 190 is represented as being asserted through line 194 from raster timing block 160.

Information is returned to provide instrument and motion control data for trainer control 70 from lines 196 and 198. These lines, respectively, assert an analog voltage signal representing the X and Y coordinates of the aircraft. Such information also may be directed to X-Y plotters and the like. The data developed at lines 196 and 198 is derived from processing function 104, as represented by digital data buses 200 and 202 leading, respectively to digital-to-analog converter functions 204 and 206. Corresponding control inputs to functions 204 and 206 from function 104 are represented by respective lines 208 and 210.

As a prelude to considering the component details of the instant system, reference is made to FIG. 6 wherein a block diagrammatic representation of the principal functional components of processing function 104 are revealed. To carry out the processing functions, a considerable computational flexibility as well as speed is required, thus, resort generally is made to TTL components including arithmetic units of the cascadable, bipolar bit-slice type. These devices permit an architecture of desirable flexibility and higher, i.e. 28-bit word length, capabilities.

To enhance the clarity of the discourse to follow, processing function 104 as well as the related components of the system are described in somewhat conventional alphanumerical terminology to designate the terminals of a component, as well as the corresponding terminals to which the former terminals are connected. In general, the identification of the terminals of a component are incorporated within the block representation of that component, while the designation of the input connection source to such terminal is positioned outwardly of the block periphery.

FIG. 6 shows an arithmetic processing function represented by a block 220. Function 220 receives data, for example as described earlier in FIG. 5, from converter 78 as well as from memories 128, 134 and 148 and carries out arithmetic operations thereupon. This data input to function 220 is represented by arrow 222 and the resultant treated output data is represented by arrow 224. Control over the type of arithmetic operation carried out by function 220 is asserted from control lines 226 and the control output of function 220 is represented by line 228 extending through a conventional pipeline function 230. As is known in the art, a pipeline function permits the operation of microprocessors at improved internal clock rates. As is discussed in more detail later herein, the arithmetic function 220 utilized in the instant system is one comprising a plurality of cascaded 4-bit bipolar microprocessor slices which incorporate 16 registers designated $R_O$–$R_F$ as well as a Q register serving the conventional function of multiplication and division routines. Control over the operations carried out at function 220 is provided from microinstructions which are stored in a memory referred to conventionally as a "control store" represented at function block 232. Function 232 is provided in the instant system, for example, as a read-only memory incorporating 256 words and a 56-bit width. Control store function 232 is addressed, as represented by arrow 234, by a microinstruction address register represented by block 236. Address determination at block 236 is in response to "next address" information contained within the data stored within control store function 232, as represented by arrow or data channel 238 as well as from other inputs relating to desired operation of the system. Accordingly, various sources of logic within register 236 may be activated from controls as represented by data channels or arrows as at 240 and 242 as well as from test lines as represented at 244. Note, that the latter information is derived from control store function 232 through a pipeline register represented at block 246. Register 246 carries out the same function as discussed in connection with block 230. Control inputs 240, 242 and 244 are shown directed into a combinational logic function represented at block 248. Function 248 will be seen to operate to test and select the proper operational function to be carried out by address register 236. Combinational logic function 248 responds not only to information from the microinstructions of the system but also to simulator conditions and the like to permit the proper carrying of logic. The output of logic function 248 is represented by arrow 250 as extending to the operational control inputs of microinstruction address register function 236.

The sequence of simulating events carried out by the system of the invention and the electronic components or hardware carrying out that sequence of events are described in the discourse to follow. To facilitate an initial understanding of the events and procedures, reference initially is made to the microinstructional flow chart represented by FIGS. 6A–6E. These figures should be observed in a sequence commencing uppermost with FIG. 6A and continuing in regular sequence through the last thereof, which is FIG. 6E. In effect, the flow chart generally summarizes the instructional data stored within control store function 232 and which is called upon by the processor function 104 to operationally associate the functions described in connection with FIG. 5. Following a discussion of the flow chart, the discourse then turns to a description of electronic components implementing the system.

Figure 6A:
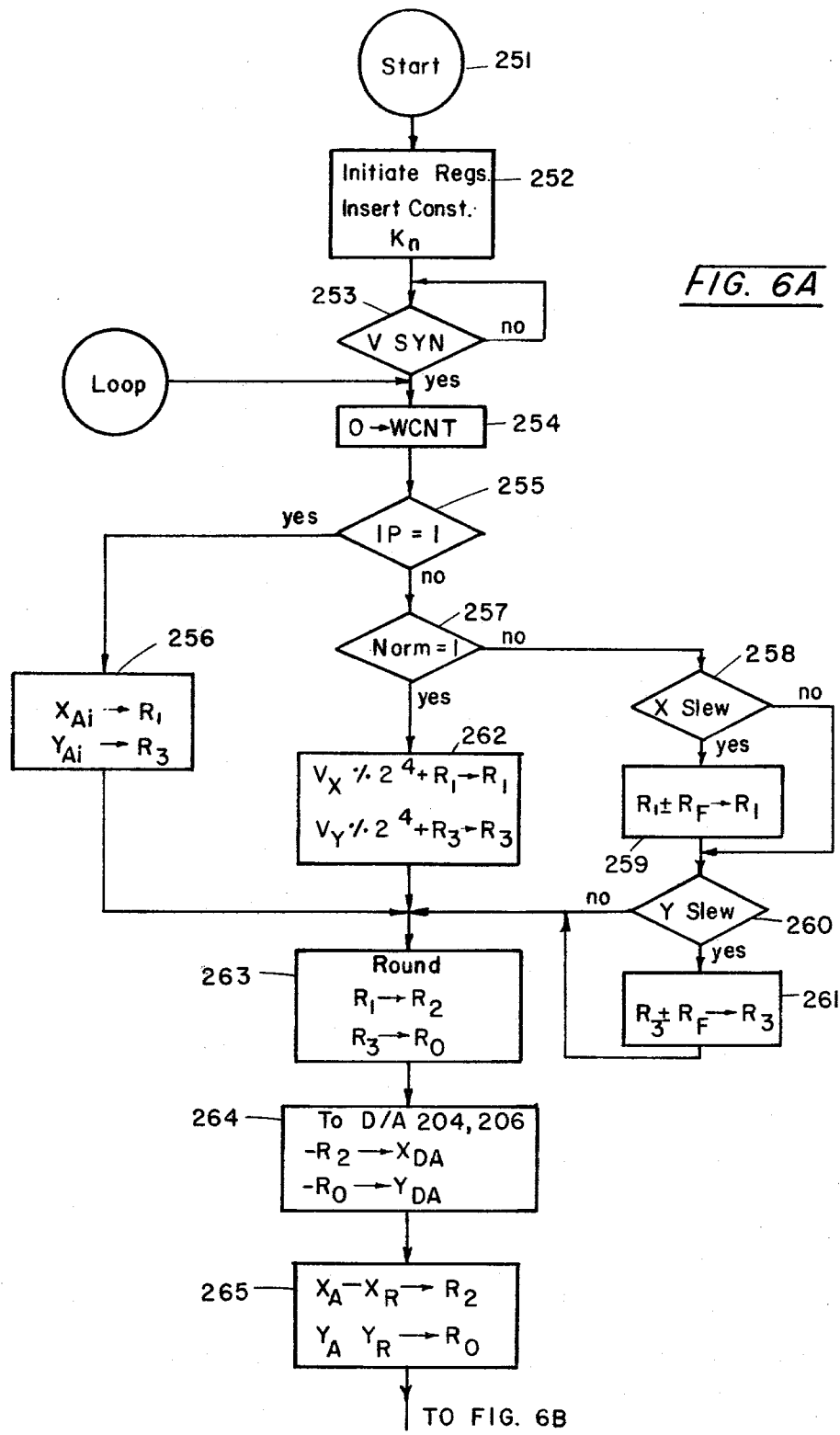
FIGS. 6A–6E represent a flow chart describing the microinstructions of the processing components of the invention.

Referring to FIG. 6A, the system is turned on with the actuation of start button 111 which is represented by a circle 251. Such actuation causes the processing system to commence operation at the first address of control store 232. The next sequential operation provides for an initiation of the registers as represented at block 252 which, inter alia, provides for the insertion of constants into certain of the registers of arithmetic unit, or function 220. For example, the number 40 is inserted into register $R_O$, the number FFFF is inserted into register $R_D$; the number E00 is inserted into register $R_F$ and the number DFFFF is inserted into register $R_B$. These constants will be seen to be used for logical test purposes as the instructional program unfolds. With the insertion of the constants, the system awaits the presence of a vertical sync signal, as represented by decision block 253. Thus, for a given procedure, the system operates essentially from the top of the raster which evolves an image at the screen 18. When the vertical sync signal is made available, the WCNT function described at 150 in FIG. 5 is initialized, a zero being set thereat as shown at block 254. It may be recalled that this function controls which of the line generators of function 166 is addressed as well as corresponding data at ROM 148

Upon initializing WCNT function 150 as indicated at block 254, the program then questions whether the initial position, i.e. whether the initializing switch 118 has been activated for operation in conjunction with switches 114 and 116 as represented at block 255. The initializing switch 118 is a normally "off" switch which is held down (on) by the operator to cause the insertion of the selected initial runway position. Where the system is being started and the simulated aircraft is being given an initial position, this test is true and, as represented at block 256, data from ROM 134 representing the initial X coordinate of the aircraft, $X_{Ai}$, are inserted into register $R_1$, while the corresponding initial coordinate, $Y_{Ai}$, is inserted into register $R_3$. In the event that simulated flight in ongoing, a "no" response is derived from block 255, which leads to the next test at block 257 to determine whether the fly normal condition has been presented at the switch 120. In the event that condition is not the case, then a hold mode is at hand and the test at block 258 is activated to determine whether or not the X slew switch has been activated. Where the answer is yes, then, as represented at block 259, a command is carried out wherein the contents of register $R_1$, which carries the X coordinate of the aircraft, is combined in plus or minus fashion with the number E00 earlier placed in register $R_F$. This provides for a very large value to be added to the value within register $R_1$. Recall that the slew switch, when actuated, causes the simulated aircraft coordinate position to be moved very rapidly along the direction of the X axis. Following the carrying out of the instructions at block 259 or, in the event the test at 258 is no, then the instructions test, as indicated at block 260, whether or not the Y slew switch is being actuated in either a plus or minus direction. If the switch is being retained in an actuating position, then the instruction at block 261 is carried out, the $Y_{ac}$ aircraft coordinate within register $R_3$ being combined, in a manner depending upon the plus or minus switch actuation, with the large constant E00 within register $R_F$. As before, this arrangement serves to provide for a movement of the simulated position of the aircraft at a very high velocity in the direction of the Y axis.

In the event that the fly normal mode has been chosen at switch 120, then a command is given to convert the digitalized numbers representing velocities $V_X$ and $V_Y$, as present at A/D converter 78, to aircraft coordinates $X_A$ and $Y_A$. This is carried out, as represented at command block 262, by an integration procedure wherein the velocity values are divided by 16 and combined with the heretofore existing aircraft position coordinates present within registers $R_1$ and $R_3$. In effect, in the course of a normal flight training procedure, this represents an updating of the latter register for the maintainence of proper aircraft position data. Registers $R_1$ and $R_3$ are of 28-bit extent to achieve accuracy in the integration procedure. This procedure is one which achieves a close approximation with respect to velocity and can be utilized, inasmuch as the changes encountered in velocity in normal aircraft flight are relatively minor. With the completion of the updating of registers $R_1$ and $R_3$, commands are given to a A/D converter 78 to first read the $V_X$ value at line 72, then read the $V_Y$ value at line 74 following which altitude for slope computation, then memory address computation is read as presented at respective lines 100 and 98. Such commands are made early in the process, inasmuch as the converter 78 is relatively slow. In effect the procedure carried out at block 262 is a scaled approximation of an actual integration. As a next command, represented at block 263, the 28-bit values within registers $R_1$ and $R_3$ are rounded to 24-bit length and submitted to respective registers $R_2$ and $R_0$, the larger 28-bit evaluations no longer being required by the system following the operations associated with block 262. Upon being rounded, as represented at block 264, the contents of register $R_2$ are outputed to digital-to-analog converter 204 to provide updated X coordinate information to trainer control 70, while, the contents of register $R_0$ are outputed to digital-to-analog converter 206 for the same purpose. The negative sign is provided to accommodate the requirements of trainer control 70 as well as converters 204 and 206.

The first of the computations required in developing slope values then is carried out at instruction 265 wherein the values $X_A-X_R$ are computed and inserted into a temporary register $R_2$, while the corresponding operations subtracting $Y_R$ from $Y_A$ is inserted with the register $R_O$. The values $X_R$ and $Y_R$ are obtained from ROM 128, while the values of $X_A$ and $Y_A$ were already positioned within respective registers $R_2$ and $R_0$ as indicated at block 263.

Figure 6B:
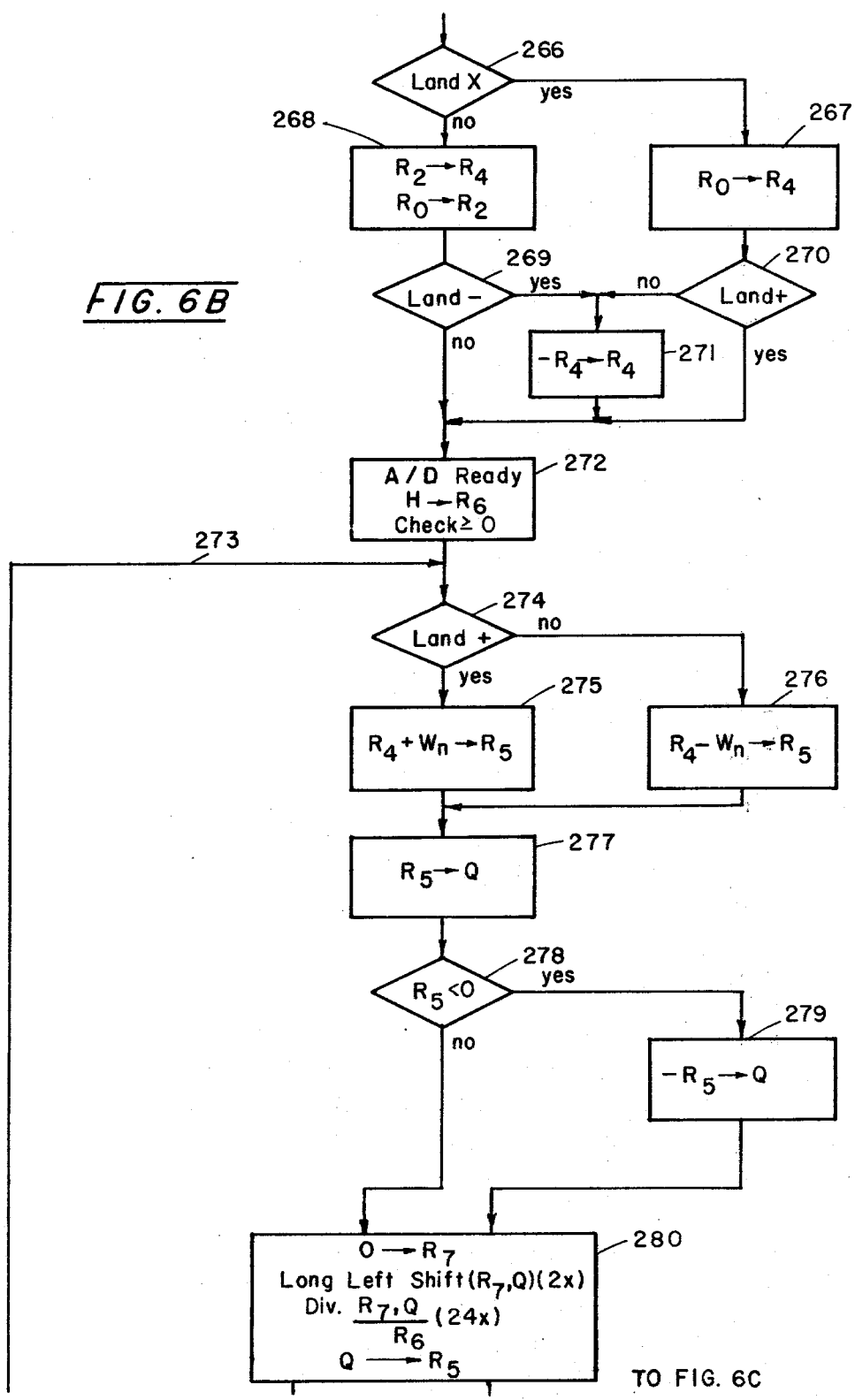
Figure 6C:
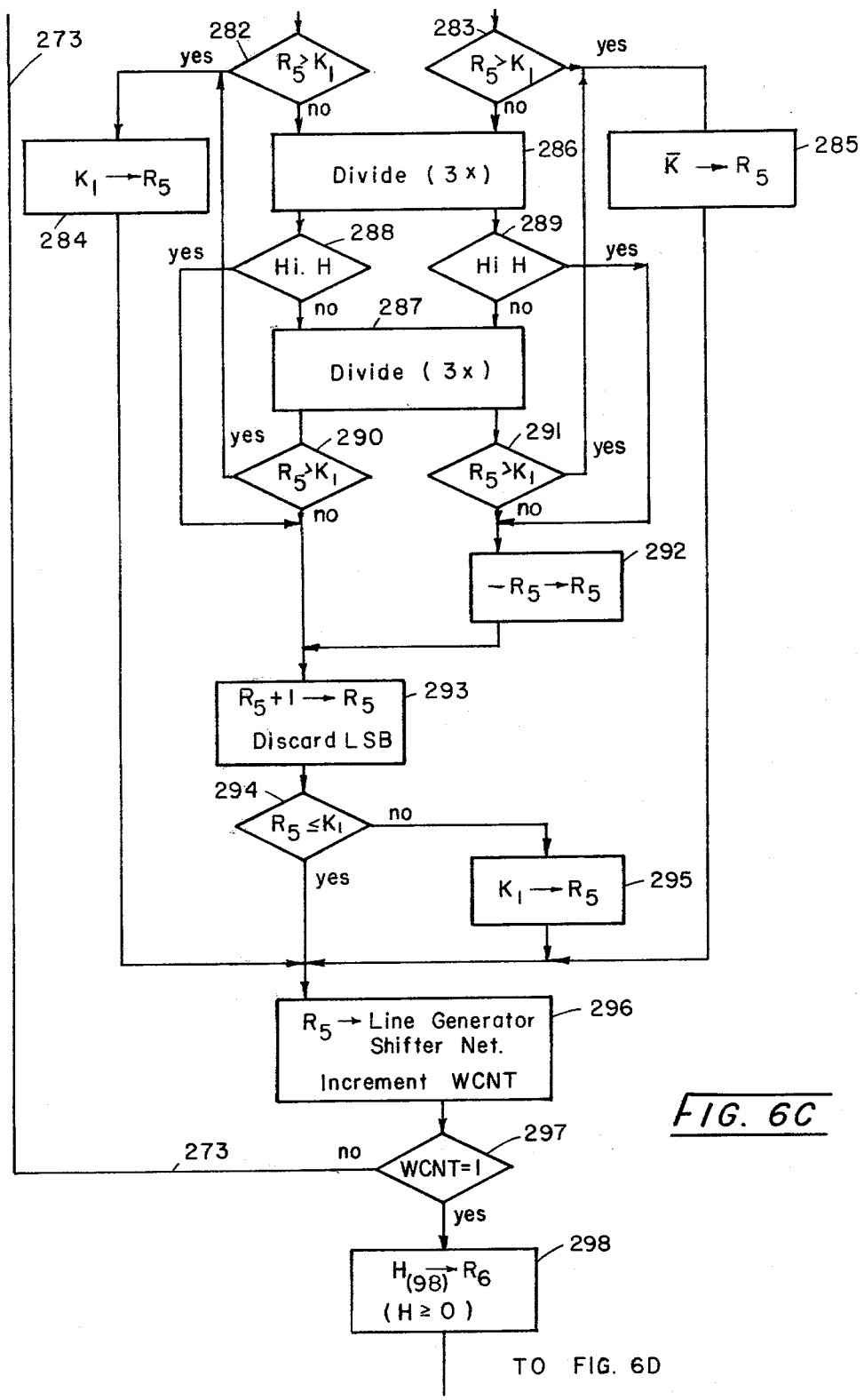

Moving to FIG. 6B, the microinstruction then, as represented at block 266, tests as to whether a landing is being carried out in an X direction. If that is the case, then, as indicated at block 267, the contents of temporary register $R_0$ are positioned within register $R_4$. In the event that the test at 266 is not true, then, as indicated at block 268, the contents of register $R_2$ are transferred to register $R_4$, while the contents of register $R_0$ are transferred to register $R_2$. With the operations indicated in blocks 267 and 268, the X and Y values merely are interchanged depending upon the direction of landing. As is revealed in Table I, variations in quantities required for slope also occur depending upon the plus or minus direction of landing for a given runway orientation. Therefore, the microinstruction carries out the additional tests indicated at blocks 269 and 270 as to whether landing, respectively, is to be carried out in a negative or positive direction. Where the landing is to carried out in a negative direction, then, as indicated at block 271, the data within register $R_4$ is made negative. As is exhibited in Table II, registers $R_2$ and $R_4$ now are primary in the computational activities of the system. At block 272, the system interrogates A/D counter 78 as to whether slope related altitude data at line 100 has been converted to digital form. If this is not the case then the system waits until such data is available. Once made available, that number representing slope-related altitude is checked as its value relates to zero, a negative altitude being impossible. Where the number is greater than or equal to zero, the altitude, H, is loaded into register $R_6$. In the event the altitude valuation is less than zero, then the value zero is loaded into register $R_6$.

TABLE II

| Land | $R_4$ | $R_2$ | $R_5$ |
|---|---|---|---|
| +X | $Y_A - Y_R$ | $X_A - X_R$ | $Y_A - Y_R + W_n$ |
| −X | $-Y_A + Y_R$ | $X_A - X_R$ | $-Y_A + Y_R - W_n$ |
| +Y | $-X_A + X_R$ | $Y_A - T_R$ | $-X_A + X_R + W_n$ |
| −Y | $X_A - X_R$ | $Y_A - Y_R$ | $X_A - X_R - W_n$ |

At this juncture in the microinstruction, the system is called upon to arithmetically compute certain data required to develop the slope of each of the earlier described generated lines extending from the vanishing point. Because there is a unique value of $W_n$ for each of these generated lines and, as represented at equation (7), a division is involved in determining the slope, the loop line 273 will be seen to cause a repetition of such computation for each generated line, those generated lines being identified by the value developed in counter WCNT described at 150 in FIG. 5, which component was initialized at a zero valuation at block 254 in FIG. 6A. Upon the completion of each slope-determining valuation, the appropriate one of the line generators within line generation function 166 is conditioned to define a generated line of proper slope when called upon to do so in appropriate sequence.

Now, considering one pass through the computations encompassed by loop line 273, as represented at block 274, an initial inquiry is made as to whether a land plus condition has been selected at panel 110 and switch 114. In the event that a selection has been made to land in a positive direction, then the value shown in Table II within register $R_4$ representing aircraft position relative to the middle of the runway is added with the value $W_n$ for the particular word count at hand (WCNT) and that result is loaded into register $R_5$, as represented at Table II and at block 275. Recall that the value $W_n$ is obtained from ROM 148. Correspondingly, in the event that a selection has been made to land in a negative direction, then the selected value of $W_n$ is subtracted from the value earlier loaded into register $R_4$ and the result is loaded into register $R_5$ as represented at block 276. As above, the conditions represented in Table II obtain within the system at this point in time. Because the value loaded into register $R_5$ is one representing a dividend, this operand then is loaded into the Q register of arithmetic unit 220. This instruction is represented at block 277.

Following the latter loading, the system tests whether or not the value within register $R_5$ is negative, as represented at block 278. This query is necessary, inasmuch as the divisional algorithm of the system operates only in one quadrant wherein a positive valuation of both dividend and divisor is required. In the event the value in register $R_5$ is negative, then it, in effect, is multiplied by minus one, as represented at block 279, block 279 overriding the operation at block 277. A positive valuation of operand then is treated at block 280. Block 280 represents a subroutine within the microinstruction and, depending upon whether the Q register valuation has been obtained through the path including block 279 or from blocks 277 and 278, will provide a unique output or exit position for the quotient result of the divisional process.

In effect, the subroutine represented at block 280 carries out the division of the content of register, $R_5$, by the contents of register, $R_6$. In conventional fashion, this is accomplished by initially loading a register $R_7$ adjacent the Q register with zeros. Following this loading, a long left shift is carried out twice, whereupon appropriate subtractions from registers $R_7$, Q of the value within register $R_6$ are carried out 24 times to develop a quotient. This quotient will have evolved into the Q register and the contents of that register then are loaded into register $R_5$. The latter transfer takes place inasmuch as the Q register is of such a special purpose nature as to be unavailable for the ensuing operations. Looking to FIG. 6C, should the initial value within register $R_5$ have had a positive sign, as detected above, it is submitted to a test at block 282 to determine whether it is greater than a predetermined large constant value as inserted in connection with block 252. This constant may have the value, for example of FFFF and represents the maximum slope which may be traced at the raster of the video system. In the event that the valuation initially in register $R_5$ was found to be negative in sign, then the same test is carried out within a different channel as represented at block 283. In the event the answer to the test at block 282 is yes, then the maximum value constant is loaded into register $R_5$, as represented at block 284. The corresponding value is, in effect, complemented at block 285 and loaded into register $R_5$ if the test at block 283 is yes. Where the value within register $R_5$ falls below the predetermined constant, then, as is represented at block 286, the above division is carried out 3 more times. This division is performed inasmuch as there is a 24-bit limitation within the Q register.

In the event that a gain, for example of eight, as represented at block 80 is imposed upon the altitude signal as regulated from detection and switching network 88, then the above division is carried out an additional three times to accommodate for that fact, as represented at block 287. The decision for this high vs. low altitude condition calling for additional division is represented in the flow chart at blocks 288 and 289, the latter being within a channel operating with a sign altered valuation within register $R_5$. Following the division at block 287, the quotient again is tested as represented at blocks 290 and 291 to determine whether it is excessive in the same manner and for the same purpose as set forth at respective test blocks 282 and 283. The sign altered quotient for a condition wherein the maximum slope number is not exceeded is reconverted to its initial negative value as indicated at block 292 and the finalized quotient is rounded as represented at block 293. This function serves to add a one to the value within register $R_5$ and discard the least significant bit, the latter being expendable by design. Inasmuch as the rounding operation may result in a numerical value greater than the designated maximum slope number, a test with respect to that number again is carried out as represented at block 294. If the constant value inserted is less than the value of data within register $R_5$ then that maximum number is substituted within register $R_5$ as represented at block 295. The resultant input representing the expressions set forth for register $R_5$ in Table II above then are made available to a given line generator as determined by the word count (WCNT) function 150 as is represented at block 296. Block 296 also shows that the WCNT function is incremented whereupon, as represented at block 297, a test is carried out determining whether all line generators have been provided information from register $R_5$. If this is not the case, then the divisional process again is carried out as represented by earlier-described loop line 273. As represented additionally at block 296, with the submittal of the register $R_5$ information to a line generator, WCNT function 150 is incremented and this incrementation continues until all line generators are loaded. At such time as this occurs, the word count test will reveal a one valuation as represented at block 297 to cause the system to carry on a next sequence of operations. All of the above operations, however, are carried out during an interval wherein the raster beam is located well above the designated vanishing point, VP.

As represented at block 298, the system then turns to the computation of memory addresses. Initially, the updated valuation of altitude ($H_{98}$) as developed at line 98 and converted by convertor 78 is inserted into register $R_6$. Additionally, a test is carried out to determine whether that altitude value is greater than or equal to zero, the value, zero, being loaded into the register in the event the data represents a negative number.

Figure 6D:
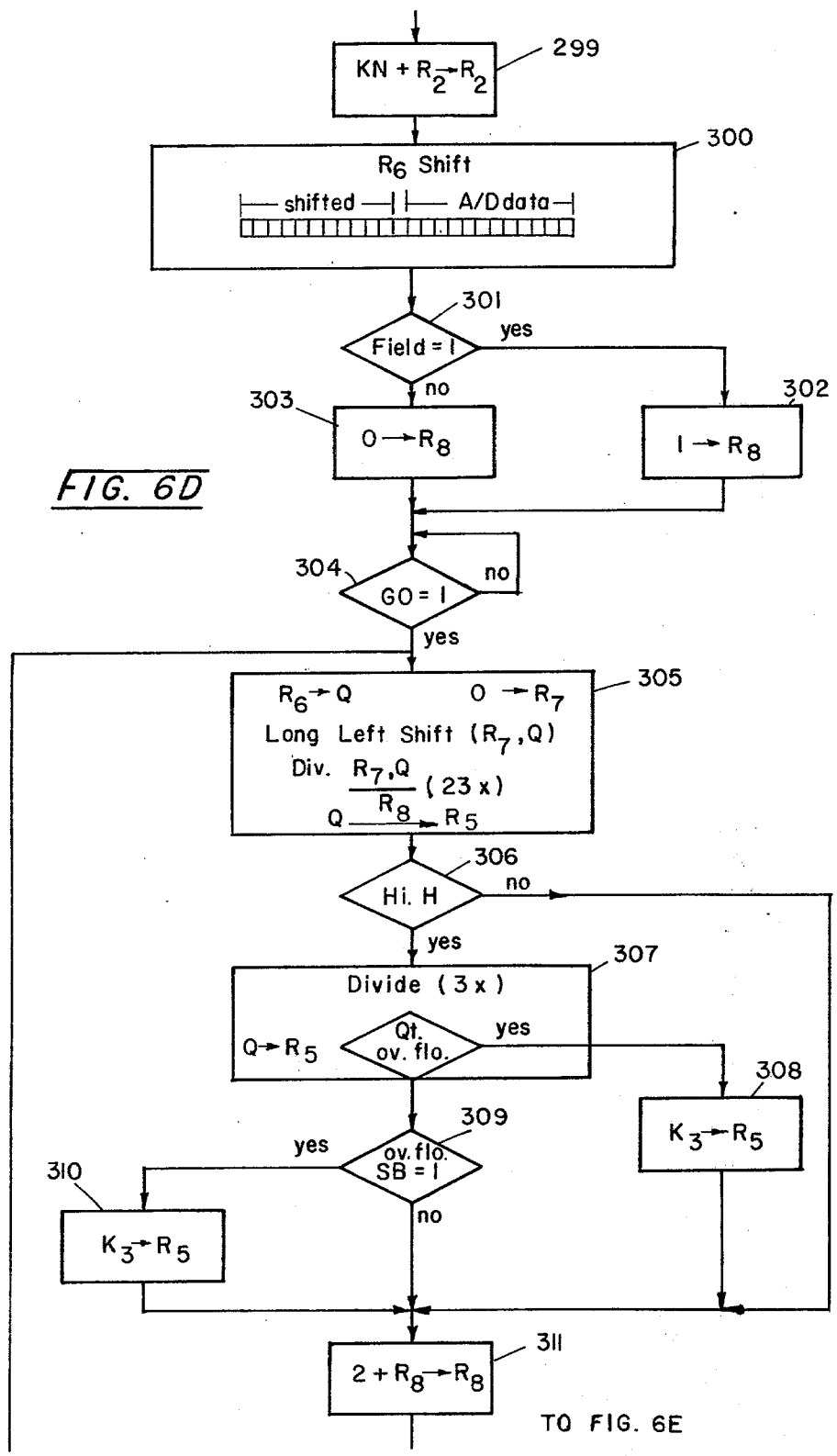
Figure 6E:
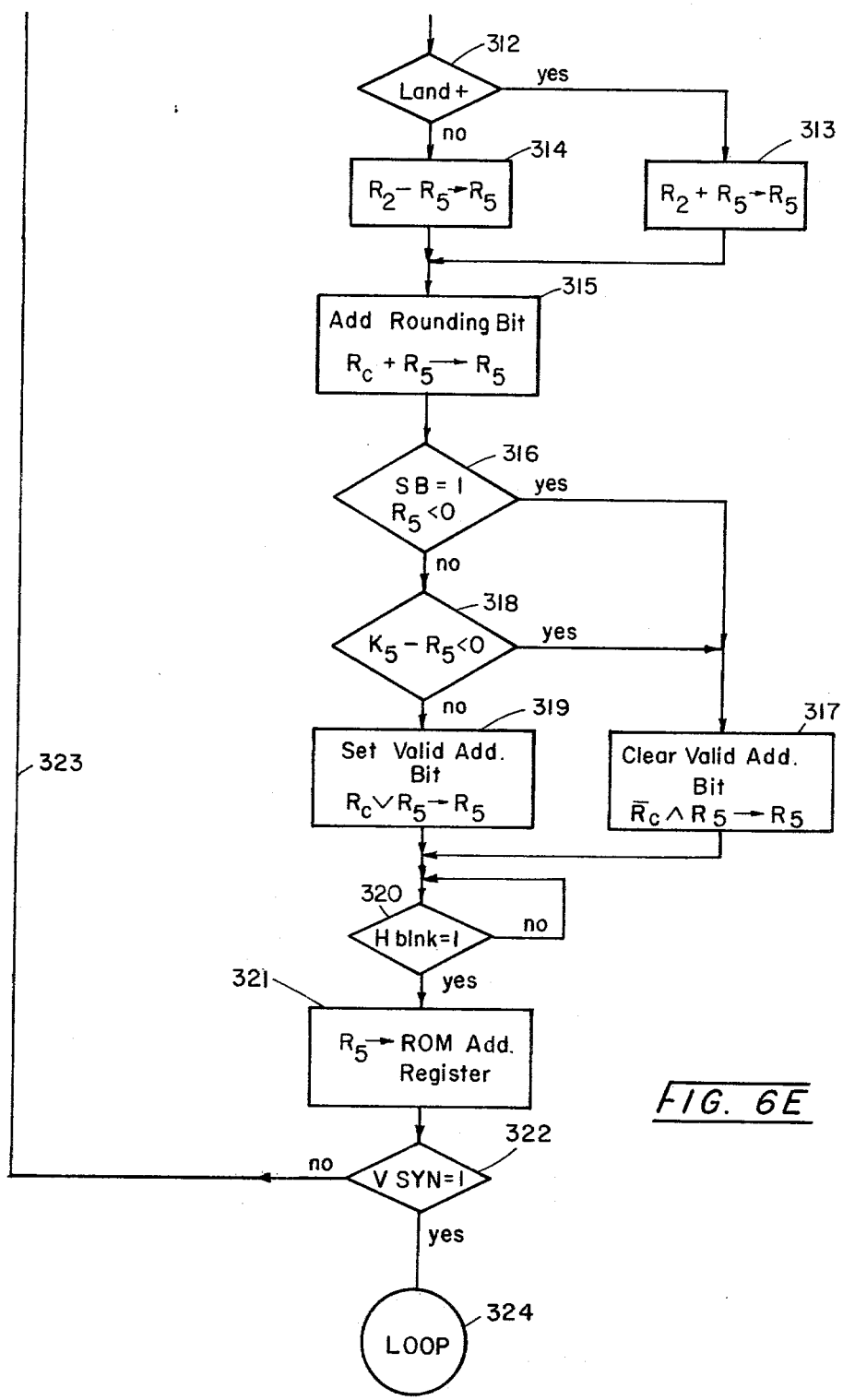

Looking to FIG. 6D, an operation generating a portion of the expressions contained in equations (2) and (4) is represented at block 299 as being carried out by the addition of the value, KN, described in connection with FIG. 2B, to the contents of register $R_2$. As set forth in Table II, this register contains the value $X_A - X_R$ or $Y_A - Y_R$, depending upon aircraft landing direction. The value, KN, is a constant which remains the same for all runways and corresponds with the distance from the middle of a given runway to a zeroeth address.

Inasmuch as memory address equations (2) and (4) involve a division wherein altitude, H, is a dividend, a preliminary shift to the left operation is carried out in register $R_6$. As indicated earlier, the information from A-to-D converter 78 is present as 12-bits, the uppermost one of which is a sign bit which always is zero. Thus, 11 "non-zero" values are utilized with the system, the sign bit being discardable. As represented at block 300, the left shift serves to discard the sign bit and prepares the register for a division operation. However, such operation is not carried out until such time as the vertical position of the raster beam approaches the vanishing point level.

As discussed in connection with FIG. 2D, the above address equations also utilize the term, y, which is the distance of the imaging beam below the vanishing point upon screen 18. Inasmuch as the system assigns a number value for the varying quantity, y, and whereas two fields define a given frame of the interlaced video output, a first query is asked, as represented at block 301, as to whether the field at hand is designated as "one" and, if that is the case, as represented at block 302, the value "one" is inserted into register $R_8$ which is the initial y value for that field. On the other hand, should the zeroeth field be at hand, then a zero is inserted as the initial y value within register $R_8$, as represented at block 303. It may be recalled from an observation of equations (2) and (4) that the instant system is one reacting to the value of y. In effect, the system is demand-responsive to that value. Accordingly, no computation can be carried out until the value of y is at hand and, thus a decision block 304 is provided to determine when the vanishing point has been reached by the raster defining beam of the video system. In practice, the "GO" position is one selected slightly above the vanishing point in order to provide a slightly early calculation availability.

With the insertion of a GO signal, the system commences a division operation wherein the altitude for address purposes is divided by the contents of register $R_8$, i.e. a "y" valuation. As described in connection with block 280 above, a subroutine is represented at block 305 wherein the contents of register $R_6$ are loaded into the Q register and the adjacent $R_7$ register is loaded with zeros. Following this loading, a long left shift is performed and a multiple subtractive type of division is carried with the contents of register $R_8$ or, y. This procedure is performed 23 times. At the conclusion of this process, the contents of the Q register are transferred to register $R_5$. As indicated at block 306, a determination again is made as to whether or not the altitude signal is one having been provided a gain of eight as discussed in connection with block 80. In the event that the altitude is of such low extent that the gain has been applied, then, to accommodate for this gain of eight, a division is carried out three more times as represented at block 307. Following such division, the quotient contents within the Q register are loaded into register $R_5$. As a next necessary logic operation, this quotient is tested to determine whether the number generated thereby is of such high value as to create an overflow condition within the registers. Consequently, block 307 contains an initial determination as whether an overflow condition has obtained. If that is the case, then a predetermined maximum constant number, $K_3$ is loaded into register $R_5$, as represented at block 308. Additionally, a further test is carried out wherein an overflow condition and the sign-bit condition are evaluated to determine whether a negative number has been derived. This evaluation is represented at block 309 and, where such conditions obtain, then constant, $K_3$ is loaded into register $R_5$, as represented at block 310.

At block 311, the value of, y, present within register $R_8$ is incremented by a value of two, that value accommodating for the interlacing effect upon a continuous y count.

With the above loadings of registers $R_2$ and $R_5$, an address may be derived as required in connection with equations (2) and (4) above. Those equations depend upon whether or not landing is to take place in a plus or minus direction. Consequently, to achieve the requisite data represented in Table III, whether a subtraction or an addition of the contents of register $R_5$ to register $R_2$ is required to be carried out. Looking to FIG. 6E, the question as to whether landing is in a positive direction is made at block 312 and, if that is the case, as represented at block 313, the combination of registers $R_2$ and $R_5$ are loaded into register $R_5$. Correspondingly, if landing is in a negative direction, then, as represented at block 314, the contents of register $R_5$ are subtracted from the contents of register $R_2$ and the result loaded in register $R_5$.

TABLE III

| Land | $R_5$ |
|---|---|
| +X | $X_A - X_R + KN + \frac{DH}{y}$ |
| −X | $X_A - X_R + KN - \frac{DH}{y}$ |
| +Y | $Y_A - Y_R + KN + \frac{DH}{y}$ |
| −Y | $Y_A - Y_R + KN - \frac{DH}{y}$ |

At block 315, a rounding bit is added to the number within register $R_5$. Rounding is carried out by loading the hexadecimal value 40 into the twenty-four bits present within the arithmetic unit of the processor 104. This hexadecimal value will cause the addition of a 1 at the lowest significant bit before the decimal point within the processor and the positioning of zeros to the right of such decimal point. The constant, 40 which may be represented as $K_5$, will have been loaded into register $R_C$ at block 252. It has been found that the addition of this rounding bit reduces the amount of jitter occasioned at screen 18. It is necessary for the system to determine whether the resultant rounded address number is valid. For example, where the number becomes too large, the sign bit will achieve a one value representing a negative number which is invalid within the system. This test is represented in the figure at block 316. In order for the system to signal the presence of an improper address to ROM address function 174, the rounding bit earlier utilized in connection with block 315 is again utilized, but for the purpose of representing a valid address bit. Under the conditions of the system, when this valid address bit is a one, then the processor logic will not use it, such an approach being somewhat convenient, inasmuch as the invalid number within register $R_5$ need not be cleared since it is not utilized. Thus, as represented at block 317, in the event that the sign-bit (SB=1) represents a negative value within register $R_5$, then, as represented at block 317, the valid address bit is cleared, i.e. made a zero. Block 318 presents another test of data, for example, if the number within register $R_5$ is greater than the possible range of addresses within the ROMs described in connection with block 178, then an undesirable wraparound condition will ensue. Accordingly, a constant, $K_5$, is compared with value within register $R_5$ and, in the event that the value within the register is greater than constant, $K_5$, then, as represented at block 317, the valid address bit is cleared. In the event that the tests at blocks 316 and 318 show an appropriate value within register $R_5$, then, as represented at block 319, the valid address bit is set or made a one to permit utilization of the address. Block 319 also indicates that, in the event the computed value within register $R_5$ is invalid, then the constant valuation, $K_5$ representing maximum address value is inserted within register $R_5$. Note that this content of register $R_5$ is applied to ROM address register 174 and this address will include the valid data bit to enable the processor to utilize the address.

It may be recalled that the entire range of address computation is carried out in a course of a single horizontal scan line interval, i.e. less than about 64 microseconds. This series of computations generally will take slightly less than that interval, consequently, as indicated at block 320, the system awaits the presence of a horizontal blanking pulse until, as represented at block 321, the contents of register $R_5$ are loaded into the ROM address register described in connection with block 174. This computation is repeated for each y value for a given field within a raster frame until the bottom of the raster is reached and a vertical sync signal (VSYN=1) is developed. The latter test is represented at block 322 and where vertical sync is not equal to one, as represented by looped line 323, the process is repeated for each alternate y level. When the vertical sync pulse is developed, as represented at 324, the system loops to commence the entire operation for a next succeeding vertical scan or field.

Now, looking to the implementation of the microinstructions developed in connection with the flow chart of FIGS. 6A–6E, reference is made to FIG. 7 in which components of the address register 236 as well as combination logic function 248 are revealed. In the figures to follow, a slash mark indicates the complementing of a signal. Address register 236 is shown to be comprised of two cascaded 4-bit wide address controllers 326 and 328 which are arranged to sequence through a series of microinstructions developed from combinational logic 248 or control store 232. Components 326 and 328 may be present as a series 2909 marketed, for example, by Advanced Micro Devices, Sunnyvale California. These address units are somewhat typical, having outputs identified in the figure as $Y_0$–$Y_3$ which are coupled with corresponding address lines A0–A7. The latter address lines will be seen to be directed in conventional fashion to control store by line 330 and are clocked internally in conventional fashion at the inputs labeled GCLK. The direct data inputs, $D_0$–$D_3$, and register inputs, $R_0$–$R_3$ to units 326 and 328 are commonly wired and coupled to instructional outputs of the control store 232 along input lines labeled CMD0–CMD7. Control over the processor source of the $Y_0$–$Y_3$ outputs of the units is developed, in conventional fashion at the inputs: $\overline{FE}$, PUP, S1 and S0. These control inputs determine what activities units 326 and 328 carry out to establish a given or next address at line A0–A7, i.e. whether a jump to a subroutine, return to a subroutine end loop or the like functions are to be carried out. Note, that these source control inputs are commonly wired between units 326 and 328 and are coupled to corresponding outputs of an ROM memory component 332. Unit 332 may, for example, be present as an ROM memory, model number 74S288 marketed by Texas Instruments Corp., Dallas, Texas. The device is programmed such that it receives control memory inputs CMC0–CMC3 from control store 232 at corresponding terminals $I_0$–$I_3$ as well as a test input at line 334. The former inputs were earlier described as being presented by data bus 240. Depending upon the signal conditions asserted, unit 332 provides a source control output at data lines $\overline{FE}$, PUP, S1 and S0 as represented generally by the line grouping at 336. Additionally, the unit at 332 provides an enable repeat output (ENRPT) as well as a load repeat output (LDRPT) as labled thereon. The particular programming of ROM 332 is revealed in Table IV wherein the logic conditions at line grouping 336 as well as output lines ENRPT and LDRPT are revealed as they relate with the corresponding inputs of $I_0$–$I_3$ from data bus 240 as well as the test input at line 334. The particular type instruction given for a numerated cycle and next successive step are labeled in Table IV as well as the type of instruction given the stack and counter. The repeat counter enable, ENRPT and repeat counter load LDRPT of component 332 serve to control a repeat counter function shown as cascade coupled counters 338 and 340. These counters are cascade coupled by line 342, have a carry output labeled RPTZ, are internally clocked at GCLK as shown and are coupled with the control store memory 232 by sequential inputs CMD0–CMD7. Note additionally, that the direct and register inputs of address registers 326 and 328 were described as being loadable with the same data, that data being used in next address fashion. Thus, a time sharing arrangement is provided.

with the flow chart at FIG. 6A-6E. For example, an initial test carried out in conjunction with that microinstruction was shown at block 253 wherein the presence or absence of the vertical sync signal was determined. The vertical sync state is represented as an input to register 366 at VSYN. A next test was shown at block 255 with respect to whether the initial position switch was actuated. This test is derived from an input to the testing network at register 366 through input, IP. Simi-

TABLE IV

| Cycle | Comment | | STK | CNTR | | $I_3$ | $I_2$ | $I_1$ | $I_0$ | Test | $S_1$ | $S_0$ | $\overline{FE}$ | PUP | LD RPT | EN RPT |
|---|---|---|---|---|---|---|---|---|---|---|---|---|---|---|---|---|
| ROM 332 PROGRAM |
| 0 | Continue | | Hld | Hld | | 0 | 0 | 0 | 0 | 0 | L | L | H | L | H | H |
| 0 | Jump D | | Hld | Hld | | 0 | 0 | 0 | 0 | 1 | H | H | H | L | H | H |
| 1 | Continue | CNTR = 0 | Hld | Hld | | 0 | 0 | 0 | 1 | 0 | L | L | H | L | H | H |
| 1 | Jump D | CNTR ≠ 0 | Hld | Hld | RPT D | 0 | 0 | 0 | 1 | 1 | H | H | H | L | H | L |
| 2 | Continue | | Pop | Hld | | 0 | 0 | 1 | 0 | 0 | L | L | L | L | H | H |
| 2 | Jump F | | Hld | Hld | | 0 | 0 | 1 | 0 | 1 | H | L | H | L | H | H |
| 3 | Continue | CNTR = 0 | Pop | Hld | | 0 | 0 | 1 | 1 | 0 | L | L | L | L | H | H |
| 3 | Jump F | CNTR ≠ 0 | Hld | Dec | RPT F | 0 | 0 | 1 | 1 | 1 | H | L | H | L | H | L |
| 4 | Jump D | | Pop | Hld | | 0 | 1 | 0 | 0 | 0 | H | H | L | L | H | H |
| 4 | Jump F | | Hld | Hld | | 0 | 1 | 0 | 0 | 1 | H | L | H | L | H | H |
| 5 | Jump D | CNTR = 0 | Pop | Hld | | 0 | 1 | 0 | 1 | 0 | H | H | L | L | H | H |
| 5 | Jump F | CNTR ≠ 0 | Hld | Dec | | 0 | 1 | 0 | 1 | 1 | H | L | H | L | H | L |
| 6 | Jump F | | Pop | Hld | RTS | 0 | 1 | 1 | 0 | 0 | H | L | L | L | H | H |
| 6 | Jump D | | Hld | Hld | | 0 | 1 | 1 | 0 | 1 | H | H | H | L | H | H |
| 7 | Jump F | CNTR = 0 | Pop | Hld | RTS | 0 | 1 | 1 | 1 | 0 | H | L | L | L | H | H |
| 7 | Jump D | CNTR ≠ 0 | Hld | Dec | RPT D | 0 | 1 | 1 | 1 | 1 | H | H | H | L | H | L |
| 8 | Continue | | Hld | Hld | Continue | 1 | 0 | 0 | 0 | 0 | L | L | H | L | H | H |
| 8 | Jump D | | Push | Hld | JSR D | 1 | 0 | 0 | 0 | 1 | H | H | L | H | H | H |
| 9 | Continue | | Hld | Hld | Continue | 1 | 0 | 0 | 1 | 0 | L | L | H | L | H | H |
| 9 | Jump F | | Pop | Hld | RTS | 1 | 0 | 0 | 1 | 1 | H | L | L | L | H | H |
| RP,332 PROGRAM |
| A | Jump R | | Hld | Hld | | 1 | 0 | 1 | 0 | 0 | L | H | H | L | H | H |
| A | Jump D | | Hld | Hld | | 1 | 0 | 1 | 0 | 1 | H | H | H | L | H | H |
| B | Jump R | | Push | Hld | JSR R | 1 | 0 | 1 | 1 | 0 | L | H | L | H | H | H |
| B | Jump D | | Push | Hld | JSR D | 1 | 0 | 1 | 1 | 1 | H | H | L | H | H | H |
| C | Continue | | Hld | LD | LD CNTR | 1 | 1 | 0 | 0 | 0 | L | L | H | L | L | H |
| C | Continue | | Hld | LD | LD CNTR | 1 | 1 | 0 | 0 | 1 | L | L | H | L | L | H |
| D | Continue | | Hld | Hld | Continue | 1 | 1 | 0 | 1 | 0 | L | L | H | L | L | H |
| D | Jump D | | Pop | Hld | Exit D | 1 | 1 | 0 | 1 | 1 | H | H | L | L | H | H |
| E | Continue | | Push | Hld | Push | 1 | 1 | 1 | 0 | 0 | L | L | L | H | H | H |
| E | Continue | | Push | LD | Push/LD CNT | 1 | 1 | 1 | 0 | 1 | L | L | L | H | L | H |

Component 332 serves both to translate the control bits of control store memory 232 as well as to carry out testing activities as represented in flow chart 6A-6E, the latter operation being carried on through inputs thereto from line 334. Line 334 is coupled to a multiplexer 344 which may be of the variety generally designated 74S157 and which has an input from control store 220 labeled CMPOL as well as complementary, true or false input from respective line network inputs 346 and 348. Networks 346 and 348 emanate from three multiplexer components 350, 352 and 354, the Y and W (true or false) complementary outputs of which are controlled by a chip select component 356 available under the designation 74S139, the outputs of which serve to select a given multiplexer 350, 352 or 354 and are controlled from the control store outputs designated CMT4 and CMT5. Note, that the output of component 356 at line 358 controls the chip select, S, input to multiplexer 354, the output thereof at line 360 controls the select, S, input for multiplexer 352 and the output at line 362 controls the select, S, input terminal of multiplexer 350. Multiplexers 350, 352 and 354, operating in conjunction with multiplexer 344, form a test multiplexing function which is controlled, as described, from the control store function 232 by inputs represented at CMT0, CMT1 and CMT2. These multiplexers are fed, inter alia, from registers 364 and 366 and carry out test determinations, a number of which have been discussed in connection larly, the test represented at block 257 is derived by NORM information inserted at register 366, while signals deriving the tests at blocks 258 and 260 are represented by the respective inputs, +X SLEW and +Y SLEW into register 366. The corresponding high velocity levels for such slewing activity are represented at inputs $V_X$ SLEW and $V_Y$ SLEW. The direction of landing input to register 366, as described at block 256, is represented at input LAND X, while the sign information as to direction landing is inserted at register 364 at LAND+, an arrangement described in connection with blocks 260, 270 and 274. The high altitude determination as utilized in several instances, for example at test blocks 288, 289 and 306 and described in conjunction with function 88 in FIG. 5, is represented as the labeled input (Hi. Altitude) to register 364, while the raster field selection for interlacing, as described in connection with test block 301, also is asserted at register 364. Additional inputs to the latter register include the GO input, described at test block 304, which commences address computation within the system, as well as the horizontal blank input (H Blank) evolved at the termination of such address compution as described in conjunction with test block 320. All of these inputs are transferred to the appropriate multiplexers 350, 352 and 354 under the control of the processing function as regulated from control store memory 232. Direct inputs to multiplexers 350, 352 and 354 include the count completion output, RPTZ, of counter 338 as inputed to multiplexer 354, the A/D converter 78 busy signal discussed in connection with FIGS. 6A–6E, represented as a direct input to multiplexers 352 and labeled ADBSY, as well as a word count test input labeled WCTST. Other inputs to these multiplexers will be discussed as their functions arise in the discourse to follow. The word count or WCNT function described earlier at 150 is represented as a pair of cascaded counters identified at 370 and 372. Cascade coupled by line 374, counters 370 and 372 may be of a variety identified as 74LS169 and are loaded with an initial zero valuation at line 376 by an input labeled, LDWCNT, the output of the word count function 150 extending from the cascaded components, labeled WC0–WC4 and terminating in the above-described word count test (WCTST) representing a completion of carrying through a sequential identification of generated lines. Counters 370 and 372 are controlled under the internal clock of the processor as represented at input, GCLK, and are enabled by an input to counter 372 labeled, ENWCNT. The outputs WC0–WC4 of the WCNT function 150, as described earlier, address a given location within Wn ROM 148 and, simultaneously, will be seen to address a particular line generator network. The loading of zero into the WCNT function at line 376 has been described at block 254 in FIG. 6A, while the word count test, at WCTST has been discussed in connection with FIG. 6C at test block 297.

Figure 8:
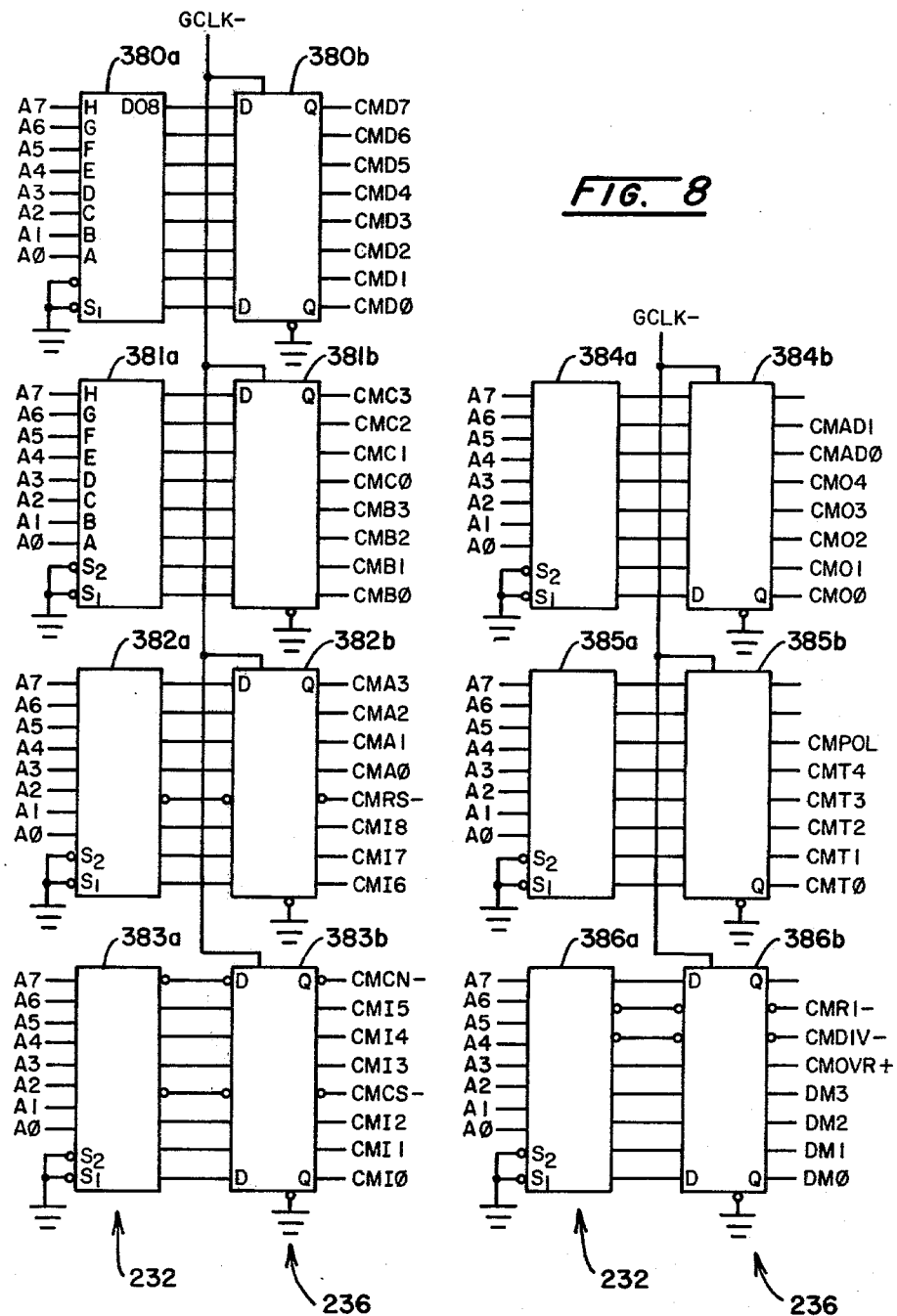
FIG. 8 is a circuit diagram of the control store function represented in FIG. 6.

Turning to FIG. 8, the control store memory 232 is revealed in more detail in conjunction with the pipeline register described earlier in conjunction with block 246. Control store function 232 is present as a plurality of read only memories (ROM) 380a–386a identified generally in the industry as type 74S471, each such memory having an address input A0–A7 in addition to a permanently enabling input, (ROMEN) each of which is coupled to ground. The pipeline register function 246 is present as a series of corresponding commonly internally clocked (GCLK) registers 380b–386b of a variety identified as model 74LS374. These registers carry out the above-identified function permitting the accessing of one address while executing a next prior instruction. The outputs of registers 380b–386b will be seen to be directed to a variety of components, all such components being tri-stated to permit their common connection through discrete enablement as will be evidenced by common input labeling.

Looking more specifically to the outputs of the combination control store ROMs 380a–386a and associated pipeline registers 380b–386b, note that the earlier-described inputs CMD0–CMD7 to address registers 326 and 328 are developed from ROM 380a and register 380b, while the inputs to ROM logic component 332 identified at CMC0–CMC3 are developed from ROM 381a and corresponding register 381b. Control input to multiplexers 344, 350, 352 and 354 labeled CMT0–CMT2 as well as CMPOL are developed from ROM 385a and corresponding register 385b, control input to chip select blocks 356 (CMT3–CMT4) also is developed from the latter components and, as earlier described, a bit sharing is provided with respect to the outputs of ROM 380a and register 380b with respect to the loading of the repeat counter function represented by counters 338 and 340. Other controls emanating from the control store function will become apparent as the description unfolds.

Now, looking to the arithmetic components of the processor function 104 as described generally in FIG. 6 at block 220, a type microprocessor particularly suited for the instant application is identified as model Am3901 marketed, for example, by Advanced Micro Devices, Sunnyvale, California. Generally referred to as a four-bit bipolar microprocessor slice, seven such components are provided in the instant system and are shown in the sequence of FIGS. 9A–9E and identified at 392–398. These components are cascade coupled through a carry look-ahead arrangement associated with the tri-stated coupling ports. In conventional fashion, such carry and look-ahead coupling may be carried out using conventional type 2902 components marketed by Advanced Micro Devices. Control over components 392–398 emanates from a variety of sources, however, the bulk of such regulation derives from the control store microinstructions identified generally at 232. In the latter regard, a nine-bit microinstruction word to these component is organized into three groupings of three-bits each, the grouping CMI0–CMI6 being asserted at inputs identified as I0–I2 selecting arithmetic logic unit (ALU) source operands, grouping CMI3–CMI5 being asserted at inputs I3–I5 selecting the ALU function or operators and grouping CMI6–CMI8 being asserted at inputs $I_6$–$I_8$ determining the ALU destination control function, i.e. the disposition of the output of the arithmetic units of the components 392–398. The units further include a 16-word by four-bit two port random memory (RAM) which represents the situs of the earlier-discussed registers, $R_O$–$R_F$. This memory is controlled or read from a four-bit A address field input as well as a four-bit B address field input. The direct data input terminals of each of components 392–396 are identified as $D_0$–$D_3$ and are derived principally from earlier discussed read only memories 128, 134 and 148. Each unit further incorporates a carry-out, $C_n+4$, which is available as an output for use as a carry flag in a status register. The corresponding carry-in terminal of each unit is designated $C_n$. Looking particularly to component 392, the arithmetic logic unit of each component additionally includes such status-oriented outputs as F=0, testing whether a given result is zero, a negative result output, $F_3$, and an overflow output, OVR. Further, an output, $Q_3$, provides an indication of the most significant bit of a given Q register. the output terminals for each unit are tri-stated and are represented within each component as $Y_0$–$Y_3$.

Figure 9A:
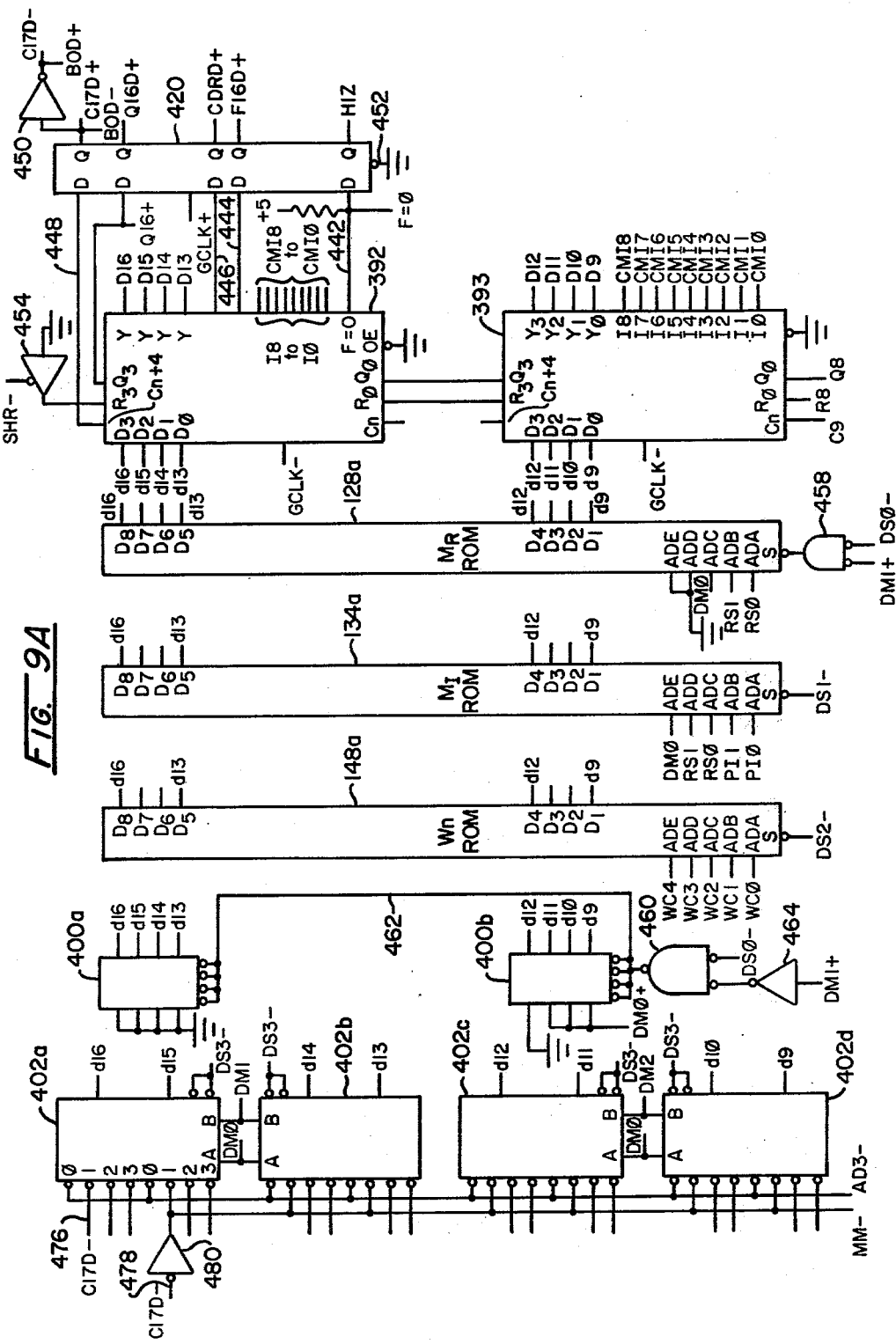

The direct data inputs to components 392–398 are generally derived from the components which appear vertically aligned and to the left thereof within successive FIGS. 9A–9D. In this regard, the read only memory function described earlier in FIG. 5 at block 128 containing runway position data is shown in FIG. 9A at 128a ($M_R$ ROM) as having outputs D1–D8 to which are coupled with respective leads d9–d16, Such tri-state outputs for ROM functions 128, 134 and 156 are commonly connected as represented by the identical labeling, with the corresponding direct data inputs, for example at terminals $D_0$–$D_3$ of processor components 393 and 392. ROM memory 128a is addressed at inputs ADA, ADB and ADC which are coupled with respective address inputs RS0, and RS1 derived from runway select switch 112 and DMO the derivation of which is described later herein. Memory 128a may be of a variety identified as model 74S288 marketed by Texas Instrument Corp., Dallas, Texas.

Similarly, the read only memory deriving aircraft initial position information and described generally above at block 134 in FIG. 5 is shown implemented by memory components 134a and 134b on FIGS. 9A and 9B. The output terminals of memory component 134a are identified at $D_1-D_8$ which are coupled through respective common connections d9–d16 to the direct input terminals of components 392 and 393. Similarly, the data output terminals $D_1-D_8$ of memory 134b are coupled through corresponding lines d1–d8 to the direct data input terminals $D_0-D_3$ of processor components 395 and 394 as labeled. Again, tri-state coupling conditions apply to these memory components. Memories 134a and 134b are addressed by signal inputs PI0, PI1, RS0, RS1 and DM0 which are coupled to their respective input terminals ADA, ADB, ADC, ADD and ADE. Of these inputs, data is derived for the PI0 and PI1 signal inputs from aircraft starting position switch 116, while data for inputs RS0 and RS1 are derived from the runway select switch 112. The final common input to the memories 134a and 134b is identified as DM0 which is described later herein. As before, ROM components 134a and 134b may be of type 74S288 marketed by Texas Instruments Corp (supra).

The read only memory deriving the values, $W_n$, described in connection with block 148 in FIG. 5, are present in FIGS. 9A, 9B and 9C, respectively, as components 148a–148c.

The output terminals of component 148a are identified as $D_1-D_8$ which are coupled, respectively, through connectors d9–d16 to terminals D0–d3 of components 392 and 393 as represented by common labeling. Similarly, output terminals $D_1-D_8$ are commonly connected as labeled d1–d8 to direct data input terminals $D_0-D_3$ of components 394 and 395. The third memory component 148c is provided having output terminals $D_1-D_8$ which are coupled as labeled d7–d0 to the direct data inputs of processor components 396 and 397. Memory components 148a–148c are addressed from word count function (WCNT) 150 and described in FIG. 5 as well as at components 370 and 372 in FIG. 7B. In this regard, the outputs of the latter function, WC0–WC4, are shown commonly connected to the respective address input terminals ADA, ADB, ADC, ADD and ADE of each of the memory components 148a–148c, each of which may be present as type 47S288 produced by Texas Instruments Corp (supra).

Positioned generally to the left of memory components 148a–148c in FIGS. 9A-9D is a grouping of tri-state drivers identified at 400a–400h. These drivers also provide inputs to the direct data terminals of arithmetic components 392–398. In this regard, note that the outputs of drivers 400a and 400b are coupled with the direct data inputs $D_0-D_3$ to components 393 and 392 as represented by labels d9–d16. Similarly, drivers 400d–400c are coupled with the direct drive inputs $D_0-D_3$ of arithmetic components 394 and 395 by common couplings as labeled d1–d8. Drivers 400e and 400f are coupled with the direct data inputs $D_0-D_3$ of arithmetic components 396 and 397 through connections commonly labeled d7–d0, while the inputs of the last arithmetic component 398, $D_0-D_3$, are coupled with the commonly coupled outputs of drivers 400h and 400g as have been identified by the common labeling, d11–d8. The particular functions of tri-state drivers 400a–400h in providing direct data inputs to component 398 are described in detail later herein. Components 400a–400h may be present, for example, as type 74LS125 marketed by Texas Instrument Corp (supra).

Figure 9C:
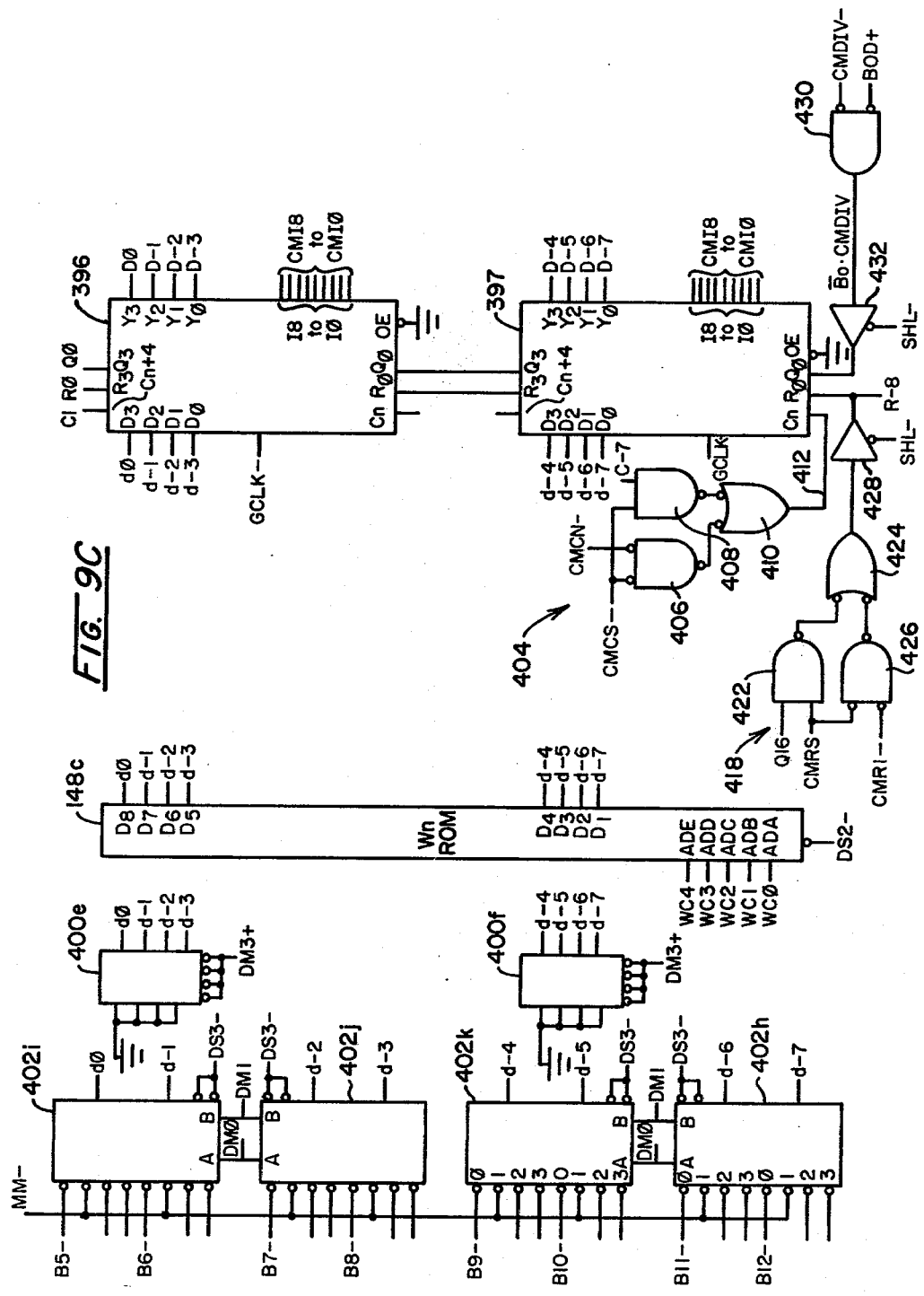

Looking to the left of components 400a–400f in FIGS. 9A-9C, a grouping of multiplexers is revealed which are identified at 402a–402h. Present as dual, four-line-to-one-line multiplexers marketed under the model designation 74LS353 by Texas Instrument Corp. (supra) this multiplexer grouping serves a dual direct data input function with respect to arithmetic units 392–396. For example, of the grouping, multiplexers 402g–402h are coupled to receive data from A-D converter 78, as described in connection with FIG. 5. The direct data outputs for the multiplexers are identified, looking from FIG. 9C to FIG. 9A, as d7–d16 and the common connections thereof with arithmetic units 392–397, as is illustrated by the common labeling arrangement discussed above, are permissible by conventional tri-stating networks. Inputs to multiplexers 402g–402h from converter 78 are labeled in FIGS. 9B and 9C at twelve locations designated $B_1-B_{12}$. As indicated earlier, these inputs represent a number of eleven-bit extent with a, twelfth, sign bit uppermost at B1. Inasmuch as a word of 28-bit length is utilized in position determination for the system as discussed above, it is necessary that a sign extension function be provided and this function is developed in conjunction with the uppermost multiplexers 402a–402f. For example, when the sign-bit is a 1, then a series of ones are inserted within multiplexers 402a–402f and, conversely, when the sign-bit is 0, then a series of zeros is inserted in these sign extension multiplexers. Returning to a consideration of the arithmetic units 392–398, as indicated earlier, the principal control over these units emanates from the control store 232 instructions through memory signal outputs CMI0–CMI8. However, other inputs are provided. For example, the arithmetic unit 398 treating the least significant bit data being considered is not utilized where, for example, only a 24-bit word is being processed, component 398 being only selectively utilized. Note that the output of carry terminal, Cn+1 of component 398 is labeled C-7. This output is coupled into a multiplexer function represented generally at 404 in FIG. 9C which includes two AND functions 406 and 408 in combination with an OR function 410. These functions are shown implemented by AND and OR gates. Additionally, the slash mark leading to the input of function 408 indicates a complementation and such complement indicia will be observed elsewhere in the figures. The inputs to multiplexer function 404 include CMCS and $CMC_n$ each emanating from ROM-pipeline register combination 383a–383b. The output of function 404 is directed along line 412 to the carry, Cn, input of arithmetic component 397. Thus, upon appropriate instruction from the control store memory 232, the carry output of component 398 is utilized in connection with 28-bit word length integration procedures. On the other hand, where the CMCS instruction is true, then the signal CMCn is asserted at line 412 to the carry input of arithmetic component 397, in effect dropping out component 398 to provide for 24-bit computation (see block 262 of FIG. 6A).

Another multiplexer function leading into component 397 is represented generally at 418. Multiplexer function 418 is utilized in conjunction with the division operations described in the flow charts (FIGS. 6B and 6D) at respective blocks 280 and 305. Recall from the description of those blocks that a long left shift is carried out between the $R_7$ and Q registers. This shift requires application of the most significant bit (outputed at a signal, $Q_{16}$) of the Q register of uppermost arithmetic component 392 as developed at the Q register output thereof labeled, $Q_3$. The $Q_{16}$ signal is treated at a pipeline register 420 and outputed as a delay signal at a line labeled $Q_{16D}$. The untreated $Q_{16}$ signal is presented with control memory output $\overline{CMRS}$ to the inputs of an AND function 422 the output of which is asserted at the input of an OR function 424 in conjunction with the output of a second AND function 426. The inputs to the latter derive from control store and are designated CMRS and CMRI. With the arrangement shown, depending upon the instruction developed from control store and asserted from pipeline register 328b, either the most significant bit input signal $Q_{16}$ or the control store memory signal CMR1 from pipeline register 386b is asserted through a tri-state driver 428 to the $R_0$ input of component 397. Thus, when a long left shift is carried out, the most significant bit of the Q register of component 392 is shifted into the least significant position of the $R_7$, register. Inasmuch as the Q and R terminal conditions of the arithmetic units are bi-directional, the tri-state driver 428 is required and this driver is selectively enabled in consequence of a signal input thereto designated, SHL. It may be noted that the arithmetic units are incapable of carrying out this operation internally, thus the arrangement shown is utilized. A similar tri-state arrangement is asserted at the $Q_0$ terminal of component 397 as developed from the output of AND function 430 and treated by tri-state driver 432, the latter driver again being enabled in the presence of an appropriate shift left, SHL input signal. AND function 430 is shown receiving a signal input, CMDIV from the microinstruction control store register 386b as well as borrow input, $\overline{B_0D}$ which provides for an output expressed as: $\overline{B_0D}$. CMDIV. Borrow signal, $\overline{B_0D}$, is derived from component 392 as a complementary output of inverter 450. The function operates such that when a division operation is in progress, if there is no borrow condition at component 392, then a quotient bit representing 1 is loaded into the Q register of component 397. If a borrow bit is present, then a zero is loaded. Looking to FIG. 9D, a tri-state driver 434 is shown receiving an R-8 input and upon enablement from a shift right SHR signal, provides an input to the $R_3$ terminal of component 398. The enablement function thus provided at driver 434 serves to include component 398 within a computational procedure where a full 28-bit operation is called for. This will occur during the earlier-described integration procedures as discussed in connection with block 262.

The shifting instructions, SHL and SLR are developed from a decoding of the microinstructions inserted at the $I_6-I_8$ terminals of the arithmetic units. It may be recalled that these input instructions are those associated with ALU destination controls. Looking momentarily to FIG. 10, the decoding arrangement developing these instructions is revealed generally at 436 as including two AND functions 438 and 440. One input to AND function 438 is labeled CMI7, while the opposite input thereto as well as one input to AND function 440 derives from a signal CMI8. These signals are derived from the control store memory through pipeline register 328b to develop the labeled SHL and SHR output signals.

Returning to FIG. 9A, pipeline register 420 is shown coupled with a variety of terminals of arithmetic unit 392. This pipeline register has been described in FIG. 6 at block 230 and represents a functional extenuation of the pipeline registers described in conjunction with the control store function 232. The register may be present as a type 74LS374 described supra. It may be noted that in addition to the most significant Q register bit, $Q_{16}$, the pipeline register 420 receives and treats various condition code bits in response to the internal clock GCLK of the processor function in conventional manner. Note for example, that a zero result is detected at terminal F=0 and passed to register 420 through line 442 to be presented at the output thereof as a high zero signal labeled $H_iZ_D$. This output apprises the system of a condition wherein the upper eight bits are zero. A negative result is detectable at terminal $F_3$ and the signal thereat is inserted along line 444 to be developed as an output signal $F_{16D}$. An arithmetic over or under flow condition is presented from terminal OVR through line 446 to be produced as an output signal labeled $OVR_D$ and the presence of an output carry is asserted along line 448 to be developed as the pipelined most significant carry bit signal $C_{17}D$ which signal may be inverted at 450 to provide the output signal labeled $C_{17}D-$ and complemented to provide the borrow signal, $B_0D$. Register 420 is continuously enabled by grounding through line 452. An additional input is provided at the uppermost portion of arithmetic component 392, zeros being entered into the $R_3$ terminal thereof through tri-state driver 454. This entry of zeros occurs when the value SHR is true, such SHR − input being present as an enabling input to driver 454.

Now looking to the enablement of the direct data input components thus far discussed, ROM memories 148a–148c, 134a–134b and 128a as well as tri-state drivers 400a–400h and multiplexers 402a–402h will be seen to be enabled by instructions developed from control store memory 232 through pipeline register 386b as well as by signals derived therefrom. Turning to FIGS. 11 and 12, it may be seen that control bits DM2 and DM3 additionally may be utilized in conjunction with a decoder 456 which may be of a model designated 74S139 marketed by Texas Instruments Corp. (Supra) to evolve a further four-bit output combination labeled at DS0–DS3.

Looking additionally to FIG. 12, a tabulation is provided showing the outputs achieved with the condition of control signals DM0–DM3 as well as the components which are enabled from their combination and the outputs of decoder 456. Note, that when DM2 and DM3 are zero, the output DS0 is true while, when DM3 is zero and DM2 is one, the DS1 is true, and so forth. Also aligned with these bit combinations in FIG. 12 are functions which are enabled.

Returning to FIG. 9A, note that AND function 458 is connected such that its output is coupled with the enabling input terminal, S, of ROM 128a. The input to AND function 458 is labeled as DM1 in combination with a slash representing a complementation of that input as well as DS0. Thus, when signal DM1 is false, signal DS0 is true and the output to the enabling terminal, S, becomes true.

In similar fashion, ROM memory components 134a and 134b are enabled with the presence of a true enabling signal DS1 at their enabling input terminal S. Further, ROM components 148a–148c are enabled in the presence of a true signal, DS2, at their enabling inputs, S.

The enabling inputs of tri-state drivers 400a and 400b are shown commonly coupled through line 462 to the output of an AND function 460. One input to function 460 is coupled to receive a DS0 signal, while the opposite input thereof is coupled through an inverter 464 to receive the input signal DM1. Note, that the inputs to driver 400a are coupled to ground and thus will develop zeros at the outputs thereof labeled d13-d16, while the initial three inputs of driver 400b are coupled to receive signal DM0, the uppermost input terminal being coupled to ground. Thus, with appropriate enablement and a true input, DM0, a number representing, KN, may be presented at outputs d9-d16, or a zero may be presented thereat, or a rounding function may be evolved. As represented in FIG. 12, KN, is developed when, DS0, is true, DM1 is 1 and DM0 is 1. Similarly, a zero or round valuation is derived when DM0 is zero, DM1 is 1 and DS0 is true. As is apparent, these data are coupled to the direct data inputs of appropriate ones of the arithmetic components 394-398. Considering the direct data of coupling inputs to the arithmetic components, it may be observed that the number of such couplings varies with the extent of the ROM memories as at 148, 134 and 128. Essentially all 24 direct data inputs of the arithmetic units are driven from ROMs 148a-148c. However, only eight bits are utilized to drive the arithmetic units from ROM 128a. As a consequence, the bits lower in significance within the processor function must be driven to zero in order to achieve proper arithmetic operation.

Looking particularly to FIG. 9B, it may be observed that all eight bits for ROMs 148b and 134b are specified, however no such direct data drive to arithmetic units 394 and 395 is provided when ROM 128a is enabled from signal DS0. Accordingly, tri-state drivers 400c and 400d, the inputs of which are grounded, are enabled from the same DS0 signal to provide a zero drive at connections labeled d1-d8 to insert corrective zeros into the direct drive terminals of components 394 and 395. Note, that zeros are provided to drive the direct data inputs in the event that tri-state drivers 400a and 400b are utilized to either insert corrective zeros or the value KN. Looking to FIG. 9C, it may be observed that it is necessary to drive zeros to the direct data inputs of arithmetic components 396 and 397 whenever the system calls for zeros, KN, the activation of ROM 134 or ROM 128. This zero drive is provided from tri-state drivers 400e and 400f, the inputs of which are coupled to ground and the outputs of which are coupled, as labeled at d7-d0, with the corresponding direct data inputs of the arithmetic units. Note, that enablement occurs for these drivers in the presence of a $\overline{DM3}$ the small slash being noted at the input to the enabling ports. Observation of FIG. 12 shows that DM3 is a zero in the presence of KN, initial position data from ROM 134b as well as a zero requirement.

Returning to the series of multiplexers 420a-402h, as indicated earlier, one channel of these multiplexers receives, through input terminals labeled B1-B12, the twelve bits of data from A-to-D converter 78, that bit inserted at terminal B1 being a sign bit. The latter digital position represents the most significant bit of the A-to-D converter output, however, the corresponding most significant bit position for the arithmetic units is a component 392. Consequently, it is necessary to extend the value of the sign bit of the A-to-D converter upwardly through the array of multiplexers to uppermost multiplexer 402a. Thus, through common connection with one channel of each of multiplexers 402a-402f, the sign bit is transferred from the intput labeled B1 through amplifier function 466. Note, that multiplexers 402a-402h are enabled from a DS3 signal and the channels thereof are selected from the DM0 and DM1 signals. The logic arrangement for enablement in channel selection again is outlined in FIG. 12. The tabulation in the figure reveals that when DM1 is zero and DM0 is one then a min/max operation ensues, representing a second function of the multiplexer.

The min/max function of the system is provided to accommodate for the presence either of an underflow or overflow from an output carry bit. For each arithmetic procedure carried out by the instructions, a follow-on instruction is provided which calls for the conditional loading of a pertinent register with either the minimum or maximum data value which the system can accommodate. For example, as discussed in FIG. 9A, the most significant carry bit of component 392 as represented by the label $C_{17}D$, having been treated at pipeline register 420, is utilized to condition multiplexers 402a-402h.

Typically, the implementation of the overflow or underflow condition is carried out by typical tests and jumps within the microinstruction program. In the instant system, however, a much more simple arrangement is provided. Looking additionally to FIG. 13, it may be seen that the microinstruction signal CMOVR representing a conditional enablement from control store 232 as developed from pipeline register 386b is applied to one input of an AND function 468. The opposite input to function 468 is from the overflow bit of component 392 as treated at pipeline register 420 and labeled $OVR_D$. The output of function 468 is directed along line 470 to one input of an OR function 472. The opposite input to OR function 472 is labeled CMI7 and derives from the control store through pipeline register 382b. The output of the thus configured logic network at line 474 is coupled to the $I_7$ logic input terminals of arithmetic units 392-398 and, thus, serves as an interrupting network between the control store memory and the arithmetic unit. With such an arrangement, where $OVR_D$ and CMOVR are true simultaneously, then the signal at output line 474 and at terminals $I_7$ is forced to be a one. This causes the max/min value of multiplexers 402a-402h to be loaded as a direct data input to component 392-398. Where this is not the case, then input to terminals $I_7$ from line 474 is a zero which provides the logic within units 392-398 to carry out a NOP (no operation) microinstruction wherein the min/max value is not loaded.

The loading of multiplexers 402a-402h is provided, as shown in FIG. 9A, by insertion of a $C_{17}D$ signal representing the most significant carry bit of component 392 as treated by pipeline register 420. Note, that this signal is applied both to lines 476 and 478 at the input of multiplexer 402a. Line 478 leads through a buffer-inverter stage 480 and is complemented as indicated by the slash such that the signal $\overline{C_{17}D}$ is applied to the indicated terminals of multiplexers 402a-402h. With this arrangement, when the value $C_{17}D$ is one, then a minimum number is applied and, conversely, where that signal is zero, then a maximum numerical value is applied to the multiplexers.

Looking to FIG. 9D, driver 400h serves to provide the min/max function for component 398. Note in this regard, that the signal that the most significant bit signal $C_{17}D$ is applied and complemented to the commonly wired inputs of component 200h and the resultant signal is asserted in the same manner as described above to the direct data inputs of component 398 in the presence of a true DS3 signal. Thus, the min/max arrangement of the system is extended to the lowermost one of the array of arithmetic components 392–398.

Driver 400g in FIG. 9D is utilized to provide a rounding bit within the system where a 24-bit word length is utilized, a condition obtaining during the majority of operational time. Driver 400g receives a data input of 4-bits, the three least significant of which are zeroes, as represented by the common grounding at line 482. The most significant bit of the inputs is derived from signal DS1 which, as indicated by the slash, is complemented to $\overline{DS1}$. Enablement of component 400g is from the DM3 signal which is complemented to a $\overline{DM3}$ value as indicated by the slash. Thus, when DS1 is not true a one is present at output line d-8. The rounding procedure is one wherein a one is added to the d-8 level and, if that generates a carry, such carry is reflected in the upper more significant 24-bits. Recall that the selection of a max or min number for insertion at the inputs to multiplexers 402a–402h is further outlined in connection with FIG. 12.

Looking to FIG. 14, a network for altering a command code of arithmetic component 392–397 to halt the carrying out of the subtractive process utilized in binary division is revealed. An AND function 484 is shown having one input coupled to receive a borrow signal, $B_0D$ from pipeline register 452 as well as a command signal, CMDIV, from control store memory pipeline register 386a–386b. The output of function 484 is present at line 486 and is applied to one input of an OR function 488. The opposite input function 488 is provided from control store register and associated pipeline 383a–383b as a signal CMI1 and the OR function provides an output at line 490 which is coupled to each of the $I_1$ terminals of arithmetic components 392–387. With the arrangement, when the borrow signal $B_0D$ is true, then the division operations are included.

Looking to FIG. 15, decoder components are shown at 492 and 494 which represent a function providing major control outputs for the processor. Each of the decoders may be present as a type 8205 marketed, for example, by Intel, Corporation, Santa Clara, Calif. The inputs to decoders 492 and 494 are derived from respective control store and pipeline register components 384a and 384b, as well as a signal representing an early clock, ECLK, to be described later herein. The outputs of decoder 494 are directed to word count function 150 providing an enablement signal, ENWCNT and a load signal, LDWCNT asserted thereat. The latter signal has been described as being present at line 376. Component 492 provides clocking signals, CLKY and CLKX which are directed to digital-to-analog converters 204 and 208 and represent respective earlier described control lines 210 and 208. The remaining outputs of component 492 are: ROMCLK which provides a clocking input signal to ROM address function 174; CLRSR and LDSR signals representing a load and clear function asserted at line generator function 166 and ADCLK representing a clock signal to converter 78. These outputs from component 492 will be considered later herein in conjunction with their associated function.

Now looking to the selection control utilized in conjunction with the plurality of line generator networks contained within line generation function 166, reference is made to FIG. 16. This figure reveals a decoding tree comprised of 4 type 8205 decoders marketed, for example, by Intel Corporation (supra). Inasmuch as 20 line generator networks are utilized in connection with the instant system embodiment, outputs are provided from three such decoders 496–498, the outputs of the forth decoder 499 being utilized to evoke a required 20 combinations of selection. The principal input of decoders 496–499 derive from the output of the word count function 150 described in connection with FIG. 7B. Recall that the outputs of that function, WC0–WC4, are utilized to select an appropriate line generator. In this regard, the WC0–WC2 outputs are coupled with the corresponding respective $A_0$–$A_2$ inputs of decoders 496–498. The remaining outputs of word count function 150, WC3 and WC4, are coupled with the respective $A_0$, $A_1$ input terminals of decoder 499. One each of the outputs, WG0–WG2 of decoder 499 are coupled to an input of a respective decoder 496–498. The latter decoders additionally receive the shift register load signal described in connection with FIG. 15, LDSR. Thus configured, the decoding tree provides twenty of a possible 32 combinations available from word count function 150 for selecting successive line generator networks. The outputs of decoders 496–498 are directed through corresponding driver-invertors to provide outputs therefrom as are successively labeled LD0–LD19. Each of these outputs leads to a given line generator network for selective enablement purposes.

Looking now to the implementation of the line generation function described at block 166 in FIG. 5, reference is made to FIG. 17. As indicated above, a plurality of line generator networks are provided with the system of the invention, each such network generating a line, for example as described at 60 in FIG. 2D which extends invisibly from a vanishing point, VP, and visibly below horizon 30. The generated lines define all linear image components which extend from the observer toward the vanishing point. Such generated lines form boundaries of all image components at screen 18 including runway edges, runway number edges, runway centerline, etc. and all differentiations between terrain regions as considered in a direction toward the vanishing point. As described in connection with FIG. 6A–6C, processor function 104 serves to compute a slope value for each of the line generator networks during that portion of a raster scan wherein the image is being traced above the vanishing point, VP. Following the computation of a numerical value representing an initial image increment corresponding with a computed slope, as described at block 296 in FIG. 6C, the contents of an appropriate processor function register, $R_5$ are loaded into a shifter network of a selected line generator network. Looking to FIG. 17, a line generator network is revealed generally at 502. Network 502 includes three, four-bit magnitude comparators 504–506. Comparators 504 and 505 of this grouping are coupled to receive the nine-bit binary informational output of a later-described horizontal counter network within timing logic function 160. These bits, representing a portion of horizontal scan information, are identified as HC0B–HC8B and are asserted at the A input terminals of the comparators. The binary information thus provided at the A terminals of the comparators develops at a predetermined frequency from a zero value to a predetermined digital value, such as 511, which represents the completion of one horizontal beam scan, thus to define a single line at the raster. The B terminals of comparators 504 and 505 are coupled to receive a line generator numerical output number representative of the proper position of a given generated line increment for a given horizontal raster beam sweep. Thus, upon achieving an equality between the A and B terminals of these comparators, a signal may be derived which is utilized to unblank the raster beam and create a line image increment. Comparator 504 is coupled to comparator 506 through line 508 and 510. Line 508 conveys information as to whether the values at terminals A are greater than those at terminal B, while line 510 conveys information as to whether the values at terminals A are less than those at terminal B. Similarly, lines 512 and 514 convey the same information with respect to comparator 505, while line 516 conveys a condition of equality between the numbers at terminals at A and B of the comparator. The resultant output at lines 518, 520 and 522, respectively, provides a signal representing a condition where the horizontal count is greater than the slope count, less than the slope count or an equality exists between the horizontal count position and the count representing the position of a generated line. Comparators 504–506 may be of the type 74LS85, marketed by Texas Instruments, Inc. (supra).

The numerical data asserted at the B terminal inputs to conparators 504 and 505 is identified by binary positions L7–L15 and is transferred to those comparators by two multiplexer-register components of a grouping of four thereof identified at 524–527. Marketed under the designation 74LS399 by Texas Instruments, Inc., (supra), these components serve a multiplexer function selecting either a hard wired numerical value representative substantially of the horizontal midpoint of the raster, i.e. the vanishing point position as developed at terminals $A_1$-$D_1$ or the generated line information at their input terminals $A_2$-$D_2$. Another function of the components is to provide a short term memory within network 502. Output terminals $Q_A$-$Q_D$ of components 524 and 525 and terminal $Q_D$ of component 526 serve to transfer the more significant positions of the binary line generator numerical values present at the labeled output positions L0–L15. Note in this regard, that positions L0–L6 are not coupled with comparators 504 and 505.

Terminals $A_2$-$D_2$ of components 524–527 are connected by a line grouping represented generally at 530 with corresponding terminals $Z_1$-$Z_4$ of four, four-bit binary full adders 532–535. The carry out of adder 535 is coupled at line 536 to drive the carry in of adder 534, while the carry out of adder 534 is transferred by line 538 to the carry in of adder 533 and, similarly, the carry out of adder 533 is transferred to the carry in of adder 532 by line 540. Adders 532–535 may be those marketed as type 74LS283 by Texas Instruments, Inc. (supra).

The A terminal inputs of adders 532–535 are connected with appropriate ones of the corresponding Q terminal outputs of components 524–527. In the interest of clarity in the drawing, the same alphanumerical designation is provided for the respective outputs and inputs of these components. By the arrangement, a feedback from components 524–527 representing slope related generated line horizontal position is fed to the input of the sequence of adders 532–535 and, thus, an arithmetic accumulator function is developed for line generator network 502. The opposite, B, terminal inputs of adders 532–535 are provided from the corresponding output lines of a shifter network shown generally at 542 and mentioned in connection with block 296 of FIG. 6C. Network 542 is formed of four cascade coupled shift registers 544–547 which may be of type 74LS96 marketed, for example, by Texas Instruments, Inc. (supra). The A-E terminals of registers 545–547 are arranged to receive the direct data inputs D-6-D8 from processing function 104 as are evolved from the outputs of arithmetic components 396–397. The uppermost register 544 is arranged to receive a modified most significant output bit, D16B which is evolved from uppermost component 392 of the processor function arithmetic units. Note, that this signal is directed both to the A and B input terminals of register 544. The Q output terminals of components 544–547 are coupled to convey the slope related imaging numerical data represented by input terminals D-6-D8 to adders 532–535 in a particular manner. In one mode of operation, dependent upon the condition of the shift (SHIFT) signal input to the registers from line 548, the binary number retained by the registers is available in unaltered form at output terminals $Q_A$-$Q_E$. However, with a SHIFT input at line 548, the data within the registers are shifted upwardly one bit position to effectively double the number. This shifting is developed to accommodate for the conventional interlacing carried out in raster development. A field zero and field one are sequentially generated in connection with such interlacing and, for a given frame the horizontal increment between adjacent image components of any generated line for a field will be determined by the spacing of two scan lines. Thus, during field one image definition at the vanishing point level, the interlacing field for a generated "line" will be positioned half a slope defining normal horizontal increment from the vanishing point. By carrying out a shift in network 542 wherein, commencing with position D-6, the data is shifted upward to output $Q_B$, a numerical value for the distance of the image increment from vanishing point will essentially be divided in half. The first scan line of any field one below the vanishing point is one-half of a normal slope related horizontal spacing. The SHIFT input to line 548 is derived from the timing network 160 and treated as described later herein. Thus, assuming the presence of a field zero and field one are to comprise any given frame, the development of an image increment for a generated line for the first scan line of field one below the vanishing point is one-half the value of a normal horizontal spacing from that vanishing point. Processor function 104 provides for the application of a slope number at the inputs of shifter network 542 by first carrying out a clear operation as labeled CLRSR$_D$ at line 550, following which a load command LDn specific to a predetermined one of networks 502 is applied to line 552. Line 552 will be seen coupled with the preset terminal, PR, of each component 544–547, while line 550 is shown coupled to the clear, CLR, terminals of those components. The load command emanates, as described above in connection with FIG. 16, in accordance with the line generator network 502 selected by the word count function 150. Similarly, the CLRSR$_D$ signal is derived initially from decoder 492 described in connection with FIG. 15, which signal is buttressed, as represented in FIG. 17 by appropriate inverter-buffering functions 554–556. Multiplexer-registers 524–527 are enabled at their select ports, WS by an ENACCUMB signal asserted at line 558 and derived from timing function 160. The parent signal for this function, ENACCUM is shown in FIG. 18 as being treated by inverter-buffering or driver functions 560–562 prior to assertion at, inter alia, line 558. Transference of the data within components 524–527 is synchronized with an HSYN signal asserted at line 564 and derived from timing function 160 and asserted at line 566.

As is apparent, the bit capacity of dders 532–536 is relatively large with respect to the input of horizontal increment-slope data to comparators 504 and 505. Only a predetermined portion of the slope designating value is utilized due to the limited number of digitally designated horizontally defined image components, i.e., about 512 image components or units will be available for practical utilization across a given raster.

Looking to FIG. 19, the horizontal count information as asserted at comparators 504 and 505 and derived from timing function 160 is shown as it is treated by inverters 568–576. Similarly, the SHIFT signal from timing function 160 is treated by inverter-buffering or driver functions 577 and 578, while the HSYN signal derived from timing function 160 is pretreated by inverter-buffering or driver function 579. The loading of shifter network 542 as evoked at the logic of the processing function has been described in connection with FIGS. 15 and 16, wherein the signal, LDSR, is developed at decoder 492 and asserted at components 496–499 as shown in FIG. 16.

The sign bit of the data asserted at shifter network 542 from processor function 104 is derived from arithmetic component 392 and buffered as shown in FIG. 20 at inverter-driver function 580 and 581 to provide a signal designated d-16$b$ which is applied to the A and B terminals of shift register 544. This signal is passed both through the $Q_A$ and $Q_B$ terminals thereof in the presence of an appropriate loading signal at line 552.

The relatively larger number of bits (D-6 through D-8) provided in evolving slope information has been found to eliminate vagaries and image development which might otherwise occur with a slope valuation of fewer digits. For example, a raster readout present as a series of spaced greenish colored dots may occur with slope numbers of smaller extent. The slope number capability also is selected such that very shallow slopes which, in effect, extend the resultant sloping line somewhat above the horizon line 30 from the vanishing point are provided as a consequence of the larger number. This is found to improve the image at such critical points in the operation of the system as at or near touchdown when very broad slopes are encountered as they relate to the edges of the runway or terrain extending adjacent thereto.

Arithmetic overflow of the slope computation is detected by a network 584 which comprises an exclusive OR function 586, and OR function 588 as well as an AND function 590. These components cooperate to prevent a phenomenon designated "wrap-around" wherein a slope overflow evaluation would evolve an unwanted sloping line misplaced from its proper position upon the raster. To detect overflow, the sign bit, as evolved at component 392, is tapped by line 590, while the carry bit of adder 532 is detected at line 592. Line 590 is coupled by line 594 to one input of gate 586, while line 592 extends to the opposite input thereto. The output of gate 586, present at line 596, represents not overflow, a condition of overflow being expressed by the Boolean expression: (Sign Bit·Cy + $\overline{\text{Sign Bit}}$·$\overline{\text{Cy}}$.) In the foregoing expression, the term "Cy" is intended to mean the carry bit. Line 596 is coupled through line 598 to one input of gate 588, while the opposite input thereto at line 600 is inverted as indicated by the slash and represents the signal ENACCUMB as described earlier in connection with line 558. The output of OR gate 588 is asserted along line 602 at one input to AND gate 590. Thus, with the condition of an overflow, the synchronizing pulse input at line 566 to gate 590 will not be available to multiplexer-registers 524–527 and generated line components will not be evolved at the raster. In effect, where there is no overflow the clock function to the line generator from line 566 is enabled.

Overflow network 584, while preventing the noted improperly positioned generated line images, in itself evokes another discrepancy in imaging. Especially at larger slope values wherein the generated lines commence to approach the horizon line 30, network 584 will cause the system to limit the horizontal extent from the vanishing point wherein image component definition is made available. This outer horizontal limit then will be repeated vertically down (y direction) the raster to evoke a series of vertically aligned dots, an undesirable condition for the system. To correct this condition, a network 604 is provided which serves to disable the resultant video output representing an overflow condition, the accumulator function as carried out ultimately at components 524–527 being disabled for the overflow condition itself. Network 604 comprises two NAND gates 606 and 608, the output of the former being inverted, as indicated by the slash mark, and coupled to the $A_3$ terminal of comparator 506. Similarly, the output of gate 608 is inverted as indicated by the slash marks, and coupled to the corresponding $B_3$ terminal of comparator 506. One input to gate 606 as well as the input to gate 608 at line 610 are arranged to receive an overflow signal as developed by the inversion of the not overflow signal at line 596. The opposite input to gate 608 is provided from line 591, while the corresponding second input to gate 606 is derived from the inverted signal at line 604. Recall that the A terminal inputs to comparator 506 represent horizontal counter information commencing with the left side of the raster and counting across to the right thereof, while the B terminals are coupled to receive slope related horizontal position information from the line generator function. In the presence of overflow, terminal $A_3$ receives a signal representing a horizontal count condition less than the slope related count number to cause comparator 506 to present the output condition A<B as set forth at line 518. This corresponds with a disablement of a positive slope generated line image terminus under overflow conditions. Conversely, for negative sloping generated lines evolved in the presence of an overflow condition, the output of gate 608 will be such that the counter valuation is greater that the slope related generated line increment valuation at the terminus thereof, a signal presented at line 522. In consequence of the latter signal input, no image increment will be developed at that horizontal position representing the terminus before overflow of a given generated line. Note, that the entire condition described above is corrected by network 604 containing only two gates, an approach to correction of the unwanted condition which is simple and inexpensive to provide. The disabling function of network 604 will become more apparent in the discussion of the utilization for video generation of the signals at line 518, 520 and 522.

Figure 21A:
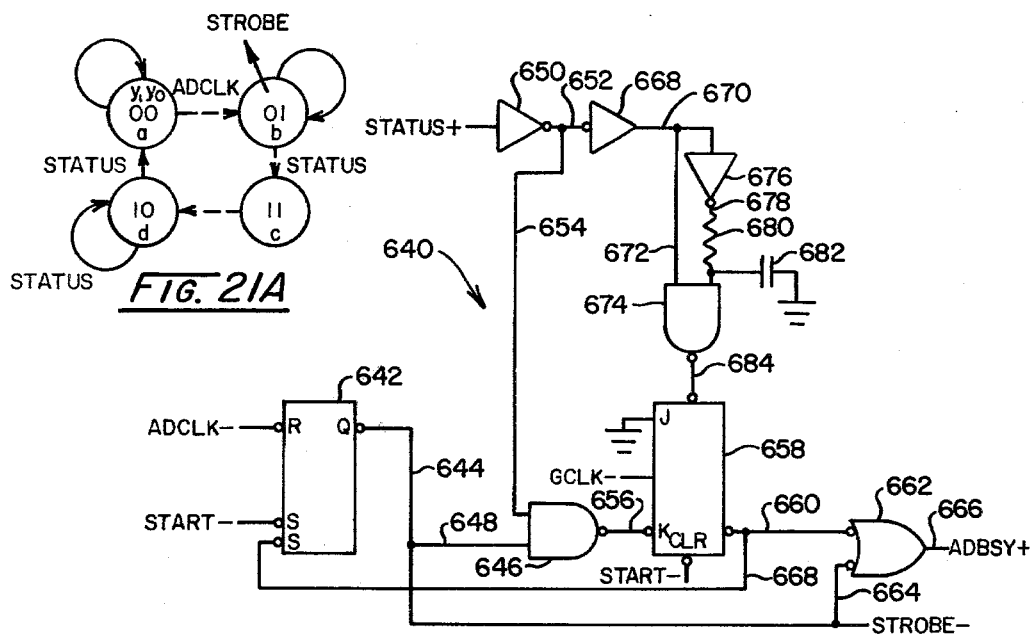
FIG. 21A is a state diagram for use in conjunction with FIG. 21.
Figure 21:
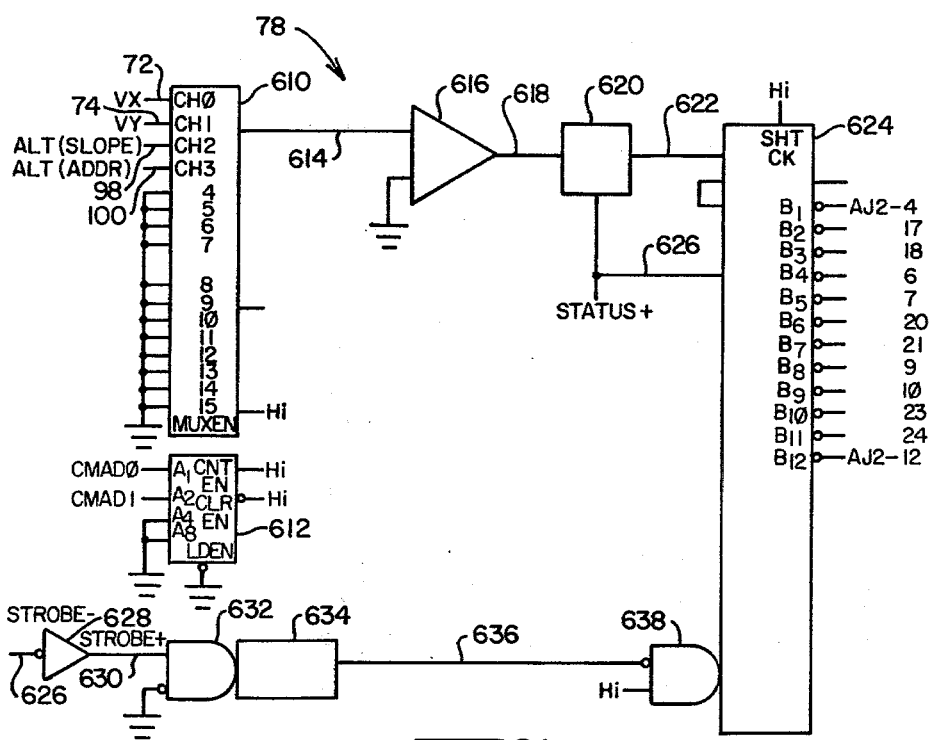
FIG. 21 shows a schematic diagram of a network for carrying out analog-to-digital conversion.

Returning to FIG. 5, an A-to-D convertor 78 was described as receiving analog signals representative of velocity in the X and Y direction, as well as altitude signals treated either for ROM address purposes or slope purposes. The convertor then develops a twelve bit word from whichever of the input channels thereto have been selected by processor function 104 as represented by a control 102. Looking to FIG. 21, converter function 78 is described in more detail and is again represented in general at 78. The components shown in the figure are available in the marketplace in modular form, for example being marketed by Burr-Brown, Incorporated, as model No. SDM 853, Tucson, Arizona. The coupled preliminary analog-multiplexer components of the device are represented at blocks 610 and 612, the input channel terminals thereof CH0–CH3 being shown coupled with respective input lines 72, 74, 98 and 100. Additionally, these lines are labeled with the corresponding velocity and altitude input signal which they receive. Channel selection by multiplexer 610 is predicated upon an input from processor function 104 as derived from ROM-pipeline register combination 384a–384b and represented in the figure at CMAD0 and CMAD1. Upon selecting a channel, multiplexer 610 serves to transfer the analog information thereat along line 614 to an instrumentation amplifier 616. From amplifier 616, the treated information signal then is directed along line 618 to a sample and hold function 620, from which the treated signal is passed along line 622 to the input to an analog-to-digital converter 624. The output terminals, B1–B12 of converter 624 are coupled, as earlier described, to the input terminals of multiplexers 402g–402h. While a conversion of the signal applied from line 622 to digital form is in progress, a status output at line 626 is developed from converter 624. Converter 624 commences operation following the assertion of a STROBE signal at line 625 which is passed through an invertor buffer 628, thence along line 630 and AND function 632 to a timing function represented by block 634. Block 634 asserts about a 9 microsecond delay in the strobe signal for purposes of accomodating various vagaries in the system and permitting the sample and hold function 620 to perform adequately. Following such delay, a strobe input is asserted along line 636 and through gate 638 to cause the commencement of a conversion of the analog signal at line 622 to digital form.

Control over the analog-to-digital function thus described is generated from network 640, the initial input to that network being present at a set-reset flip-flop of type 74LS279 shown at 642. The reset input to flip-flop 642 is coupled with the start button (start signal) of the system described earlier at 111 in FIG. 5, while the R terminal of flip-flop 642 receives an ADCLK input signal from processer function 104, as derived at decoder component 492 described in connection with FIG. 15. The $y_0$ output at the Q terminal of flip-flop 642 is present at line 644 which develops the STROBE input at line 626, and is coupled to AND function 646 in complementary fashion, as represented by the slash, through line 648. The opposite input to function 646 derives from the STATUS signal at line 626 which is passed through an inverter-driver 650 and lines 652 and 654. At the latter line the signal is complemented, as represented by the slash, prior to introduction to the opposite input of gate 646. The output of gate 646 is present at line 656 which leads to the K input of a clocked JK flip-flop 658. Flip-flop 658 is cleared in response to actuation of the start button as represented by the signal labeled, START, and receives a clocking pulse GCLK from processor function 104. The output of flip-flop 658, which may be designated $y_1$, is present at line 660 which leads to one input of an OR function 662, the opposite input thereto being the earlier-described STROBE signal derived from lines 644 and 664. The output of function 662 is present at line 666 and, as labeled, when true represents a signal that the A-to-D converter is carrying out a conversion function as represented by the labeled signal, ADBSY. It may be recalled, that this is one of the test signals asserted at component 352 as described in connection with FIG. 7.

The status signal at line 652 is directed through an inverter 668, thence through lines 670 and 672 to one input of an AND function 674. Line 670 also is directed to buffer-inverter 676, the signal at the output thereof at line 678 of which is complemented, as indicated by the slash, whereupon it is passed through an R-C timing network including resistor 680 and capacitor 682 to the opposite input of gate 674. The output of gate 674 at line 684 is directed to the preset input of flip-flop 668.

Network 640 is required inasmuch as the A-to-D converter operates somewhat asynchronously with respect to the remainder of the system. Looking to FIG. 21A, a state diagram is provided which defines the function of network 640. The state diagram shows all of the possible output states of flip-flops 642 and 658, i.e. $y_1$, $y_0$, the dotted lines between states a-d representing asynchronous transitions, while the connecting solid line represents the trailing edge of GCLK, a synchronous transition. In state a, both flip-flops 642 and 658 have been cleared and the $y_1$, $y_0$, condition is 0,0. The looping arch indicates that the system will remain in that 0,0 condition pending a next input. Transition from state, a, to state, b, occurs with the presence of ADCLK from processor function 104 to evolve a 0,1 state at b. In state b, the $y_0$ output of flip-flop 642 becomes a one to evolve the STROBE signal at line 644 as described above. The latter signal initiates the operation of the A-to-D package and commences the time-out at block 634. As represented by the arching line, the control network 640 remains in a holding state until such time as a status signal, as derived at line 626, is developed indicating the commencement of an analog to digital conversion. Thus a synchronous input is represented by the dashed line labeled "STATUS" leading from state, b, to state, c. With the presence of a STATUS or "conversion in process" input, the network 640 converts to state, c, wherein $y_0$, $Y_1$ assume the respective conditions, 1,1.

As is apparent by the connection of line 686 from the output of flip-flop 658 to the set input of flip-flop 642, state, c, is present for a very short (propagation time) interval, whereupon network 640 assumes state, d, wherein $y_1$, $y_0$ have the respective values: 1,0. As represented by the arch at state, d, the STATUS signal remains while analog to digital conversion is carried out at component 624. With the development of STATUS and in the presence of the trailing edge of the internal clock signal, GCLK, the system returns to state, a, for a next conversion as determined by processor function 104. With the latter conversion from state, d, to state, a, the A-to-D converter function is synchronized for performance in conjunction with processor function 104. Observation of the state diagram also reveals that the ABDSY signal is developed during states b, c and d.

Returning to network 640, with the clearing of flip-flops 642 and 658 by the START signal generated at start button 111, $y_0$ at line 644 becomes a one which is inverted, as indicated by the slash mark, and serves to disable AND function 646. The system then awaits a STATUS signal and, when that signal is available, gate 646 is enabled by virtue of the passage of the STATUS signal as an input thereto along line 654 which signal is complemented, as indicated by the slash mark. The STATUS signal also is asserted through line 670 to the input of AND function 674. The R-C network including capacitor 682 and resistor 680 imposes a very slight delay on the development of the status signal at line 684 which serves to preset flip-flop 658. With the presetting of flip-flop 658, the network is in state, c, the signal at line 660 being at a one level. The system, immediately, goes to state, b, by virtue of the line 686 coupling to flip-flop 642, to reset flip-flop 642.

Upon resetting flip-flop 642, the zero signal at line 644 serves to enable AND function 646 and the system awaits a $\overline{\text{STATUS}}$ signal. With the presence of the latter signal and on the arrival of interval clock, GCLK, the output at line 660 returns to a zero value.

The digital to analog conversion function described in FIG. 5 at 204 and 206 for returning information to an x-y plotter or the instrumentation of trainer control 70 is revealed in more detail in FIG. 22. Looking to that figure, it may be observed that the data output terminals D1-D15 from processor arithmetic components 392-395 are coupled, as labeled, with registers 688 and 690 of a D/A conversion function 204, while the same terminals are coupled with registers 692 and 694 of D/A function 206. The sign bit from component 392, D16 is coupled through driver inverter 696, which inverted signal is complemented, as indicated by the slash, and asserted at register 688 through line 698 and to register 692 through line 700. Registers 688, 690, 692 and 694 serve to store processor output data between the updating thereof which updating occurs about every 1/60th of a second. The registers 688 and 690 are clocked from a processor derived signal CLKX which is evolved at decoder component 492. Similarly, registers 692 and 694 are controlled by the CLKY signal from the same decoder component. These registers may be of type 74LS273. The Data asserted at registers 688 and 690 are passed to digital to analog converter 702. The output of this converter is present at line 704 which is coupled to one input of an operational amplifier 706 which, in turn, is coupled in a manner providing an output voltage at line 708 representing the digital input. Similarly, the output of registers 692 and 694 are asserted at the input of a digital to analog converter 710 which develops an output at line 712 which is presented to one input of an operational amplifier 714 having an output at line 716 representing the digital input. These analog signals at line 716 are returned to trainer control 70 as described respectively at lines 196 and 198 in FIG. 5.

Also described in FIG. 5 is a ROM address function 174 which, operating through line grouping 180, selects texture and runway feature data from texture ROM 178. ROM address function 174 is revealed in detail in FIG. 23. Looking to that figure, two ROM Address registers 718 and 719 are shown having input terminals coupled to receive data inputs D-1-D12 from corresponding arithmetic units 393-396. These registers, which may be of the earlier-described type 74LS273, are clocked by a ROMCLK signal generated from decoder 492 described in connection with FIG. 15. The outputs of register 718 and 719 are identified as AA0-AA12 in addition to a valid address output, VA. Note, that the most significant three address bits AA10-AA12 from register 718 are coupled to the A- C input terminals of a decoder 720. The latter decoder may be present as a type 8205 (supra) and provides a 3-to-8 line decoding output, the chip enable outputs being labeled CE0--CE6. Registers 718 and 719 serve to store the instantaneous processor outputs and select a particular texture ROM 178. Looking to FIG. 24, the texture ROMs are shown at 722-732, each being coupled to receive address data AA0-AA9 as represented by data arrow 180 and each responding to a chip enable signal CE0-CE6. Memories 722-733 may be of a variety identified as "Erasable Programmable Read-Only Memories" type 2758 marketed by Intel of Santa Clara, California and having 1024 words by eight bit capabilities. Looking at the output data lines of each of the ROMs 722-733, it may be observed that such output is assigned to correspond with particular regions within the map of a given subworld. Looking additionally to FIG. 4, the regions of the subworld for which these ROMs carry data is revealed. In general, the image of the subworld is divided in one direction by the series of generated lines evolved by function 166 and in the opposite direction by the addressed data within ROM 178. FIG. 4 shows that for terrain $T_1$, the ROM data is subdivided on either side and across the regions above and below the runway by a sequence of six strips a, b, c, d, a and b. For any given ROM, for a horizontal scan, information is given for a five foot resolution taken along an associated line generator derived line (generated line). The ROMs are programmed for the most part with randomly generated color or texture data and the eight bit word of each is subdivided in groupings of two binary bits each such grouping being assigned to a strip a-d, for example for terrain $T_1$. For the subworld dimensions selected i.e., about three miles by seven miles, and assigning a reslution, K, equal to five feet, terrain $T_1$ is definable by a series of seven ROMs, 722-728, each such ROM accommodating for about a one mile extent of the subworld and being enabled by chip select signals CE0--CE6.

It may be recalled from the earlier discussion that the texture ROMs at 174 are addressed from a computation associated with equations (1) and (4). These addresses are computed in dependence upon the position of the aircraft both in terms of coordinates and in terms of altitude and each texture ROM address computation further is dependent upon the position of a horizontal line scan below V.P. Earlier described as, y. FIG. 4 additionally reveals that terrain $T_2$ is divided into three strips e, f, and g, the binary image definitional data therefor being retained within ROM 731-733. As indicated earlier herein, terrain $T_2$ contains visual cue data valuable for training as the simulated aircraft closely approaches the runway. Within this region, a cue of rapidly passing mowed grass lines next to the runway becomes available. Because the extent of terrain $T_2$ is less than that of $T_1$, fewer ROM components are required for its definition and these are enabled by chip select signals CE2 and CE4.

The runway itself is developed from generated line defined strips x, y, and z. And within this runway zone are regions defining a runway number, touchdown targets (TD) and a center line. For image definition in the vicinity of the runway, the data capabilities of four of the ROMs is required as enabled by chip enable signal CE3. Observe in this regard that the latter enabling signal serves to enable ROMs 725, 729, 730 and 732. Of the foregoing, ROM 730 carries x-z data, while ROM 729 carries runway number definition data, RN1-RN3. The enablement of ROM 721 is one wherein the CE3 signal is ANDed with an enable number, ENN, signal to provide the operator with the opportunity to remove the number image from the runway. This arrangement as shown in FIG. 24A where AND function 736 is shown receiving the ENN and CE3 signals to provide the enabling output signal CE3.ENN applied to ROM 729. Finally, the taxi strip adjacent the runway is shown in FIG. 4 and labeled TS, and the data for the image definition thereof is retained within ROM 732.

FIG. 4 shows an identification of the twenty generated boundaries as "lines" for the instant embodiment which are revealed in connection with the "greater than" or "less than or equal to" designations developed from line generator network 502. These generated lines are labeled LG0–LG19 and serve to provide image boundary definition by lines extending from the vanishing point.

Looking additionally to FIG. 25, a representative of how such line generators, utilized in conjunction with texture ROM data, evolves such features on the runway as touch down targets and runway numerals. In general, the texture ROMs provide a plurality of adjacent rectangular concrete sections of the runway of varying hues giving it a surface texture. Between the outputs of line generators 2 and 4, the longitudinal extent of a touch down target 740 is defined. Similarly, the edges of a touchdown target 742 are defined between the lines generated by line generator networks 18 and 11. The numeral, 9, is defined above the touchdown targets 740 and 742 by a series of lines generated from line generators 1, 4, 15 and 18. The texture input to the number at regions N1–N3 is evolved from ROM 729. To derive a runway number at the opposite end of the runway, no additional ROM capacity is required.

Figure 24B:
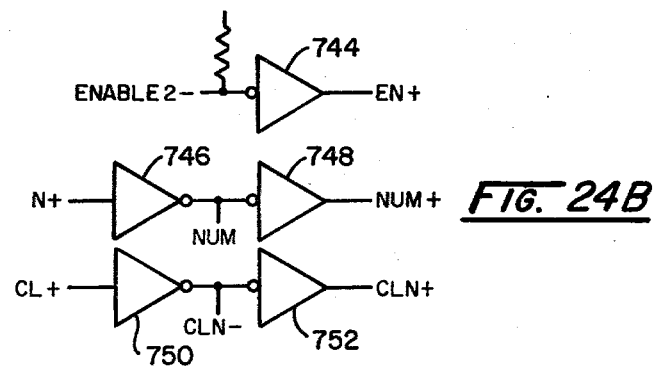

Looking to FIG. 24B, a treatment of certain of the data outputs of ROM function 178 is revealed. For example, ENABLE 2 outputs of ROMs 731–733 are asserted at the input of an inverter-buffer 744 to develop the signal, EN2. Similarly, the T output terminal of ROM 730 is directed through inverter-buffers 746 and 748 to develop the output signals TD— and TD+. The Cl signal developed from ROM 730 is similarly treated by inverter-buffers 750 and 752 to develop the signals cln— and cln+. Another output shown in FIG. 23 is tapped from the CE3 terminal of decoder 720 to evolve the runway select signal RUNSEL. These signals will be discussed in detail later herein.

The data contained within texture ROM function 178 is encoded by a logic selecting the appropriate ROM data for a given horizontal scan line at raster 18. This selection of the texture ROM data is based, inter alia, upon the greater or less than logic of the line generation function 166 as described in connection with representative circuit 502 in FIG. 17 and labeled in FIG. 4. It is this logic which establishes the earlier-described strip extent for the image.

Figure 26:
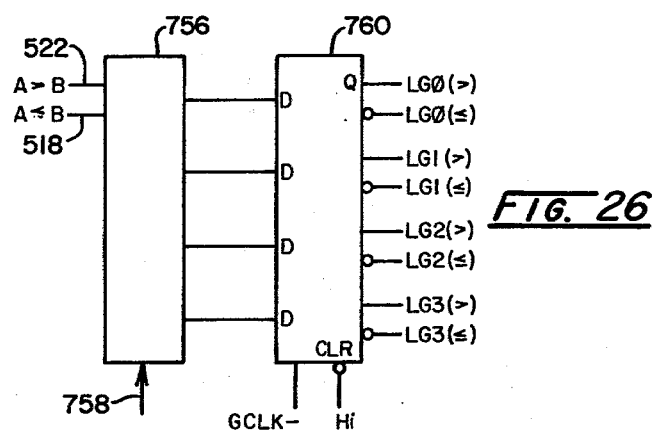
FIG. 26 is a schematic circuit diagram of a multiplexing and signal treatment function utilized in conjunction with the line generators of the invention.

The output lines 518 and 522 of each of the twenty line generators are coupled to the inputs of a series of multiplexers, a typical one of which is revealed in FIG. 26 at 756. Depending upon the signal asserted for landing in a positive or negative direction as selected at switch 114 (FIG. 5), either the input at line 522 or at 518 will be selected by multiplexer 756 for assertion at the D terminal inputs of an associated buffer-register, a typical one of which is represented at 760 and which may be present as type 74S175 marketed by Texas Instruments, Inc. The outputs of buffer register 760 are shown in the figure in representative fashion for the first four line generator networks LG0–LG3 and are labeled in conjunction with a greater than or "less than or equal to" representation. Register 760 is actuated by GLCK as labeled in the figure. As is apparent, several such multiplexers 756 and associated buffer registers 760 are necessitated to accommodate for the plurality of line generator networks in the system.

Turning now to FIG. 27 as considered in conjunction with the line generator numerical designations of FIG. 4, the encoding logic for evolving terrain $T_1$ is revealed generally at 762. As described in connection with FIG. 4, the line generators associated in establishing terrain $T_1$ are those defining strips a, b, c, and d. These line generators are numbered LG7–LG13. The signals derived from these line generators and passing buffer-registers as at 760 are directed to the inputs shown of four AND-OR-NOT GATES 766–769. Such gates, which may be present, for example, as type 74S64 marketed by Texas Instruments, Inc., (supra) serve an AND-OR function and provide the logic combination for defining the various strip a–d widths of terrain $T_1$. The outputs of components 766–769 are represented, respectively, at lines 782–785. Outputs 782–785 are directed to one input of respective AND function components 788–791, the opposite inputs to which are commonly derived from line 794 which is coupled through an inverter buffer gate 796 to receive an enabling signal labeled, EN1. This signal, the derivation of which is described later herein, represents a logical combination representing subworld terrain. The outputs of gate functions 788–791 are coupled to the enabling, EN, terminal inputs of respective decoders 798–801. Terminals A and B of decoder 801 are driven by the, a, strip output bits of ROMs 722–728. Correspondingly, the A and B input terminals of decoders 798–800 are driven from the respective d, c, and b strip output bits for the same grouping of terrain $T_1$ ROMs. Decoders 798–801 may be of type 74S193. (supra)

The 0 output terminal of each decoder 798–801 extends to one input of an OR function represented by NAND gate 804, while the, 1, terminal outputs of each of the decoders extends to a corresponding input of an OR function present as an NAND gate 805. Similarly, the 2 output terminals of each decoder 798–801 extend to one input of an OR function present as a NAND gate 806 and the, 3, terminal outputs of these decoders extend to a corresponding input to an OR function represented by NAND gate 807. The outputs of gates 804–807 are directed by NAND gate 807. The outputs of gates 804–807 are directed to one input, respectively, of open collector AND functions 810–813. The opposite inputs to gates 810–813 derive from common line 816 which extends through a complementing slash to an AND function 818. The input to function 818 is shown to include an enabling signal, EN2, which corresponds with the longitudinal boundaries (along the runway) of terrain $T_2$ and is derived from ROMs 732. The remaining two inputs to gate 818 will be seen to represent the generated line outer definition of terrain $T_2$ as derived by line generators LG6 and LG14.

With the logic arrangement shown, for instance, looking additionally to FIG. 4, with an enabling input represented by LG9 and LG8 showing that the horizontal sweep is within an "a" strip, the corresponding output at line 785 will enable decoder 801. When so enabled, the ROM "a" bit data is permitted to drive the decoder to assert an output at an appropriate OR function 804–807, depending upon the binary value of the "a" data. FIG. 4 shows that the "a" data is repeated between the boundaries of generated lines LG11 and LG12. Component 768 is coupled to receive logic inputs representing the position of a horizontal trace within the strips defined either by line generator pairs 7 and 8 or 10 and 11. Here again, b, strip data is repeated for a given horizontal raster trace. Similarly, component 767 looks to the, c, strip data as developed between the line generated by line generator 713 and the, d, strip color and intensity data as developed as determined by the boundary represented by the outputs of line generators 12 and 13. These inputs to components 766-769 reveal that only one decoder of the grouping 798-801 thereof is enabled at any given time. As a consequence, only one of the OR function components 804-807 will be driven at a given time. The data passing through an OR function 804-807 represents color and is directed to AND functions 810-813 upon the enablement thereof by the logic represented at gate 818. This logic is readily summarized as being a representation that the raster trace position is not within terrain $T_2$. The video information signal outputs of AND functions 810-813 represent texture or hue and are respectively labeled $T_fH0$, $T_fH1$, TH2 and TH3. Of these, signals TH2 and TH3 represent shades of green, while signals $T_fH0$, $T_fH1$, TH2 and TH3. Of these, signals TH2 and TH3 represent shades of green, while signals $T_fH0$ and $T_fH1$ represent two shades of brown, all such shades being utilized in the development of images of pasture or plowed agricultural fields. These digital color signals will be seen to drive a form of D/A converter as labeled in connection with block 184 in FIG. 5.

From the foregoing, it may be seen that the strip data is addressed by the processing function in accordance with the earlier-described formulae, whereupon it is outputted to provide video information only under the logic control established by limiting generated line positions. Further logic regulates this output in accordance with predetermined major terrain functions commencing with the broadest terrestrial scope and leading to the smallest as will be described in more detail as the instant description unfolds. Thus, image generation with the instant system is achieved as an ANDed combination of the line generator outputs and the decoder texture ROM outputs.

Figure 28:
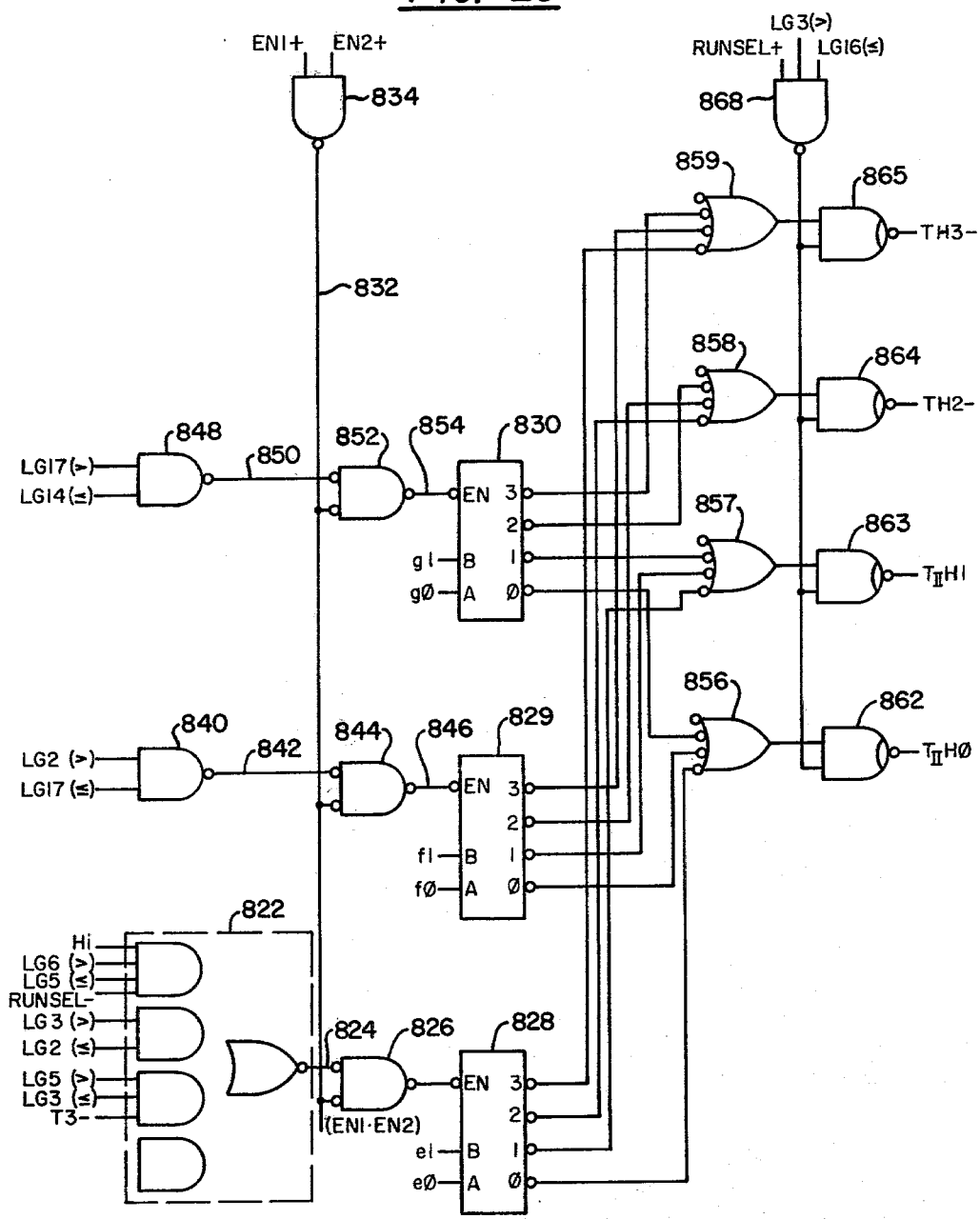
FIG. 28 is a schematic circuit diagram incorporating encoding logic for developing terrain $T_2$ video information.

As indicated earlier, terrain $T_2$ is considered a region of the subworld within terrain $T_1$ which surrounds the runway and, preferably, is developed having a texture and hue resembling mowed grass. This terrain is defined, as represented in FIG. 4, by three strips, e, f, and g. That figure, as well as the imaging figures described earlier, reveals that positioned within the periphery of terrain $T_2$ are both the runway and an associated taxiway. Concerning the latter, with additional reference to FIG. 25, it may be seen that the taxiway is formed of one component running parallel and of equal length with the runway but spaced therefrom and is accessed by three turn-off regions spaced between the runway and the longitudinally disposed taxiway section at the midpoint and each end or threshold of the runway. Looking additionally to FIG. 28, the combinational logic for generating video information relating to terrain $T_2$ is revealed. In the figure, an AND-OR-NOT component which may be present as a type 74S64 (supra) which provides an AND-OR function is revealed at 822. The output of this component at line 824 is selectively asserted through an AND function 826 for presentation at the enable, EN, input terminal of a decoder 828 of a grouping of three thereof 828-830. These decoders may be of the type 74S139 (supra). The A and B input terminals to decoder 828 receive the e strip data from texture ROMs 731-733. The opposite input to ANDing function 826 is derived from principal 832 which extends to an AND function component 834. Component 834 receives two signals, EN1 and EN2, the latter having been described earlier as representing the upper and lower boundaries of terrain $T_2$ and being derived from texture ROMs 731-733 as well as buffer 744. Also, as indicated earlier, function EN1 is of greater breadth as is described later herein, being developed from an unblanking and terrain-related signal.

Looking additionally to FIG. 4, it may be observed that the, e, strip falls between generated lines LG6 and LG2 and, additionally, the elongate portion of the taxiway parallel to the runway is positioned between generated lines LG5 and LG6 and the three taxiway turn-off regions are positioned between generated lines LG3 and LG5.

Returning to FIG. 28, the enabling ogic asserted at decoder 828 is one looking to the exclusion of those portions of strip e which include taxiway regions. For example, line generator output signals LG5 and LG3, with appropriate greater than or less than identification, are ANDed with a signal representing taxi strip, TS, which is complemented, as indicated by the slash, to represent taxi strip not. Thus, enablement for terrain $T_2$ hue and texture is present where the turn-off regions of the taxiway between generated lines LG5 and LG3 are not a part of the image. Looking to FIG. 24C, the signal, TS is shown as derived from the signal, RTS derived, in turn, from ROM 732 and treated by buffer-inverters 836 and 838. The signal corresponds with the longitudinal extent and portions of each of the three turn-off regions of the taxiway situated between the parallel runway and elngate taxiway. The line generator signal inputs from line generators 2 and 3 define a portion of terrain $T_2$ which does not contain taxiway information and, thus, the ANDed combination of these two signal inputs, i.e. LG3 and LG2 will serve as one enablement for decoder 828. The portion of the taxiway which extends in parallel but spaced from the runway is incorporated between the boundaries defined by line generators 5 and 6. Accordingly, the signals thereof, LG5 and LG6, are ANDed in combination with the complement, as indicated by the slash, of a runway select signal, RUNSEL. The latter signal is the buffered equivalent of signal CE3 as developed at decoder 720 described in connection with FIG. 23, that signal also representing a chip select function. Thus, terrain $T_2$ is imaged within the boundaries of line generators 6 and 5 at such time as runway is not being imaged.

The f strip data is utilized to drive decoder 829. Enablement of decoder 829 is provided by the insertion of ANDed line generator signals LG2 and LG17 representing the outer extent of the strip. The signals are shown as being coupled with the input of an AND function component 840 the output from which is directed along line 842 to one input of an AND function component 844. The opposite input to component 844 is derived from line 832, as described above, and, upon presentment of anding signals at its input, an enabling output signal at line 846 is presented to the corresponding enabling terminal, EN, of decoder 829.

In similar fashion, decoder 830 is driven by the g strip information at its A and B input terminals. The enablement input to decoder 830 is derived from line generator signals LG17 and LG14 which define the outer boundaries of strip g and are asserted at the inputs to an AND function component 848. The output of AND function 848 is present at line 850 and is coupled to one input of an AND function component 852, the opposite input of which is derived from line 832 and the output of which at line 854 is coupled with the enabling input of decoder 18. Components 840 and 848 may be of type 74S00, while components 826, 844 and 852 may be of type 74S32.

The outputs of decoders 828-830 are provided at their terminals 0-3 and corresponding ones of such terminals are couple to a select one component present serving an OR function and shown respectively at 856-859. The outputs of OR function component 856-859 are coupled to one input of respective open collector AND function components 862-865. Components 856-859 are identical to those as described having the same function in connection with FIG. 27. The opposite inputs to each of the components 862-865 are derived from line 866 which leads to an AND component 868. The inputs to component 868 include the signal, RUNSEL, as well as those line generator signals defining the outer boundaries of the runway, i.e. LG3 and LG16 and the resultant ANDed output of component 866, which is complemented as represented by the slash, represents "not runway". Thus ANDing components 862-865 are enabled to define terrain $T_2$ when runway is not present. It may be noted that a symmetry beteen the development of terrain $T_1$ and terrain $T_2$ is provided, it being recalled that the signal for defining terrain $T_1$ in FIG. 27 at line 816 represents "not terrain $T_2$". The output signals at gates 862-865 are selected for providing shades of green. Of the output colors, note that the video information signals representing the output of gates 846 and 865 are TH2 and TH3 which are identical with those provided at the output of ANDing function components 812 and 813 described in connection with FIG. 27. These outputs are commonly coupled inwired OR fashion a capability permitted by the open collector structure. The remaining video information outputs of components 862 and 863 are represented as: $T_fH0$ and $T_fH1$ which represent, as described, two different shades of green. Recall that shades of mowed grass are to be represented as terrain $T_2$.

Figure 29:
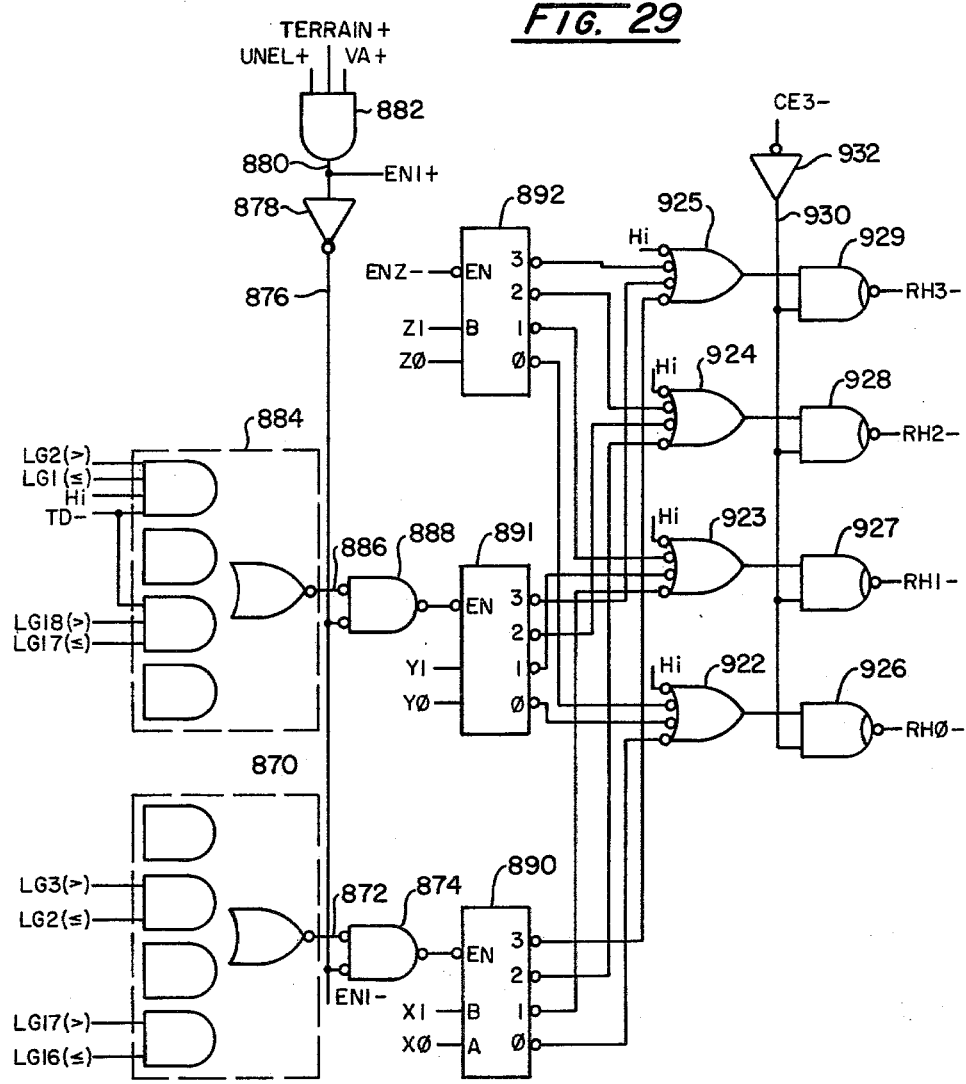
FIG. 29 is a schematic circuit diagram having components providing encoding logic for evolving runway video information.

Turning to FIG. 29, the runway combinational logic is revealed in part. In the figure, an AND-OR-NOT component of the earlier described type 74S64 is revealed at 870 receiving line generator signals corresponding with the x strip boundaries described in FIG. 4. In this regard, note that the x strip is utilized in two instances within the runway boundary, thus signals LG3, and LG2 define one x-strip while signals LG17 and LG16 define the other. Whenever either of the latter dual signal inputs is true, an output is presented at line 872 to one input of an AND function represented at component 874 which may be present as a type 74S32 (supra). The opposite input to component 874 derives from line 876 which extends through an inverter 878 to line 880 which, as labeled, derives the earlier discussed signal, EN1. Line 880 carries the output of an AND function represented at component 882 which is shown receiving a signal representing a video unblanking, UNBL, a signal representing the presence of terrain as opposed to sky, TERRAIN, and a valid address signal, VA. Thus, during a raster retrace operation, a blanking signal is developed, the complement of which represents UNBL asserted at component 882. The valid address signal, VA, is derived from the texture ROM address function at register 719 described in connection with FIG. 23, while the signal, TERRAIN is derived from timing function 160.

Runway features are further defined in conjunction with y strip data which is utilized in conjunction with the combinational logic asserted on AND-OR-NOT function component 884. FIG. 4 reveals that strip y occurs in two instances within the runway boundary and is positioned between the lines generated by line generators 1 and 2 as well as line generators 17 and 18. Accordingly, signals representing those boundaries, i.e. LG17, LG18 and LG1 and LG2 are asserted at the inputs to component 884. FIGS. 4 and 25 additionally reveal that the touchdown zones also are contained within and defined by strips y. Accordingly, the latter line generator signals are ANDed with a not touchdown signal represented by the input TD from ROM 730 which is complemented as represented by the slash mark. The output of component 884 is present at line 886 and is introduced to one input of AND function component 888 along with an input from line 876. The outputs of components 874 and 888 are coupled to the EN enabling input terminals of respective decoders 890 and 891, the respective A-B input terminals of which are coupled to receive x and y hue-texture data from ROM 730.

FIGS. 4 and 25 further reveal that, within strip z, a center line and number (9) are located. As a consequence, the enablement of decoder 892 which is driven by z strip data becomes more involved. Note, that the enabling terminal, EN of decoder 892 is shown receiving an enabling signal, ENZ. FIG. 25 reveals that the runway number image, 9, is formed of three principal sections labeled: N1, N2 and N3. The hue information relating to these number segments is derived from ROM 729 as outputs RN1-RN3. Looking to FIG. 24C, it may be seen that signal, RN1, is buffered by buffer inverters 894 and 896 to derive signal N1, signal, RN2, is treated by buffer-inverters 898 and 900 to derive signal, N2, and signal RN3 is treated by buffers 902 and 904 to derive control signal N3.

Figure 30:
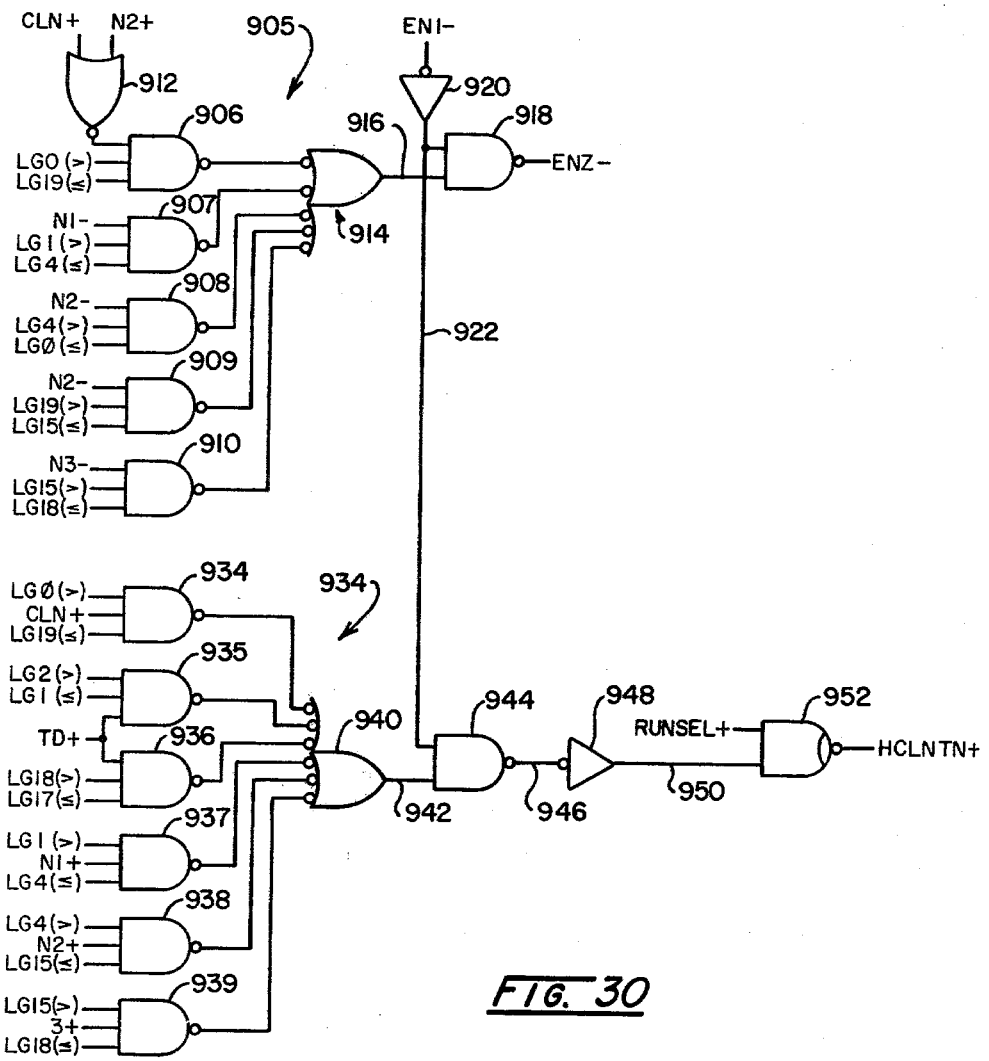
FIG. 30 is a schematic circuit diagram showing components utilized to develop runway center line and touchdown video information.

Looking additionally to FIG. 30, the combinational logic network deriving enabling signal, ENZ, in conjunction with the latter runway number signals is portrayed generally at 905. FIG. 4 reveals that the runway centerline is defined between line generators 0 and 19, thus an exclusionary arrangement is provided at AND function component 906 which is shown receiving signals LG19 and LG0 defining the centerline longitudinal boundaries as well as a signal representing NOT cln or N2 as developed through OR function component 912. Note, that the inputs to this function are present as signals cln and N2 and the output thereof is complemented as represented by the slash. AND function component 906 may be present as a type 74S10 marketed, for example by Texas Instruments Corp. (supra) and is one of a series of such devices 906-910. Component 907 serves to develop an exclusionary signal for the segment of the numeral represented at N1 which is developed between the line generator signals LG1 and LG4. Accordingly, signal, N1 and these inputs are directed to component 907, signal N1 being complemented as represented by the slash. In similar fashion, component 908 serves to develop an exclusionary signal for the portions of the numeral represented by segment N2. Accordingly, a complemented N2 signal is introduced to the input of that component along with the associated line generator signals LG4 and LG0. Segment N2 additionally is associated with generated line signals LG19 and LG15, and an appropriate second exclusionary signal representing those components of the numeral are developed at component 909. A signal representing the final segment of the numeral, N3, is introduced in complemented form to component 910 along with the generated lines associated with it, i.e. LG15 and LG18 to develop an exclusionary signal. The outputs of components 906–910 are directed to a multi-input OR function component represented generally at 914. The output of OR function 914 is directed along line 916 to one input of an AND function component 918 the output of which develops the above-described enabling signal, ENZ. As is apparent, network 905 permits the enablement of the z strip data when runway number or center line are not to be imaged. The opposite input to ANDing function 918 is derived from enabling signal, EN1, which is inverted at inverter-buffer 920 and presented along line 922.

Returning to FIG. 29, it may be observed that one each of the 0–3 output terminals of decoders 890–892 are directed to a corresponding one of four OR functions complemented by NAND gates 922–925. The outputs of OR functions 922–925 are coupled to respective open collector AND functions represented at components 926–929 which may be type 74S03 (supra). The opposite inputs to gates 926–929 derive from line 930 and are present as the earlier-described RUNSEL signal which is derived through buffer-inverter 932 from the chip enable signal CE3 of decoder 720. Note, that the intensity-hue outputs of components 926–929 are represented respectively as video information signals: RH0, RH1, RH2 and RH3.

FIG. 30 also shows the presence of a network 934, the function of which is to generate a white hue for the centerline touchdown targets and runway number. Accordingly, a series of AND function components 934–939 (type 74S10, supra) are arranged to receive data which indentifies when an image component of these features is present in a horizontal scan line. In this regard, note that the centerline is present between the lines generated by signals, LG0 and LG19, and these corresponding inputs are presented to AND function 934. The positions of touchdown targets between lines generated by line generators 1 and 2 as well as line generators 17 and 18 are provided by corresponding signals LG1, LG2, and LG17, LG18. These signals are combined with a touchdown feature signal, TD, at the inputs of components 935 and 936. The runway number segment, N1, signal is introduced to component 937 along with associated generated line signals LG1 and LG4 representing its boundaries; the corresponding runway number segment N2 is presented at the input of component 938 along with generated line signals representing its boundaries shown at LG4 and LG15; while runway number segment N3 is presented at the input of component 939 along with the generated line signals representing its boundaries as at LG15 and LG18. The outputs of AND function components 934–939 are presented to the corresponding inputs of a multiinput OR function 940, the output of which at line 942 is presented to one input of an ANDing function 944. The opposite input to function 944 is presented from line 922, and the output thereof at line 946 is buffered at inverter-buffer 948 and presented along line 950 to one input of an open collector AND function component 952. Inasmuch as the signal evolved from component 952 is only desired when runway image is present, the runway select signal, RUNSEL, also is presented at the input thereof. The resultant output of component 952 is present as a video information signal identified as HclnTN.

Figure 24C:
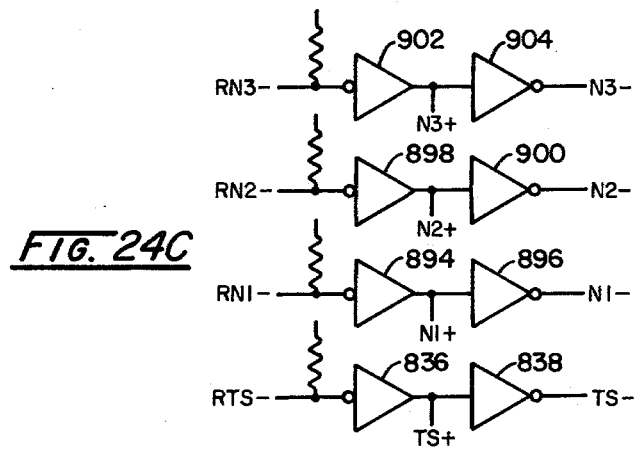
Figure 31:
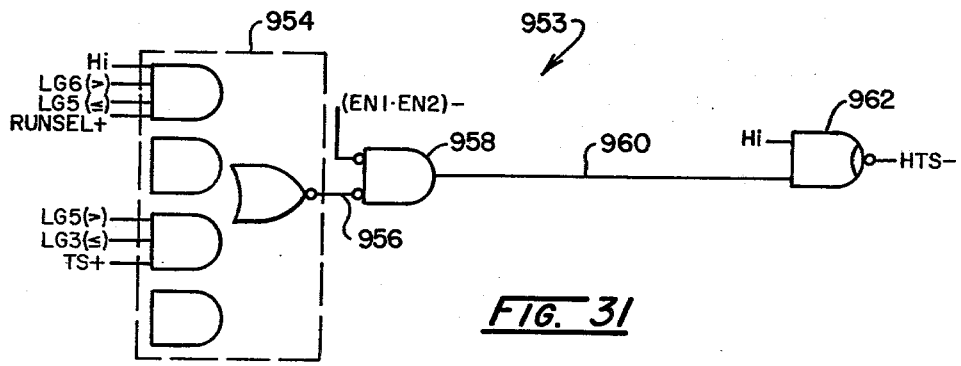
FIG. 31 is a schematic circuit diagram showing components utilized to develop taxiway video information.

Turning to FIG. 31, a network 953 utilized for developing the hue associated with the taxi strip is illustrated. As indicated earlier, the taxi strip includes one elongate portion defined between the lines represented by line generator signals LG6 and LG5, as well as three turn-off regions the positions of which were established by the texture ROMs and, particularly, that developing the signal, RTS, which is treated by buffers 836 and 838 to develop the signal, TS, as represented at FIG. 24C. Network 953 includes an AND-OR-NOT component developing an AND-OR function as represented at 954 which may be of type 74S64 (supra). The elongate taxiway defining input to component 954 is represented at signal RUNSEL as combined with signals LG5 and LG6. The turn-off portions of the taxi strip are represented by input signals LG3 and LG5 as ANDed with ROM derived signal, TS. The output of component 954 is present at line 956 and is enabled with an "EN1 or EN2" signal derived at line 832 (FIG. 28) through AND function component 958. The output of component 958 is directed along line 960 to one input of an open collector AND component 962. The opposite input to component 962 is permanently enable and the outputs thereof derive a video information signal identified as HTS.

Figure 32:
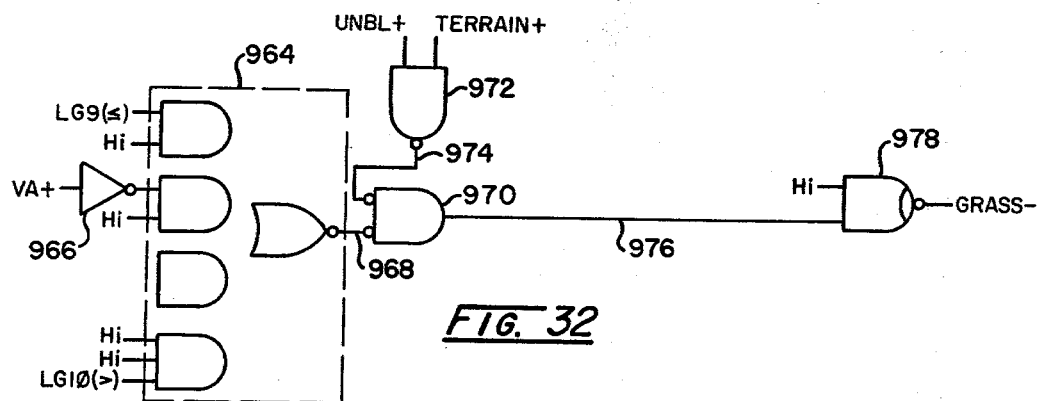
FIG. 32 is a schematic circuit diagram showing components utilized to derive GRASS signal video information.

As described earlier herein, that portion of the world represented by the simulation system which falls beyond the boundaries of a subworld is generally defined as grass. Accordingly, an appropriate signal is evolved to develop the green color of grass by a network represented at FIG. 32. Looking to that figure, an AND-OR-NOT component 964 of the type earlier described is represented as receiving line generator signals LG9 and LG10 which represent the outward boundaries along two sides of a subworld. Additionally ANDed with these signals is the valid address signal, VA which is buffered at 966 and complemented, as represented by the slash, to assert a "not valid address" input to component 964. The output of component 964 is present at line 968 and is asserted at one input of an AND function component 970. The opposite input to component 970 is derived from AND function component 972 at line 974. The inputs to component 972 which are ANDed are the unblanking signal, UNBL, and a signal corresponding with the presence of terrain, TERRAIN. This signal represents those image components below the level of horizon 30. The output of component 970 is presented along line 976 to an open collector AND function component 978, the opposite input to which is permanently enabled and the output of which is represented as the video information signal, HGRASS.

Figure 32A:
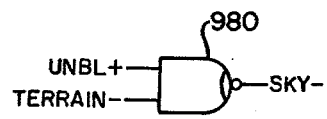
FIGS. 32A and 32B are schematic circuit diagrams, respectively, showing components utilized in developing signals, SKY and UNBL.
Figure 32B:
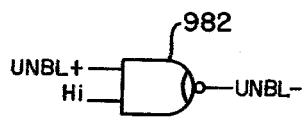

Looking to FIG. 32A, the development of a video information signal, HSKY, representing sky, is shown in connection with open collector AND function component 980. The inputs to component 980 are the unblanking pulse derived from the timing function 160 and the above-described TERRAIN signal which is complemented, as represented by the slash, to represent sky, i.e. those image components above horizon 30. Similarly, FIG. 32B shows the treatment of the unblanking signal, UNBL, by open collector AND function component 982 to develop the output signal, UNBL, utilized in connection with video generation. Components 978, 980 and 982 may be of type 74S03 (supra).

Figure 33A:
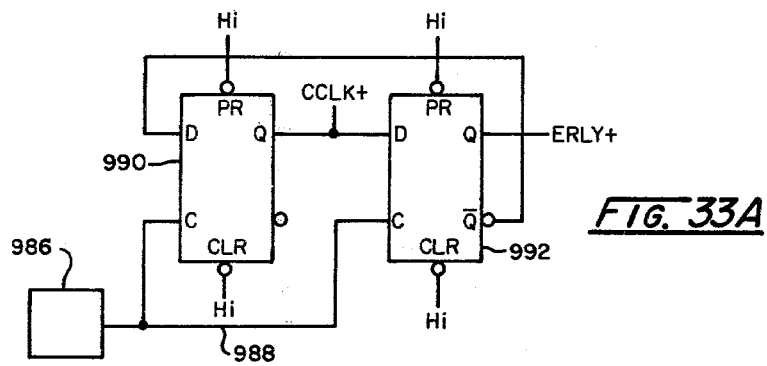
Figure 33B:
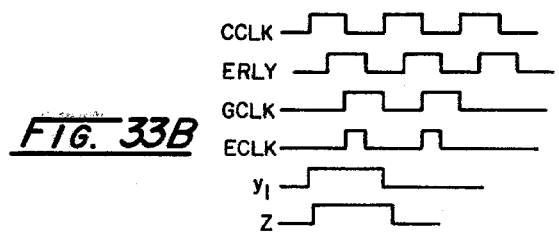
FIGS. 33B and 33C, respectively, show a timing diagram and state diagram with associated assignment map utilized in describing the operation of the circuits shown in FIGS. 33A and 33D–33H.

Looking to FIGS. 33A–33H, the clock control function for the system of the invention is revealed. This function not only introduces the initial timing inputs to the system, but also may be utilized in evolving appropriately timed start procedures as well as for any of a variety of desired diagnostic functions. FIG. 33A shows on oscillator for this function of the system as represented at block 986 which, in conventional fashion, generates an output at line 988 having, for example a 10.08 Mh frequency. The XCLK pulse train, represented in FIG. 33B, is directed from line 998 to the C terminals of two cascaded flip-flops 990 and 992. These flip-flops may, for example, be of type 74LS74. The signal at the Q terminal of flip-flop 992 is inverted, as represented by the slash, and is introduced to the D terminal of flip-flop 990, while the $\overline{Q}$ terminal of flip-flop 990 is coupled to the D terminal of flip-flop 992. With the arrangement shown, a signal CCLK is derived at the Q output terminal of flip-flop 990 while an ERLY signal is derived at the Q output of flip-flop 992. This arrangement, as is apparent, provides for a division by four and the CCLK and ERLY pulse train signals as are represented in the timing diagram of FIG. 33B.

Figure 33C:
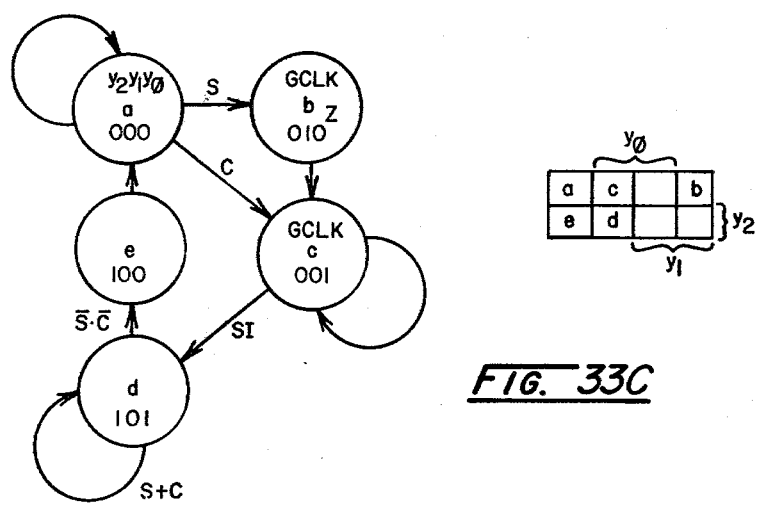

FIG. 33C shows a state diagram for the clock control networks represented in FIGS. 33D–33I. The diagram of FIG. 33C serves to explain the operation of the JK flip-flop components of FIGS. 33D–33F. These flip-flops, shown respectively at 994–996, may be of type 74LS109 and, in turn, develop respective $y_0$, $y_1$ and $y_2$ states as set forth in the diagram and associated assignment map. Returning to FIG. 33C, prior to the initiation of the system with the actuation of switch 111, state, a, will obtain, flip-flop logic states $y_2$, $y_1$, $y_0$ having respective 0,0,0 states. Upon the actuation of a start switch as at 111, as represented by the arrow labeled "S", a state, b, ensues, At state, b, $y_1$ transitions to a one and this transition is represented in FIG. 33E whereupon the start signal, S, and $y_0$, as complemented, are introduced to an AND function component 998, the output of which is directed to AND function component 1000. The opposite input to comonent 1000 is the $y_2$ signal which is complemented prior to the insertion thereof at that input and the output of component 1000 is directed to the J input of flip-flop 995. Components 998 and 1000 may, respectively, be present as type 74LS00 and 74LS02. The clock input to flip-flop 995 is derived from the CCLK signal output of flip-flop 990, while the outputs thereof are represented as $y_1$ and $y_1-$. The latter output is represented as a START signal. The clear terminal of flip-flops 994–996 are coupled to receive an INIT signal which is an initiation signal evolved from the power clear reset network represented in FIG. 33G. This network inlcudes an RC network 1002, the central tap of which is coupled through buffer-invertors 1004 and 1006 to provide the INIT signal output at line 1008. This network operates in resetting fashion as known to those artskilled.

The attainment of state, b, as shown in FIG. 33C causes the $y_1$ output of flip-flop 995 to be true and for the development of a zero input signal, Z, which is applied to initiate the address control function 236 as represented at components 326 and 328. Upon a next CCLK signal, state b is converted to state c. The Z signal is treated, as represented in FIG. 33I, a $y_1$ input being asserted at a buffer inverter 1010 the output of which is treated by an R-C network 1012 to impose a minor delay, whereupon the resultant signal again is treated by buffer inverters 1014 and 1016 to develop the Z output. The true condition of output $y_1$ also is applied to one input of the initial OR function component 1018 shown in FIG. 33H. The opposite input thereto is $y_0$ and the output thereof is asserted in conjunction with a not $y_2$ signal to the input of an AND function represented at component 1020.

The output of component 1020 is directed to the input of AND function component 1022 along with the complement of the CCLK output of flip-flop 990. In turn, the output of component 1022 is directed to AND function component 1024 to evolve the GCLK signal as shown in the timing diagram of FIG. 33B and utilized earlier herein and also is introduced to the input of AND function component 1026 along with the ERLY output of flip-flop 992 to develop ECLK, again as represented in FIG. 33B. Note, that the $y_1$ output as well as the Z output also are represented in the timing diagram of FIG. 33B.

Returning to FIG. 33C, should the operator wish to continue a simulation sequence from a stopped state a, diagnostic-type condition, then a switch signal labeled C, would be actuated to evolve state c wherein $y_0$ assumes a low value and the GCLK signal is evolved. FIG. 33D shows the interaction of the switching logic of the start switch signal, S, as well as the continue switching signal, C. Note, that the latter inputs are complemented and asserted at the input of an AND function component 1028, the output, along with state $y_2$, being introduced to the input of AND function component 1030. The output of component 1030 is introduced to the K terminal of flip-flop 994. Similarly, the continue, C, signal is asserted along with a complemented $y_2-$ to the input of AND function component 1032, the output of which is asserted at the input of OR function component 1034 along with flip-flop 995 output $y_1-$. The output of OR function component 1034 is introduced to the J terminal of flip-flop 994. With the arrangement, the states b and c are selectively achieved.

FIG. 33C also reveals that, at the option of the operator, a single instruction command may be carried out as represented by the switch signal, SI. When so actuated, this signal produces stated d wherein $y_2$ and $y_0$ assume a one state and signal GCLK is terminated.

Looking additionally to FIG. 33F, the optional single instruction feature as represented by signal, SI is shown introduced to one input of a buffer inverter 1038, the output of which is directed to one input of an AND function component 1040 along with a $y_0-$ output from flip-flop 994. The output of component 1040 is directed to the J terminal of flip-flop 996, while the K terminal thereof receives a complemented (as represented by the slash) $y_0$ signal from flip-flop 994. The resultant, $y_2+$ and $y_2-$ outputs are as labeled and are utilized as discussed above. Returning to FIG. 33C, it may be observed that, in the presence of a start not, $\overline{S}$ and continue not $\overline{C}$ condition, state e obtains wherein $y_2$ assumes a one state, the e state then transitioning to state a.

Figure 34B:
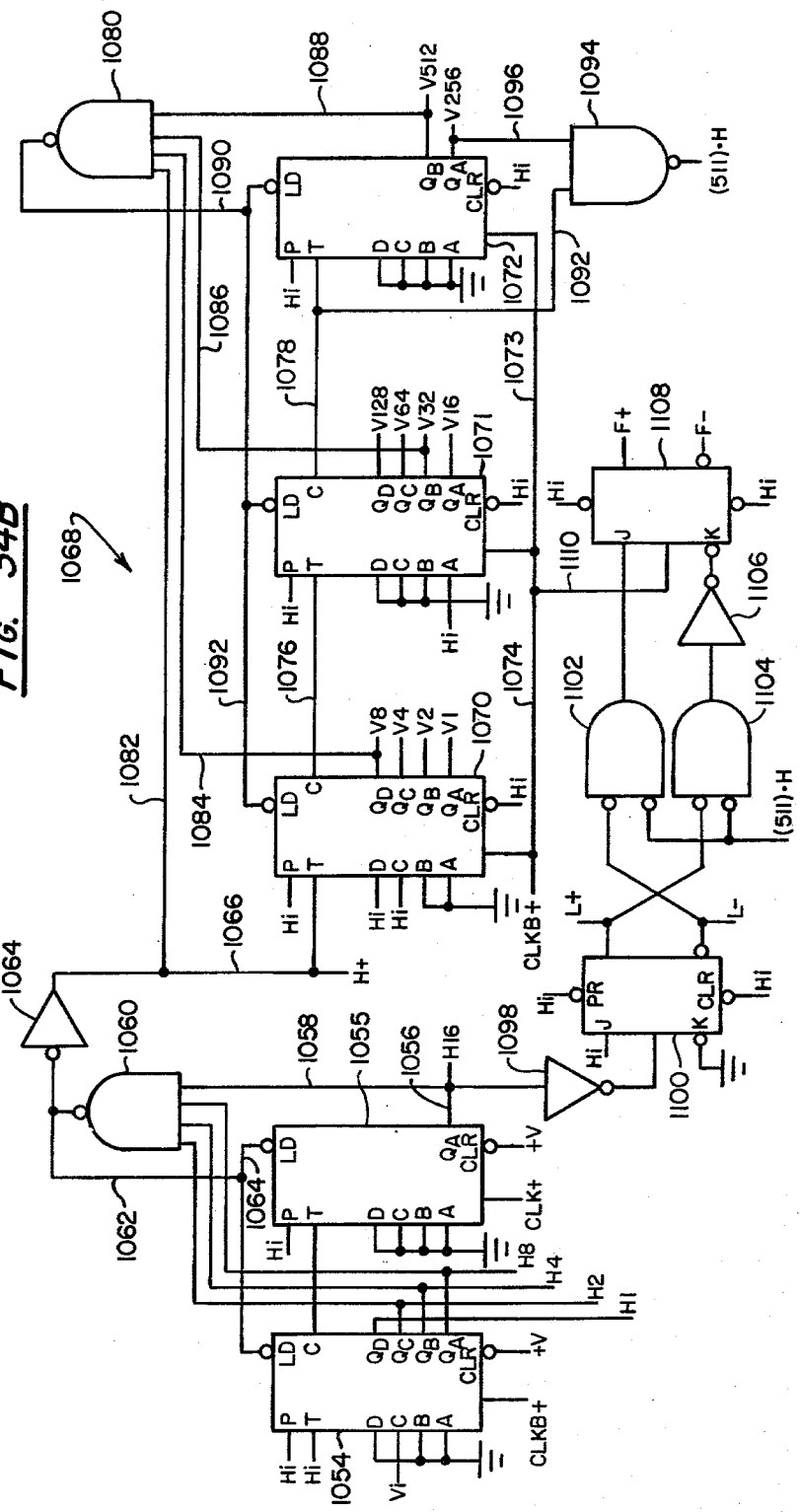
Figure 35C:
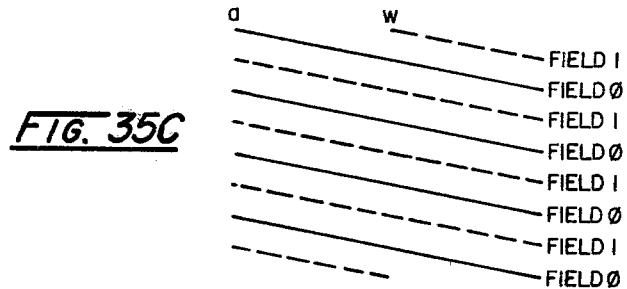
FIG. 35C is a diagrammatic representation of the interlaced fields of a raster frame.

Turning now to the timing function as shown at 160 in general fashion earlier herein, the basic oscillator of this function is represented at block 1046 and may be, for example, a 10.08 Mh crystal oscillator. The output of oscillator 1046 is buffered at inverter-buffer 1048, the output of which is present as a clock, CLK, pulse output and which is directed and complemented as represented by the slash at line 1050 to the clock input of a four bit counter 1052. This counter may be of the type 74S163. The $Q_D$ terminal of counter 1052 represents a division by 16 and is labeled having the output signal, CLKB. Looking additionally to FIG. 34B, the CLKB signal is represented as introduced to the clock (CLK) inputs of synchronous, four bit binary counters 1054 and 1055, thus serving as the count input thereto. These counters may be, for example, type 74LS161, the C terminal of counter 1054 being coupled with the T terminal of counter 1055 in cascading fashion. Observation of the connections of the A-D terminals at counter 1054 shows it to be prewired (hi) to commence any counting sequence of CLKB signals at the fourth combination. The $Q_A$-$Q_C$ output terminals of counter 1054 are shown having respective signal outputs labeled H1-H4, and these outputs are directed to three corresponding inputs of an AND function component 1060. Note additionally, that the $Q_D$ output of counter 1054 is labeled, H8. The carry, C, terminal of counter 1054 is coupled to the T terminal of counter 1055, the latter having an output at its $Q_A$ terminal at line 1056 labeled, H16. Line 1056 is coupled through line 1058 to the fourth input of AND function component 1060 and the output thereof at line 1062 is seen coupled through line 1064 to the load, LD, terminals of counters 1054 and 1055. With the arrangement thus shown, the cascade coupled counters 1054 and 1055 carry out a counting procedure from the fourth transition to the 23rd or a division by 20. The outputs of these counters as thus far described are represented in the timing diagram of FIG. 35A, that diagram revealing that upon the occurrence of a 23rd CLKB signal transition, the signals H1, H2, H4 and H16 are ones and the resultant output of AND function component 1060 imposes a signal at the load, LD terminals of counters 1054 and 1055 to effect their initiation at count level 4 and to develop a signal, H, as buffered through buffer 1064 and presented at line 1066. This signal, H, will be seen to be propagated through the vertical counters of the timing system as represented generally at 1068.

Returning to FIG. 35A, it may be observed that the H16 pulse period is one comprised of one signal level formed of 12 CLKB periods combined with an adjacent high level pulse of eight CLKB periods in length. Converted to the number of clock periods corresponding with the clock, CLK, output of the oscillator, this combination represents 512 CLK pulses, a number utilized in defining image components along each horizontal sweep at the raster. Two adjacent such H16 periods are utilized to define the above horizontal trace of 512 clock periods and its adjacent horizontal blanking comprised of 8 CLKB periods. This arrangement advantageously minimizes the number of gating configurations required to evolve a horizontal blanking pulse. It may be noted that one H period represents 20 clock CLKB's.

As indicated above, and represented in FIG. 35A, signal, H, which is propagated through network 1068 represents the ANDed combination of signals H1, H2, H4 and H16. The figure reveals that the H signal is coincident with signal H16 but is of shorter duration. Returning to FIG. 34B, it may be observed that the H signal at line 1066 is coupled to the T-enable terminal of the initial counter 1070 of a cascaded grouping of three counters 1070-1072. These vertical counters are synchronous four bit binary counters of type 74LS161. The clock input to each of the vertical counters derives from line 1074 and is the synchronizing CLKB pulse, while the counter input is an enabling one developed from line 1066. Cascade coupling of the counters of network 1068 is provided between the respective C and T terminals of counters 1070 and 1071 as at line 1076, while, correspondingly, the carry terminal C of counter 1071 is coupled to the corresponding T-enable terminal of counter 1072 by line 1078.

In general video practice, when the image tracing beam has reached the lower right hand corner of the picture tube or raster, it is returned to the upper left hand corner to commence to scan a next succeeding field. As in the case of horizontal scanning, the beam must be blanked out to prevent its retrace from appearing on the raster. A relatively longer vertical pulse is used for this purpose which is referred to as the vertical blanking pulse. Additionally, as in the case of horizontal tracings, a vertical sync pulse will be incorporated within the interim of the vertical blanking pulse.

The division carried out by the vertical counters of network 1068 is the odd value 525 which will be seen to provide one aspect of evolving video interlacing. Further, observation of the figure will show that the counters are initialized with a weighting of 28, the count carrying through to a transitioning on the 552nd pulse. By providing the initialization or weighting of 28, excessive gating is avoided to develop blanking pulses. In the arrangement shown, a vertical interval of 484 counts between value 28 and the transition from count values 511 to 512 is achieved. At this transition, the vertical blanking pulse occurs for an interval of 41 counts, or until the count 552 is reached. At this time point, the counters are reloaded and initiated at the 28 count, and, with an enabling, H, input, will commence counting or incrementing upon the receipt of the next ongoing clock pulse, CLKB.

Looking additionally to FIG. 35B, a fragmented timing diagram of higher scale factor is provided which reveals the V512 output of counter 1072, the 511th to 512th transition thereof defining the commencement of the vertical blanking signal. This signal, as indicated above, continues until the transitioning of the vertical blanking pulse at the 552nd pulse to carry out a loading. The loading signal for the counters is developed at multiple input AND function component 1080 which may be one of the earlier described type 74LS20. Note, that the inputs to component 1080 include the H signal from line 1082, the V8 signal at line 1084 from counter 1070, the V32 signal from counter 1071 at line 1086 and the V512 signal from counter 1072 at line 1088. With the 552nd count transition, the output of component 1080, labeled (522) at line 1090 is introduced through coupled line 1092 to the load, LD, terminals of counters 1070-1072. This initiates the counters at value 28. As will become more apparent later herein, it also may be observed that counting at network 1068 takes place at twice the horizontal rate. Further, the $Q_A$-$Q_D$ output terminals of the counters in network 1068 are labeled in accordance with their count value, i.e. V1, V2, V4, V8, V16, V32, V64, V128, V256 and V512. The coupled, the signal at line 1078 will represent the value 255 ANDed with H. Line 1078, in addition to being coupled with a T-enable terminal of counter 1072, is connected through line 1092 to one input of an AND function represented at component 1094. The opposite input to component 1094 is coupled through line 1096 to the $Q_A$ terminal of counter 1072 which represents the V256 signal and the resultant ANDed output of component 1094 represents the 511th combination ANDed with H, (511)·H. Looking momentarily to FIG. 35B, it may be seen that the signals: H16, H, V512, (which develops vertical blanking as labeled) and (511)·H are represented in fragmentary fashion, the latter fragmentation being necessary in view of the broad scaling involved.

Returning to FIG. 34B, signal H16 at line 1058 also is introduced through a buffer 1098 and is complemented as represented by the slash to a J-K flip-flop 1100. Flip-flop 1100 serves the function of dividing signal H16 by the even number 2 as compared with a division at network 1068 by the odd value 525. This will be seen to permit the development of a proper interlacing capacity at the video raster. The output of flip-flop 1100 is generally designated as a "line" output and is represented at L+ and L—. The latter output is coupled to one input of an AND function component 1102, while the former is coupled and complemented as represented by the slash with AND function component 1104. The opposite input to each of the AND function components 1102 and 1104 is the signal emanating from component 1094 and represented as (511)·H. The output of component 1104 is introduced through buffer 1106 to the K input terminal of J-K flip-flop 1108, while the output of component 1102 is introduced to the J terminal thereof. Flip-flop 1108 is toggled from line 1110 (CLKB) which is connected with line 1072. The outputs of flip-flop 1108 represent the signals designating field one, F+, and field zero, F—, for a given frame of the video raster. Looking to FIG. 35C, a schematic representation of these field designations for a given raster is provided. Note that field one as represented in dashed line fashion is observable at the top of the raster as commencing with a horizontal scan appearing at the midpoint of the raster screen. Conversely, field zero initiates a horizontal scan at the upper left end of the raster. Because there are 525 divisional counts involved in a total frame, each field zero and field one is evolved utilizing 262.5 of the available 525 counts.

Turning to FIG. 34C, a network is shown which utilizes signal combination to derive blanking pulses. The horizontal blanking pulse is developed by the ANDed combination of line signal, L, with H16 as represented by AND function component 1110. The output of component 1110 is directed through line 1112 into a buffer 1114 to evoke the horizontal blanking signal, HBLANK, the corresponding vertical blanking signal is, as discussed above, the signal V512 derived from counter 1072. This signal is introduced through buffer 1116 to one input of an OR function component 1118, the opposite input thereto being the output of component 1110. The output of OR function component 1118 is complemented, as represented by the slash, to provide a composite blanking pulse, BLANK, which is inverted at buffer 1120 to provide a composite unblanking pulse designated, UNBLANK.

Returning to FIG. 35B, the relationship which is developed between the field one and field zero designations and the interlaced locations of horizontal sweeps within those fields is illustrated. As indicated above, the horizontal blanking pulse represents as ANDed combination of line signal and H16. Thus, one may represent the horizontal trace as an idealized repetitive saw tooth drawn using the information provided by ANDing the line signal with H16. Representative ones of these traces are shown along the lower portion of the drawing along with the corresponding position of signal V512 and the locations of field zero and field one. Note, that within the region of field zero, the horizontal blanking interval is concluded in correspondence with the conclusion of the vertical blanking interval, a condition permitting the development of a horizontal trace from the upper left region of the raster in normal form. For field one, however, observation of the development of the horizontal blanking pulse shows that vertical blanking terminates midway through a given horizontal trace. Thus, interlacing is uniquely derived in consequence of the earlier-noted ratio evolved from the division of 525 in connection with vertical counting as associated with the even division of horizontal counts at flip-flop 1100. To facilitate an understanding of the pertinence of the line signal, vertical counter values are positioned in the timing diagram in association therewith. A comparison within the diagram of the combination of (511)·H with the line signal, shows the development of FIELD 1 and FIELD 0 signals.

FIG. 34D shows the derivation of a composite sync signal, SYNC, which is an ORed combination of the horizontal and vertical sync pulses, HSYN and VSYN which are introduced to the input of OR function component 1122, the output of which is directed to a driver function represented as component 1124. The latter component may be present as a type 74S03.

Figure 34E:
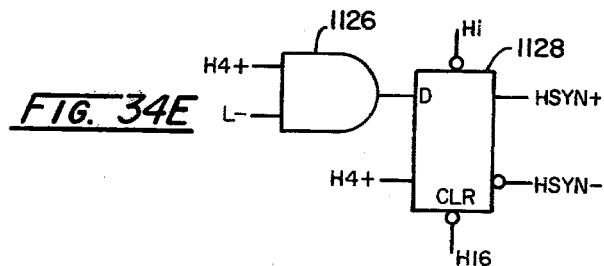

Looking to FIG. 34E, the development of the horizontal sync signal, HSYN, is revealed. This signal, which is positioned within the positive component of signal H16, represents an ANDed combination of H4 and line, L, as submitted to AND component 1126. The output of component 1126 is directed to the D input terminal of a flip-flop 1128 which is clocked by signal, H2. Flip-flop 1128 is cleared by the complement of signal H16.

Figure 34F:
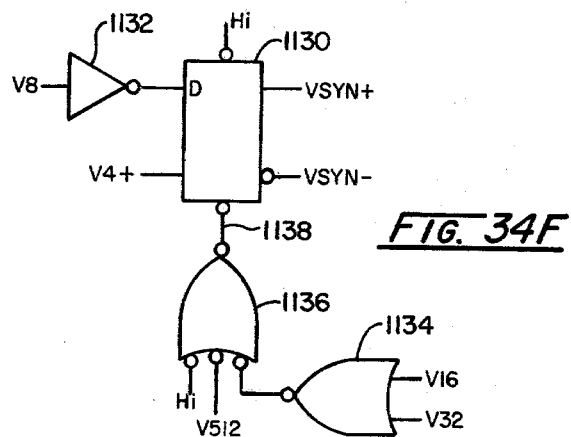

FIG. 34F shows the derivation of the vertical sync pulse, VSYN. This pulse is generated from a flip-flop of the earlier described type 74LS74 at 1130, the D input terminal of which is coupled to receive signal V8 from component 1070 which is introduced through buffer 1132 and complemented as represented by the slash. Flip-flop 1130 is clocked, as shown, by signal V4 from the same counter component and is held in a clear state by a signal developed initially by the ORed combination of signals V16 and V32 from counter 1071 as introduced to OR component 1134 and the output of which is directed to OR component 1136. Component 1136 also receives signal V512 which is complemented, as represented by the slash, and the output thereof at line 1138 represents the signal: V16+V32+$\overline{V512}$. With the arrangement shown, the vertical sync pulse will occur at the commencement of vertical blanking.

Figure 34G:
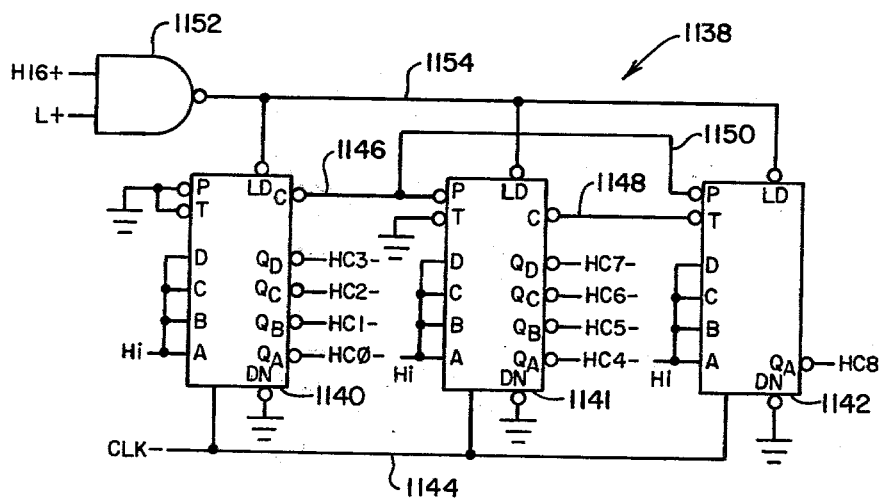

Referring to FIG. 34G, the horizontal counter network utilized in conjunction with components 504 and 505 of the line generator circuit of FIG. 17 is revealed generally at 1138 as including counters 1140–1142. These counters may be present, for example, as type 74S169 and are driven at a rate represented by signal CLK as asserted from line 1144 and complemented as represented by the slashes at the inputs to the counters. Counters 1140–1142 are operated in a down count fashion, the output thereof then being converted to cause their operation in simulation of an upcount suited for use with the network of FIG. 17. Such an arrangement serves to minimize the delays otherwise occasioned through the use of additional buffering functions. Counters 1140–1142 are coupled in cascade fashion, counter 1140 being coupled along line 1146 to counter 1141, while the carry output, C, of the latter counter is coupled to the T-enable terminal of counter 1142 by line 1148. Note additionally, that the carry terminal, C, of counter 1140 is coupled by line 1150 to the propagate, P, terminal of counter 1142 in carry-look ahead fashion.

Control over the operation of network 1138 emanates from AND function component 1152, the inputs of which receive signals H16 and LINE. Observation of these signals at FIG. 35B reveals that the output of component 1152 at line 1154 represents horizontal blanking. Accordingly, loading is carried on during the entire horizontal blanking pulse to disable the counters during that interval, thus simplifying their properly synchronized enablement. Network 1138 serves to count down from binary 511 to zero at the higher frequency of the CLK signals.

Those figures alphanumerically designated with the numberical prefex 36 look to the logic which controls the function earlier described as "GO" which calls for a change in the processing mode of computation and further looks to the establishing of the location of the varnishing point, VP. In view of the interlacing feature of the system, it is necessary to provide a technique wherein the position of that vanishing point remains constant in both fields zero and one of a frame.

Figure 36A:
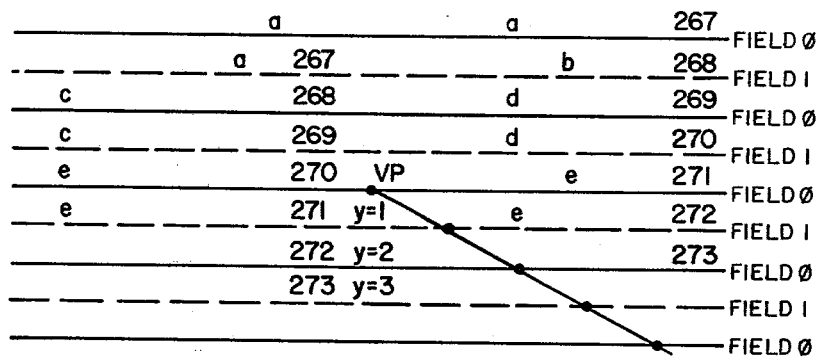
FIG. 36A is a diagrammatic representation of a portion of a raster showing horizontal traces and vanishing point positions.
Figure 36B:
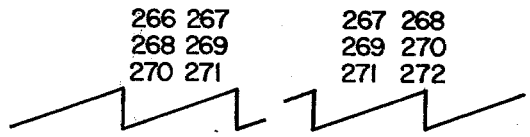
FIG. 36B is a diagrammatic representation of line numbers as shown in FIG. 36A as related to horizontal traces.

Looking to FIG. 36A, a portion of a raster in the vicinity of the vanishing point is revealed showing horizontal tracing in highly idealized fashion, field 0 being shown in solid line fashion and field 1 being shown in dashed line fashion. These idealized traces are given representative vertical counter number values in the diagram at two locations, it being recalled that the vertical count is incremented twice for a horizontal scan, i.e. twice the horizontal rate in order to provide interlacing. Shown at FIG. 36B in connection with the horizontal trace diagram of FIG. 36A are the idealized sawtooth-like horizontal traces as earlier represented in FIG. 35B. In this case, however, the counter value numbers as shown in the associated diagram are aligned for the half horizontal trace to which they pertain for each field 0 and field 1. Observe in these numerical alignments that, for field 0, all vertical counter values are odd numbers, while, conversely, for field 1, all of the right hand or end of trace vertical count numbers are even in nature. Note additionally, that the vanishing point position, VP, has been shown to occur on a field 0 line but between two corresponding field 1 lines. As indicated above, it is necessary to maintain a consistent position for this vanishing point for each of fields 0 and 1.

Referring to FIG. 36C, a network of three cascade coupled comparators is shown at 1154-1156. These components may be present, for example, as type 74LS85 and are configured having their $V_n$ terminals receiving the V1, V2, V4, V8, V16, V32, V64, V128, V256 and V512 output signals from vertical counter network 1068. The opposite, $A_n$, terminals are coupled to receive input signals representing the selected vertical position of the vanishing point, VP upon the raster. Note that the $A_0$ terminal of initial comparator 1154 is coupled with +v(hi) such that any number asserted at the $A_n$ terminal inputs is an odd one. With the arrangement, in the event of equivalency between the vertical count input at the $B_n$ terminal array of the comparators and the number asserted for vanishing point at the $A_n$ terminals results in an output signal, N, at line 1158.

Looking to FIG. 36D and the assignment map associated therewith, a state diagram is portrayed having an initial state, a, representing the condition of the system vis-a-vis the instant logic thereof associated with the upper regions of a raster (above the vanishing point). This state is represented for illustrative purposes, for both field 1 and field 0 in FIG. 36A. The state diagram of FIG. 36D shows that when the condition, $N.H.\overline{F}$, representing an ANDing of N with signal H as derived at line 1066 in FIG. 34B and field 0, is present, then state c obtains which serves to generate a GO signal. Looking to the timing diagram at FIG. 36E which corresponds with the diagram at FIG. 36A, note that for field 0, state c commences at the end of line 267. The state diagram at FIG. 36D also reveals that a state, b, may be achieved with the conditions: $N.H.F$, representing the ANDded combination of N with signal H and field 1. State b is a delay condition for field 1 and must be ANDed with a signal, H, before achieving state c and a GO signal. Looking again to FIGS. 36E and 36A, note that the GO signal occurs at the commencement of state c and the corresponding commencement of line 269 for field 1, as compared with the commencement of the GO signal at line 268 for field O. Recall that with the GO signal, ROM addresses are computed by the arithmetic units. It may be noted further that the address computation is carried out at lines 268 and 269 depending upon the field being created while that address then is utilized at respective lines 270 and 271. Thus, for the exemplary development of the GO signal, the $A_n$ terminals of the comparators of FIG. 36C would be set to establish a number 267 and, with the development of an equality or, N, signal, ANDed with H for field 1. For field 0, the GO signal is developed at the termination of line 267.

Figure 36E:
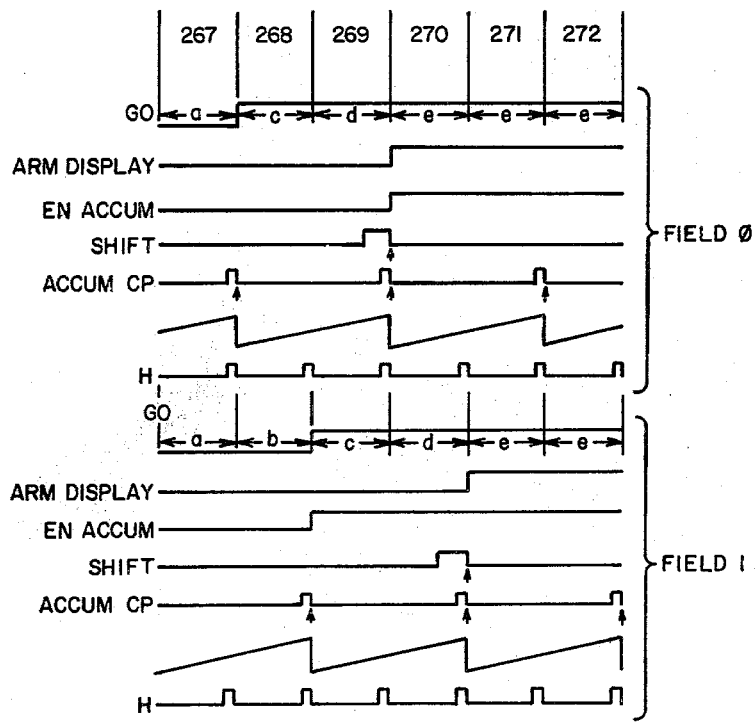
FIG. 36E is a timing diagram showing a performance of components of the vanishing point and terrain display functions of the system of the invention.

FIG. 36A also shows an exemplary sloping generated line or boundary, the first half increment defined thereby being on a field one trace. As a consequence, the first time in the sequence that the slope related boundary position for field 1 and line 269 is utilized in a line 271. As described earlier herein, however, this boundary position for this particular unique trace is only one half of a normally computed horizontal increment. The idealized sawtooth representation of horizontal traces for fields 0 and 1 also are shown in FIG. 36E. It may be recalled from the discussion in connection with FIGS. 6A-6E, that the y count was loaded as being zero for the vanishing point representing field 0 and, alternately, at a one value where field 1 was at hand. This accommodates for the first occurrence of field 1 below the vanishing point as opposed to coincident with it (see blocks 302 and 303 as well as the address computation equations shown in Table III). Returning to FIG. 36D, the next state, state d, is one wherein the GO condition obtains and wherein a SHIFT signal is derived. The latter signal will be recalled to be utilized in connection with the generator network of FIG. 17 wherein following a SHIFT signal, the numerical data within components 544-547 is shifted to permit the development of a boundary defining number representing a full horizontal increment from the vanishing point on the raster. FIG. 36E shows that, for field 0, the SHIFT signal occurs at the position represented by the arrow upon the termination of line 269, a point in imaging time sufficient for the initial loading at the vanishing point position. On the other hand, the latter figure reveals that the same SHIFT signal occurs at the commencement of line 271, a point in time sufficiently delayed to permit a first half value of slope-related horizontal increment to be utilized by the system. FIG. 36E also reveals that the accumulator enablement signal, EN ACCUM (later buffered) is developed earlier for field 1 than field 0 and that the accumulator clock pulse described earlier as developed at line 564 in FIG. 17 between fields 0 and 1 is skewed, the latter signal becoming effective only in the presence of the EN ACCUM signals. For field 1, it may be noted that registers 524–527 are clocked just prior to the falling edge of the SHIFT signal. This permits loading of the initial slope related horizontal increment value for boundary definition just prior to the shifting signal. Thus, the sequence of events witnessed for field 1 commences with the presence of an EN ACCUM signal early in the sequence, followed by a clocking of the accumulators from line 564 to effect the loading of a half slope related increment value for the initial horizontal trace below vanishing point, followed by a SHIFT signal to develop a full horizontal increment slope related signal.

Looking to FIG. 36F, the development of the SHIFT signal is revealed as being carried out by a network including AND function component 1158 (which may be of type 74LS20) and which receives state signals $y_0$, $y_1$ and $y_2$, $y_0$ and $y_2$ being complemented as represented by the slashes. Component 1158 also receives an H BLANK signal. The output of component 1158 is buffered at 1160 to develop the above-noted SHIFT signal.

Looking to FIG. 36G, the network developing signal, EN ACCUM, as utilized with the network of FIG. 17 is shown. This network includes an AND function component 1162, the input of which receives $y_2$ and F, the latter being complemented such that the input to the component represents field 0 ANDed with state e, as identified at the assignement map of FIG. 36D. The output of component 1162 is introduced to an OR function represented by component 1164. Similarly, the network includes an AND function represented by component 1166 the inputs of which are field 1, F, and $y_1$, the latter, as defined at the assignment map in FIG. 36D, representing state c or d or e. The output of component 1166 additionally is introduced to OR function component 1164 and the output of the network, as indicated, represents EN ACCUM.

Looking to FIG. 36H, a network deriving the noted signal conditions $y_0$, $y_1$ and $y_2$ along with the signals ARM DISPLAY and GO is portrayed. The ARM DISPLAY signal is one utilized to commence a counter operation which determines the position of horizon 30 below the vanishing point, VP. As shown in FIG. 36D, this signal is present during state e, which state further includes the GO signal. As is apparent, state e continues to the bottom scan of a given raster and, as shown in FIGS. 36A and 36E, commences in relation to the interlace performance of the system. The network of FIG. 36H includes a J-K flip-flop 1168, the J terminal of which is coupled with the output of an AND function component 1170. Component 1170 has inputs identified as signals, H, N and $y_1$ the latter of which is complemented as represented by the slash. The K terminal input of flip-flop 1168 is coupled with the output of AND function component 1172, the corresponding input of which is coupled to receive signals $y_1$ and H. The $y_1$ signals asserted at components 1170 and 1172 emanate as the outputs of a downstream located J-K flip-flop 1174. Flip-flop 1168 is clocked from signal CLKB as derived from timing flip-flop 1052 shown in FIG. 34A and provies $y_0$ outputs at lines 1176 and 1178. Output state $y_0$ at line 1176 is coupled to one input of AND function component 1180, the opposite input thereto being signal, H as derived from line 1066 in FIG. 34B. Similarly, state $y_0$ at line 1178 is complemented, as represented by the slash and introduced to AND function component 1182, that component also receiving input signals, N, H and a complemented field, F, signal. The outputs of components 1180 and 1182 are introduced to the input of an OR function component 1184 whose output, in turn, is coupled to the J input terminal of flip-flop 1174. The K terminal of flip-flop 1174 is coupled through line 1186 to AND function component 1188 which, in turn, receives signals, H and V512 at its input. The output states of flip-flop 1174 are identified as $y_1$ and that developed at line 1190 and directed through line 1192 is the above-described GO signal. Note, that flip-flop 1174 is synchronously clocked by signals CLKB.

Line 1190 along with a complemented signal or state $y_0$ AND signal, H is coupled to the input of an AND function 1194, the output of which is coupled to the J input terminal of a J-K flip-flop 1196. The K terminal of flip-flop 1196 is coupled through line 1198 to the output of AND component 1188 and the flip-flop is clocked by signals, CLKB, to provide output states, $y_2$, that being shown at line 1200 representing the signal, ARM DISPLAY. Returning to the state diagram of FIG. 36D, inasmuch as the state, e, continues until the horizontal trace reaches the bottom of the raster, the system reverts to state, a, on the occasion of vertical blanking represented by signal V512, that signal being ANDed with signal Turning to FIG. 37, the ARM DISPLAY signal is seen to be introduced to the T-enable input terminal of a down counter 1202 which is coupled in cascade with a similar down counter 1203. Counters 1202 and 1203 may be of type 74LS169 and are arranged such that a number may be inserted at their A-D terminals representing a distance below the vanishing point, i.e. the position where terrain is imaged. Terminal A of counter 1202 is permanently grounded such that the number inserted always is even and the counters are synchronized by signals CLKB as at line 1204. Cascade coupling of the counters is provided by line 1206 extending between the carry output, C, of counter 1202 to the T-enable input of counter 1203. The carry output, C at line 1208 of counter 1203 is true when the counters decrement to zero and this zero signal is representative of the signal SKY or TERRAIN and is directed along line 1210, whereupon it is complemented as represented by the slash and introduced to an AND function component 1212. The opposite input to component 1212 is H+ and the output thereof at line 1214 is introduced to the P-enable input terminal 1202. Thus when the count decrements to zero, the counter remains disabled until loaded. Line 1214 also is coupled to line 1216 which extends to the P-enable input of counter 1203. Loading of both counters is carried out from lines 1218 and 1220 and is provided by the signal (V512.H) which represent the vertical retrace.

Figure 37:
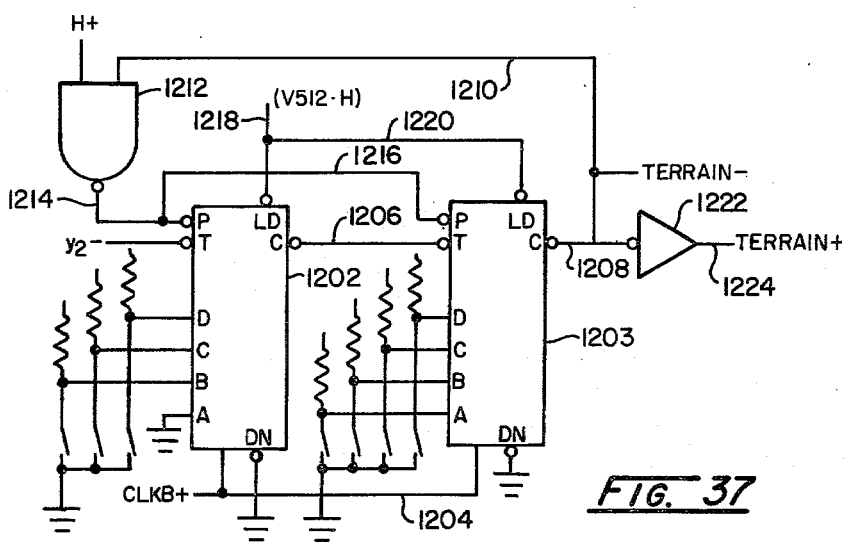
FIG. 37 is a schematic circuit diagram showing components developing SKY and TERRAIN signals.

With the arrangement shown, the assertion, in effect, of state, e, as defined by the state diagram of FIG. 36D and, the counters represented at FIG. 37 are enabled only in the presence of state e, a zero output at line 1208 and in presence of the signal, H. The output of the network at line 1208 is directed through an inverter-buffer 1222 to provide the signal identified as TERRAIN at line 1224. This signal is utilized as described in conjunction with FIG. 32A for the generation of video information signal, SKY, as well as in conjunction with the video information signal, GRASS, as described in connection with the network of FIG. 32.

A review of the foregoing description will reveal that a combination of 15 video information signals will have been derived for the embodiment described. These signals are directed to a video processing function comprised of four arrays of video generators. Looking to FIGS. 38A and 38B, the array of generators developing red video outputs is shown generally at 1240, an array of green generators is shown generally at 1242, an array of blue generators at 1244 and an array of luminance video generators are represented generally at 1246. One generator within each of the arrays 1240, 1242, 1244 and 1246 is coupled to receive a unique video information signal, those signals being labeled at the input line to each generator. For reference, the video information signals as labeled in FIGS. 38A and 38B will be found in FIGS. 28, 29, 30, 31, 32A and 32B. Each of the generators is described in detail in the above-referenced application for United States Patent Ser. No. 006,333 by the instatnt inventors.

The red video generators shown generally at 1240 are coupled between power input bus 1248 and line 1250. Line 1250, in turn, is coupled to the red input of a raster generator represented at 1252 as well as to a resistor 1254 which, in turn, is coupled to ground. The generators 1240 provide a current flow to line 1250 in correspondence with the level of video information signal asserted thereat as well as any overriding adjustments which may be made by the operator. The amount of current passed along line 1250 determines the video voltage generated at resistor 1254 and this voltage is asserted as a video output at the red input of the raster generator as at 1252.

Green information is generated in identical fashion from generator array 1242 which is coupled through lines 1256 and 1258 to bus 1248 as well as to line 1260. The generators of 1242 evolve a green video output at the green input terminal 1262 of the raster generator in accordance with the video voltage evolved at resistor 1264. Similarly, as shown in FIG. 38B, blue information is generated in identical fashion to evolve a blue video output at the blue input terminal 1266 of the raster generator in accordance with the voltage evolved at resistor 1268. Note, that the generators shown at 1244 are coupled to line 1258 through line 1270, while input terminal 1266 is coupled with each generator within the array through line 1272. A luminance generator input is developed from the generators within array 1246 in similar fashion at output terminal 1272. The array of generators at 1246 is coupled to line 1258 and line 1274, the output being developed by voltage witnessed at resistor 1276. Additionally asserted at line 1274 is the composite sync signal, SYNC. This signal is treated by a network described in the above referenced application for United States Patent and represented at block 1278. Network 1278 provides a voltage swing for the composite sync signal ranging from a zero voltage level to a minus value, while the luminance component asserted at line 1274 will range from zero to plus levels.

As indicated above, the video outputs at terminals 1252, 1262, 1266 and 1272 are connected directly to the corresponding input of a video projector. Only the latter terminal provides sync information, the luminance signals being utilized for black and white image generation only. While these outputs may be coupled with an encoder to evolve an NTSC type input, such treatment is not preferred, inasmuch as it portends lessening of image quality. Additionally shown in FIG. 38A and described in detail in the above referenced application for United States Patent is a network represented at block 1280. Network 1280 asserts a control of the voltage supply at line 1248 for the purpose of imposing another visual cue in connection with the image generated at screen 18. In this regard, image reality may be improved where those portions of the image representing more distant objects are observed with less brilliance than those closer to the observer. Accordingly, a change in the intensity of colors or luminance (for black and white performance) is developed at network 1280 with respect to the vertical position of components of the image on the screen. Those objects at the top of the screen for the geometry at hand, will be further from the observer than those at the bottom. To develop this intensity gradient a digital-to-analog function is provided which is associated with the vertical position of the horizontal trace of the raster.

It will be apparent to those artskilled that the instant system, method and apparatus for simulating visual cues will find application in a broad range of simulative endeavors, either where terrain is involved or in connection with naval devices. The technique of utilizing a vanishing point along with the generation of a plurality of generated boundaries or lines and through the use of the unique geometry to avoid cosine computations and the like lends the system to a broad variety of applications. Thus, certain changes may be made in the above-described system, method and apparatus without departing from the scope of the invention herein involved. Therefore, it is intended that all matter contained in the description herein or shown in the accompanying drawings shall be interpreted as illustrative and not in a limiting sense.

We claim:

1. The method of simulating visual cues at a display surface positioned a distance, D, from an eye position, said cues representing portions of a simulative region having predetermined visual features defined by boundaries extending generally longitudinally outwardly from said eye position and by visual information having boundaries transversely oriented with respect to said longitudinal boundaries, said longitudinal and transverse boundaries being locatable by coordinates and said eye position having a simulated instantaneous height, H, and positions identified with respect to said coordinates, comprising the steps of:

generating a video raster and displaying said raster at said display surface;

generating signals representing the predetermined vertical location of a vanishing point within the periphery of said raster, those horizontal traces of said raster being located vertical distances designated, y, below said vanishing point;

generating slope signals, each representing the slope at said raster of said longitudinal boundary extensible from said vanishing point, said slope of a given longitudinal boundary representing a quotient substantially derived as the value of the transverse displacement of said given boundary from the corresponding position of said instantaneous eye position divided by a value representing said instantaneous height, H;

providing an addressible image information memory, each address thereof retaining an information signal representing said visual information;

addressing said memory to provide said information signals for a given said visual feature in correspondence with said eye position instantaneous height, H, its coordinate position and a said horizontal trace position, y;

generating boundary signals representing said longitudinal boundaries extending from said vanishing point at the slopes defined by said slope signals;

treating said combination of said boundary signals and said addressed information signals to provide video information signals;

processing said video information signals to generate video outputs; and treating said video outputs to provide an image at said raster.

2. The method of claim 1 in which:

each said longitudinal boundary is displaced transversely within said region from a parallel longitudinally disposed reference line a predetermined substantially unique distance, Wn;

said eye position is located at a said instantaneous coordinate, $Y_A$;

said reference line is located at a coordinate, $Y_R$; and each said slope signal is generated in correspondence with a quotient derived substantially as the value, $Y_A - Y_R + Wn$, divided by a value representative of said height, H.

3. The method of claim 1 wherein said slope signals are generated while said horizontal traces are located above said vanishing point.

4. The method of claim 1 wherein said image information memory is addressed by generating an address signal, KA, having as a component thereof the quotient of the value of said height, H, divided by the value of a said horizontal trace position, y.

5. The method of claim 4 wherein:

said image information memory is provided having an initial address corresponding with an outer terminal, said transversely oriented boundary which is spaced longitudinally from a reference point within said region a distance of value KN; and said address signal, KA, is generated as the product of said quotient H/y and the value of said distance, D, said product being combined with said value, KN, and a value representing the coordinatized longitudinal distance between said reference point and said eye position.

6. The method of claim 5 in which:

each said longitudinal boundary is displaced transversely within said region from a parallel longitudinally disposed reference line a predetermined substantially unique distance, Wn;

said eye position is located at a said instantaneous coordinate, $Y_A$;

said reference line is located at a coordinate position, $Y_R$; and each said slope signal is generated in correspondence with a quotient derived as the value, $Y_A - Y_R + Wn$, divided by a value representative of said height, H.

7. The method of claim 6 wherein said slope signals are generated while said horizontal traces are located above said vanishing point.

8. Visual display apparatus for use in a simulator system of a variety wherein visual motion cues are generated as a video raster display at a stationary display surface spaced from an eye position a distance, D, said visual cues representing portions of a simulative region having predetermined visual features defined by boundaries extending generally longitudinally outwardly from said eye position and by visual information having boundaries generally transversely oriented with respect to said longitudinal boundaries, said boundaries and instantaneous said eye positions being identifiable within a simulative coordinate system and said eye position having a simulative height, H, said apparatus comprising:

timing means for generating video raster controls including horizontal scan information and control signals developed through a predetermined digital sequence and vertical information and control signals developed through a predetermined digital sequence;

first circuit means for generating signals representing the predetermined vertical location of a vanishing point upon said raster, horizontal traces of said raster being located vertical distances, y, below said vanishing point;

second circuit means for developing slope signals each representing the slope at said raster of a said longitudinal boundary extensible from said vanishing point, said slope of a given longitudinal boundary representing a quotient substantially derived as a value representing the transverse displacement within said coordinate system of said given boundary from the corresponding position of said instantaneous eye position divided by a value representing said instantaneous height, H;

third circuit means responsive to said timing circuit means horizontal scan information signals and said slope signals for generating boundary signals representing said longitudinal boundaries extending from said vanishing point at the slopes defined by said slope signals;

fourth circuit means for treating the combination of said boundary signals and signals representing said visual information to provide video information signals; and video processing means responsive to said video information signals for deriving video outputs for developing an image at said raster.

9. The visual display apparatus of claim 8 wherein:

each said longitudinal boundary is displaced transversely within said simulative region from a parallel longitudinally displaced reference line having a position, $Y_R$, a select, substantially unique distance, Wn;

said eye position is located within said coordinate system at a position $Y_A$, and said third circuit means is configured to develop each said slope signal in corresondence with a quotient of the value, $Y_A - Y_R + Wn$, divided by a value representative of said height, H.

10. The visual display apparatus of claim 8 in which said second circuit means is configured for developing said slope signals when said horizontal traces are located above said vanishing point.

11. The visual display apparatus of claim 8 including:

image information memory means for retaining an information signal representing said visual information at a unique address:

said second circuit means is a processor having an arithmetic function for deriving a said unique address in correspondence with said eye position instantaneous height, H, its position within said coordinate system and a said horizontal trace position, y.

12. The visual display apparatus of claim 11 wherein said second circuit means is configured to derive said unique address as a signal, KA, having as a component thereof the quotient of the value of said height, H, divided by the value of a said horizontal trace position, y.

13. The visual display apparatus of claim 12 wherein:
said image information memory means is provided having an initial address corresponding with an outer, terminal, said transversely oriented boundary which is spaced longitudinally from a reference point within said region a distance of value KN; and said second circuit means is configured to generate said address signal, KA, as the product of said quotient, H/y, and the value of said distance, D, said product being combined with said value, KN, and a value representing longitudinal distance within said coordinate system between said reference point and said eye position.

14. The visual display apparatus of claim 8 further comprising fifth circuit means for generating signals for defining a horizon extending across said raster.

15. The visual display apparatus of claim 8 in which said timing means includes:
vertical counter means for deriving said predetermined digital sequence of vertical control signals as a division by a predetermined odd number of a digital sequence of said horizontal control signals; and
control means for dividing said digital sequence of horizontal control signals by two and combining the thus divided horizontal control signals with said vertical control signals to establish a sequence of vertical blanking signals and horizontal blanking signals defining an interlaced raster frame of field 0 and field 1.

16. The visual display apparatus of claim 15 in which said first circuit means includes comparator means responsive to said vertical information signals for deriving an output signal for locating said vanishing point during a said field having an intersecting horizontal trace passing through said vanishing point, and including network means for deriving said output signal for a next succeeding field having a horizontal trace thereof located next below said intersecting horizontal trace.

17. The visual display apparatus of claim 8 wherein said third circuit means comprises:
comparator means having a first input coupled to receive said timing circuit means horizontal scan information and a second input for receiving longitudinal boundary slope increment signals and having an output for providing said boundary signals representing the digital correspondence between said first and second inputs;
adder means having a first input for receiving retained said second circuit means slope signals, a second input for receiving summed slope signals for developing a summation of said signals at said first and second inputs at an output thereof;
data selector means having a first input for receiving said adder means output summed signals and a second input for receiving a signal representing the horizontal positions of said vanishing point at said raster and selectively actuable to present a predetermined one of said first or second inputs at the output thereof;
shifter network means having an input for receiving said second circuit means slope signals and retaining them and actuable to substantially halve the value of a said slope signal corresponding with a horizontal scan first appearing below said vanishing point.

18. The visual display apparatus of claim 17 wherein said third circuit means further includes:
overflow detection means coupled with said adder means and responsive to an overflow condition thereat to inhibit the enablement thereof; and
override network means responsive to said overflow condition for inhibiting the development of a said boundary signal.

19. Visual display apparatus for use with a flight simulator system of a variety including a base supported aircraft trainer having a cockpit and front and side window-like openings for providing lines of sight from an eye location within said cockpit and having flight controls manipulative to cause said cockpit to move upon said base in roll, pitch and yaw attitudes about respective longitudinal, transverse and vertical axes, said system including a stationary display surface viewable from said eye location along said lines of sight, said surface being spaced from said eye location a predetermined distance, D, for display of a simulative terrain region as a video raster, said region being defined having predetermined visual features established by boundaries, all extending in parallel to one selected coordinate direction of a coordinate system, said selected coordinate direction being designated X, or Y, said region being further defined by visual information having boundaries transversely oriented with respect to said longitudinal boundaries, said trainer including means generating altitude signals, H, substantially representative of the height of said eye location above said terrain region and means for generating signals representing the simulated velocity of said trainer, said apparatus comprising:
timing means for generating video raster controls including horizontal scan information and control signals developed through a predetermined digital sequence and vertical information and control signals developed through a predetermined digital sequence;
first circuit means for generating signals defining the predetermined vertical location of a vanishing point representing the convergence of said longitudinal boundaries upon said raster, those horizontal traces of said raster located below said vanishing point being positioned vertical distances, y, therefrom;
second circuit means for developing slope signals each representing the slope at said raster of a said longitudinal boundary extensible from said vanishing point, said slope of a given longitudinal boundary representing a quotient substantially derived as a value representing the transverse displacement within said coordinate system of said given boundary from the corresponding position of said eye location within said coordinate system divided by a value representing said height, H, said eye position being derived from said velocity signals;
third circuit means responsive to said timing circuit means horizontal scan information signals and said slope signals for generating boundary signals representing said longitudinal boundaries extending from said vanishing point at the slopes defined by said slope signals;
fourth circuit means for treating the combination of said boundary signals and signals representing said visual information to provide video information signals; and video processing means responsive to said video information signals for deriving video outputs for developing an image at said raster.

20. The visual display apparatus of claim 19 wherein:

said longitudinal boundaries are aligned along said X coordinate direction;

each said longitudinal boundary is displaced transversely within said simulative region from a parallel reference line having a coordinate position, $Y_R$, a select distance, $Wn$;

said second circuit means includes responsive to said velocity signals for generating the location of said eye position within said coordinate system as, $Y_A$, and further includes means for developing said slope signal in accordance with the expression:

$$\frac{Y_A - Y_R + Wn}{H},$$

where said velocity signals correspond with simulated flight generally along a $+X$ coordinate direction and, in accordance with the expression:

$$\frac{-Y_A + Y_R - Wn}{H},$$

where said velocity signals correspond with simulated flight generally along a $-X$ coordinate direction.

21. The visual display apparatus of claim 19 wherein:

said longitudinal boundaries are aligned along said Y coordinate direction;

each said longitudinal boundary is displaced transversely within said simulative region from a parallel reference line having a coordinate position, $Y_R$, a select distance, $Wn$;

said second circuit means includes means responsive to said velocity signals for generating the location of said eye position within said coordinate system as, $Y_A$, and further includes means for developing said slope signal in accordance with the expression:

$$\frac{-X_A + X_R + Wn}{H},$$

where said velocity signals correspond with simulated flight generally along a $+Y$ coordinate and, in accordance with the expression:

$$\frac{X_A - X_R - Wn}{H},$$

where said velocity signals correspond with a simulated flight generally along a $-Y$ coordinate.

22. The visual display apparatus of claim 19 in which said second circuit means is configured for developing said slope signals when said horizontal traces are located above said vanishing point.

23. The visual display apparatus of claim 19 including:

image information memory means, for retaining an information signal representing said visual information at a unique address;

said second circuit means is a processor having an arithmetic function for deriving said unique address in correspondence with said eye position instantaneous height, H, its position within said coordinate system and said horizontal trace position, y.

24. The visual display apparatus of claim 23 wherein said second circuit means includes means for deriving said unique address as a signal, KA, having as a component thereof, the quotient of the value of said height, H, divided by the value of a said horizontal trace position, y.

25. The visual display apparatus of claim 23 in which:

said longitudinal boundaries are aligned along said X coordinate direction;

said second circuit means is configured to derive said unique address as a signal, KA, in accordance with the expression:

$$KA = X_A - X_R + KN + (DH/y),$$

when said velocity signals represent simulated flight generally along a $+X$ coordinate, and in accordance with the expression:

$$KA = X_A - X_R + KN - (DH/y),$$

when said velocity signals represent a simulated flight generally along a $-X$ coordinate direction, and where, $X_A$ represents the simulated X coordinate position of said eye position, $X_R$ represents an X coordinate reference position fixed within said coordinate system and KN represents a distance along an X coordinate to an initial address within said image information memory means, said initial address corresponding with an outer, terminal said transverse oriented boundary which is spaced longitudinally from said reference point, $X_R$.

26. The visual display apparatus of claim 23 in which:

said longitudinal boundaries are aligned along said Y coordinate direction;

said second circuit means is configured to derive said unique address as a signal, KA, in accordance with the expression:

$$KA = Y_A - Y_R + KN + (DH/y),$$

when said velocity signals represent simulated flight generally along a $+Y$ coordinate, and in accordance with the expression:

$$KA = Y_A - Y_R + KN - (DH/y),$$

when said velocity signals represent a simulated flight generally along a $-Y$ coordinate direction, and where $Y_A$ represents the simulated Y coordinate position of said eye position, $Y_R$ represents a Y coordinate reference position fixed within said coordinate system and KN represents a distance along a Y coordinate to an initial address within said image information memory means, said initial address corresponding with an outer, terminal said transverse oriented boundary which is spaced longitudinally from said reference point, $Y_R$.

27. The visual display apparatus of claim 19 in which said timing means includes:

vertical counter means for deriving said predetermined digital sequence of vertical control signals as a division by a predetermined odd number of a digital sequence of said horizontal control signals; and control means for dividing said digital sequence of horizontal control signals by two and combining the thus divided horizontal control signals with said vertical control signals to establish a sequence of vertical blanking signals and horizontal blanking signals defining an interlaced raster frame of field 0 and field 1.

28. The visual display apparatus of claim 27 in which said first circuit means includes comparator means responsive to said vertical information signals for deriving an output signal for locating said vanishing point deriving a said field having an intersecting horizontal trace passing through said vanishing point, and including network means for deriving said output signal for a next succeeding field having a horizontal trace thereof located next below said intersecting horizontal trace.

29. The visual display apparatus of claim 27 wherein said third circuit means comprises:

comparator means having a first input coupled to receive said timing circuit means horizontal scan information and a second input for receiving longitudinal boundary slope increment signals and having an output for providing said boundary signals representing the digital correspondence between said first and second inputs;

adder means having a first input for receiving retained said second circuit means slope signals, a second input for receiving summed slope signals for developing a summation of said signals at said first and second inputs at an output thereof;

data selector means having a first input for receiving said adder means output summed signals and a second input for receiving a signal representing the horizontal position of said vanishing point at said raster and selectively actuable to present a predetermined one of said first or second inputs at the output thereof;

shifter network means having an input for receiving said second circuit means slope signals and retaining them and actuable to substantially halve the value of a said slope signal corresponding with a horizontal scan first appearing below said vanishing point.

30. The visual display apparatus of claim 29 wherein said third circuit means further includes:

overflow detection means coupled with said adder means and responsive to an overflow condition thereat to inhibit the enablement thereof; and override network means responsive to said overflow condition for inhibiting the development of a said boundary signal.

31. A system for aircraft flight simulation comprising:

a base supported aircraft trainer having a cockpit and front and side window-like openings for providing lines of sight from an eye location within said cockpit and having flight controls manipulative to cause said cockpit to move upon said base in roll, pitch and yaw attitudes about respective longitudinal, transverse and vertical axes, said trainer including means generating altitude signals, H, substantially representative of the height of said eye location above a simulative terrain region having predetermined visual features defined by boundaries extending generally longitudinally outwardly from said eye position and by visual information having boundaries generally transversely oriented with respect to said longitudinal boundaries, said boundaries and instantaneous said eye positions being identifiable within a simulative coordinate system for said region, said trainer including means for generating velocity signals representative of the instantaneous simulated velocity of said trainer with respect to said region;

a stationary, generally vertically oriented display surface viewable from said eye location along said lines of sight, said surface being spaced from said eye location a predetermined distance, D;

video imaging means for imaging a video raster at said display surface;

timing means for generating video raster controls including horizontal scan information and control signals developed through a predetermined digital sequence and vertical information and control signals developed through a predetermined digital sequence;

first circuit means for generating signals defining the predetermined vertical location of a vanishing point representing the convergence of said longitudinal boundaries upon said raster, those horizontal traces of said raster located below said vanishing point being positioned vertical distances, y, therefrom;

second circuit means for developing slope signals each representing the slope at a said raster of said longitudinal boundary extensible from said vanishing point, said slope of a given longitudinal boundary representing a quotient substantially derived as a value representing the transverse displacement within said coordinate system of said given boundary from the corresponding position of said instantaneous eye position divided by a value representing said instantaneous height, H, said instantaneous eye position being derived from said velocity signals;

third circuit means responsive to said timing circuit means horizontal scan information signals and said slope signals for generating boundary signals representing said longitudinal boundaries extending from said vanishing point at the slopes defined by said slope signals;

fourth circuit means for treating the combination of said boundary signals and signals representing said visual information to provide video information signals; and video processing means responsive to said video information signals for deriving video outputs for developing an image at said raster.

32. The system of claim 31 wherein:

each said longitudinal boundary is displaced transversely within said simulative region from a parallel longitudinally displaced reference line a select substantially unique distance, Wn, said reference line having a coordinate position, $Y_R$;

said second circuit means is configured to derive said eye position location within said coordinate system as, $X_A$, and is further configured to develop each said slope signal in correspondence with a quotient of the value, $X_A - X_R + Wn$, divided by a value representative of said height, H.

33. The visual display apparatus of claim 31 in which said second circuit means is configured for developing said slope signals when said horizontal traces are located above said vanishing point.

34. The system of claim 31 including:

image information memory means, for retaining an information signal representing said visual information at a unique address;

said third circuit means is a processor having an arithmetic function for deriving a said unique address in correspondence with said eye position instantaneous height, H, its position within said coordinate system and a said horizontal trace position, y.

35. The system of claim 34 wherein said second circuit means is configured to derive said unique address as a signal, KA, having as a component thereof the quotient of the value of said height, H, divided by the value of said horizontal trace position, y.

36. The system of claim 35 wherein:
said image information memory means is provided having an initial address corresponding with an outer, terminal said transverse oriented boundary which is spaced longitudinally from a reference point within said region a distance of value KN; and
said second circuit means is configured to generate said address signal, KA, as the product of said quotient, (H/y) and the value of said distance, D, said product being combined with said value, KN, and a value representing longitudinal distance within said coordinate system between said reference point and said eye position.

37. The system of claim 31 in which said timing means includes:
vertical counter means for deriving said predetermined digital sequence of vertical control signals as a division by a predetermined odd number of a digital sequence of said horizontal control signals; and
control means for dividing said digital sequence of horizontal control signals by two and combining the thus divided horizontal control signals with said vertical control signals to establish a sequence of vertical blanking signals and horizontal blanking signals defining an interlaced raster frame of field of 0 and field 1.

38. The system of claim 37 in which said first circuit means includes comparator means responsive to said vertical information signals for deriving an output signal or locating said vanishing point deriving a said field having an intersecting horizontal trace passing through said vanishing point, and including network means for deriving said output signal for a next succeeding field having a horizontal trace thereof located next below said intersecting horizontal trace.

39. The visual display apparatus of claim 37 wherein said third circuit means comprises:
comparator means having a first input coupled to receive said timing circuit means horizontal scan information and a second input for receiving longitudinal boundary slope increment signals and having an output for providing said boundary signals representing the digital correspondence between said first and second inputs;
adder means having a first input for receiving retained said second circuit means slope signals, a second input for receiving summed slope signals for developing a summation of said signals at said first and second inputs at an output thereof;
data selector means having a first input for receiving said adder means output summed signals and a second input for receiving a signal representing the horizontal position of said vanishing point at said raster and selectively actuable to present a predetermined one of said first or second inputs at the output thereof;
shifter network means having an input for receiving said second circuit means slope signals and retaining them and actuable to substantially halve the value of a said slope signal corresponding with a horizontal scan first appearing below said vanishing point.

40. The visual display apparatus of claim 39 wherein said third circuit means further includes:
overflow detection means coupled with said adder means and responsive to an overflow condition thereat to inhibit the enablement thereof; and
override network means responsive to said overflow condition for inhibiting the development of a said boundary signal.

41. Visual display apparatus for use in a simulator system of a variety wherein visual motion cues are generated as a video raster display at a stationary display surface spaced from an eye position a distance, D, said visual cues representing portions of a simulative region having predetermined visual features defined by boundaries extending generally longitudinally outwardly from said eye position and by visual information having boundaries generally transversely oriented with respect to said longitudinal boundaries, said boundaries and instantaneous said eye positions being identifiable within a simulative coordinate system and said eye position having a simulative height, H, said apparatus comprising:
timing means for generating interlaced raster controls including horizontal counter means for generating horizontal scan information and control signals developed through a predetermined digital sequence, vertical counter means for generating vertical information and control signals as a division by a predetermined odd number of a select digital sequence of said horizontal counter means, and control means for dividing said select digital sequence of said horizontal counter means by two and combining the thus divided select sequence with said vertical control signals to establish a sequence of vertical blanking signals and horizontal blanking signals defining an interlaced raster frame of field 0 and field 1;
first circuit means for generating signals representing the predetermined vertical location of a vanishing point upon said raster, horizontal traces of said raster being located vertical distances, y, below said vanishing point;
second circuit means for developing slope signals each representing the slope at said raster of a said longitudinal boundary extensible from said vanishing point;
third circuit means responsive to said timing circuit means horizontal scan information signals and said slope signals for generating boundary signals representing said longitudinal boundaries extending from said vanishing point at the slopes defined by said slope signals;
fourth circuit means for treating the combination of said boundary signals and signals representing said visual information to provide video information signals; and
video processing means responsive to said video information signals for deriving video outputs for developing an image at said raster.

42. The visual display apparatus of claim 41 wherein said third circuit means comprises:

comparator means having a first input coupled to receive said timing circuit means horizontal scan information and a second input for receiving longitudinal boundary slope increment signals and having an output for providing said boundary signals representing the digital correspondence between said first and second inputs;

adder means having a first input for receiving retained said second circuit means slope signals, a second input for receiving summed slope signals for developing a summation of said signals at said first and second inputs at an output thereof;

data selector means having a first input for receiving said adder means output summed signals and a second input for receiving a signal representing the horizontal position of said vanishing point at said raster and selectively actuable to present a predetermined one of said first or second inputs at the output thereof;

shifter network means having an input for receiving said second circuit means slope signals and retaining them and actuable to substantially halve the value of a said slope signal corresponding with a horizontal scan first appearing below said vanishing point.

43. The visual display apparatus of claim 42 wherein said third circuit means further includes:

overflow detection means coupled with said adder means and responsive to an overflow condition thereat to inhibit the enablement thereof; and override network means responsive to said overflow condition for inhibiting the development of a said boundary signal.

* * * * *